(12) United States Patent
Harris et al.

(10) Patent No.: US 6,282,183 B1
(45) Date of Patent: *Aug. 28, 2001

(54) METHOD FOR AUTHORIZING COUPLINGS BETWEEN DEVICES IN A CAPABILITY ADDRESSABLE NETWORK

(75) Inventors: Jeffrey Martin Harris; Ernest E. Woodward, both of Chandler; Ronald W. Borgstahl, Phoenix; Dale Farnsworth, Mesa; Jay Eaglstun, Tempe; Eric Richard Eckert, Glendale, all of AZ (US)

(73) Assignee: Motorola, Inc., Schaumburg, IL (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/104,634

(22) Filed: Jun. 25, 1998

Related U.S. Application Data

(63) Continuation-in-part of application No. 08/867,311, filed on Jun. 2, 1997, now abandoned.

(51) Int. Cl.[7] .............................. G01R 31/08; H04J 1/16; H04L 12/28; H04L 12/40; H04L 12/42
(52) U.S. Cl. .................... 370/338; 370/230; 370/431; 370/438; 370/449
(58) Field of Search .................................. 370/338, 438, 370/230, 229, 235, 401, 449; 395/384, 186, 188, 491, 430, 442; 709/227, 223, 230

(56) References Cited

U.S. PATENT DOCUMENTS

| | | | |
|---|---|---|---|
| 5,077,790 | * 12/1991 | D'Amico et al. | 380/23 |
| 5,124,984 | * 6/1992 | Engel | 370/94.1 |
| 5,276,680 | * 1/1994 | Messenger | 370/85.1 |
| 5,317,693 | * 5/1994 | Cuenod et al. | 395/275 |
| 5,623,637 | * 4/1997 | Jones et al. | 385/491 |
| 5,732,350 | * 3/1998 | Marko et al. | 455/435 |
| 5,809,428 | * 9/1998 | Garahi et al. | 455/517 |
| 5,920,730 | * 7/1999 | Vincent | 395/834 |
| 6,003,084 | * 12/1999 | Green et al. | 709/227 |

* cited by examiner

Primary Examiner—Huy D. Vu
Assistant Examiner—M. Phan
(74) Attorney, Agent, or Firm—Charles W. Bethards; Hisashi D. Watanabe

(57) ABSTRACT

A method for bonding (905) to a device (901, 902). The method includes a step of transmitting a beacon message (2500). The method also includes steps of (i) selecting a beacon opcode (2501), (ii) selecting an identifier (2512), (iii) selecting an identifier type (2514), (iii) selecting an identifier address (2516), composing the beacon opcode (2501), the identifier (2512), the identifier type (2514) and the identifier address (2516) into the beacon message (2500). The method also includes a step of receiving, in response to the transmitting step, a make bond message (2530).

18 Claims, 42 Drawing Sheets

APPLIANCE CIRCUITS — 48

PDA
TELEVISION
RADIO
CD PLAYER
TAPE PLAYER
COPIER
FACSIMILE
TELEPHONE
CELL PHONE
CORDLESS PHONE
PAGER
WATCH
COMPUTER
POS TERMINAL
AUTOMATED TELLER
SMARTCARD
⋮

*FIG. 3*

RELAY INTERFACE — 44

MODEM - PSTN
NETWORK - LAN
NETWORK - WAN
MODEM - SATELLITE
CELL PHONE - PSTN
TELEPHONE - PSTN
⋮

*FIG. 4*

| I/O | | — 46 |
|---|---|---|
| INPUT DEVICES | OUTPUT DEVICES | |
| KEYBOARD<br>POINTING DEVICE<br>OPTICAL SCANNER<br>MICROPHONE<br>⋮ | PRINTER<br>MODEM<br>SPEAKER<br>⋮ | |

*FIG. 5*

| NEED/CAPABILITY MESSAGE | | | | | —64 |
|---|---|---|---|---|---|
| PEER ID | AUTHORIZATION KEY | NEED(S) SPECIFICATION | CAPABILITIES SPECIFICATION | ... | |
| 66 | 68 | 70 | 72 | | |

*FIG. 7*

| NEED TABLE | | 74 |
|---|---|---|
| CODE | MEANING | |
| — | APPLIANCE PERSONALIZATION (E.G., OWNERS NAME) | |
| — | HARD COPY (E.G., PRINT) | |
| — | VISUAL IMAGE (E.G., DISPLAY) | |
| — | AUDIO (E.G., HIGH FIDELITY) | |
| — | GATEWAY (E.G., INTERNET) | |
| — | FINANCIAL TRANSACTIONS (E.G., POS, POINT OF SALE) | |
| — | LOCK/UNLOCK (E.G., SECURITY ENABLE/DISABLE) | |
| ⋮ | ⋮ | |

*FIG. 8*

| CAPABILITY TABLE | | 76 |
|---|---|---|
| CODE | MEANING | |
| — | APPLIANCE PERSONALIZATION (E.G., OWNERS NAME) | |
| — | HARD COPY (E.G., PRINT) | |
| — | MULTIMEDIA (E.G., REAL TIME VIDEO) | |
| — | VOICE (E.G., SPEECH) | |
| — | AUDIO (E.G., HIGH FIDELITY) | |
| — | GATEWAY (E.G., INTERNET) | |
| — | FINANCIAL TRANSACTIONS (E.G., POS, POINT OF SALE) | |
| — | LOCK/UNLOCK (E.G., SECURITY ENABLE/DISABLE) | |
| ⋮ | ⋮ | |

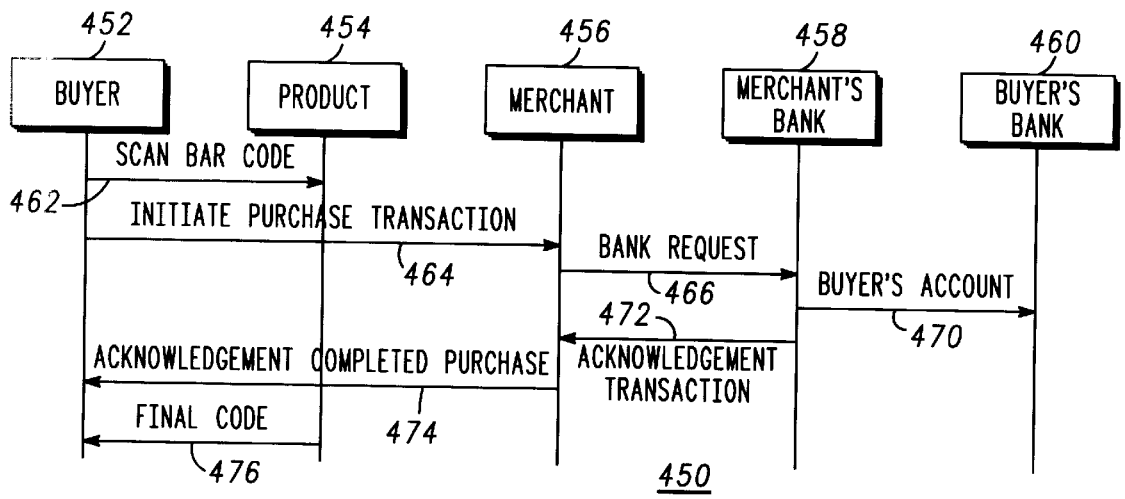
FIG. 30
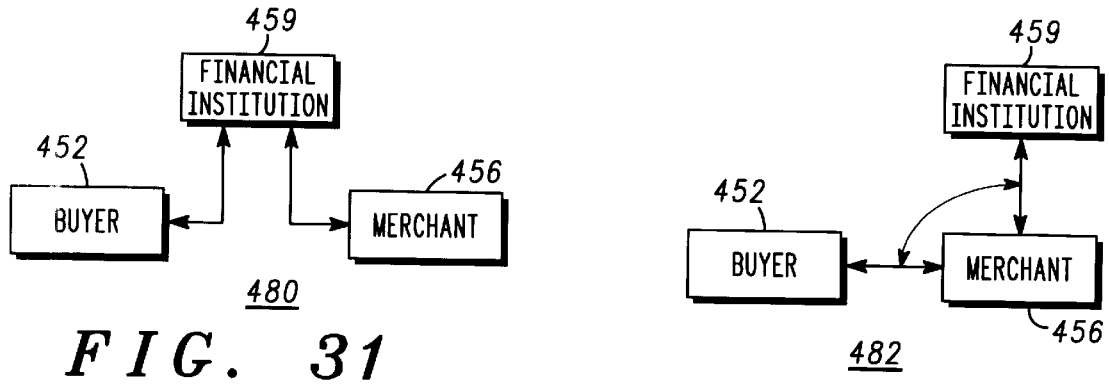
FIG. 31
FIG. 32
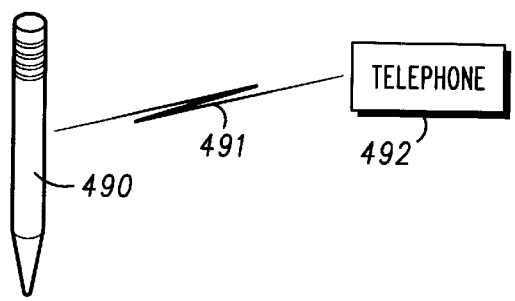
FIG. 33
FIG. 34

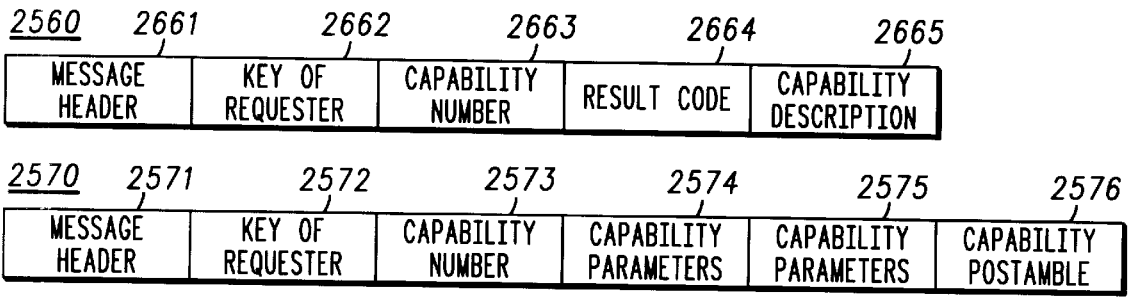
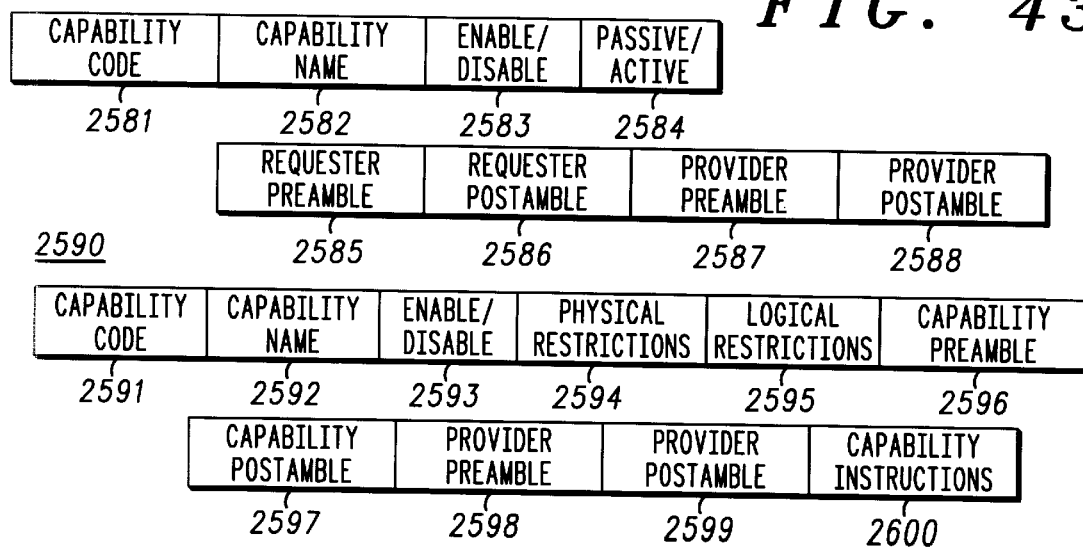
FIG. 42
FIG. 43
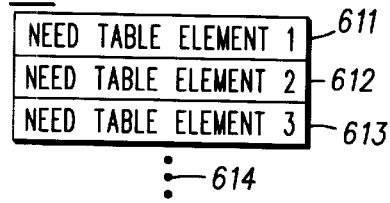
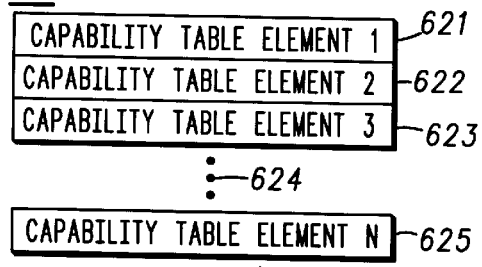

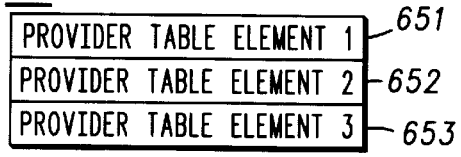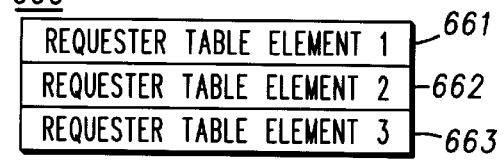
FIG. 44
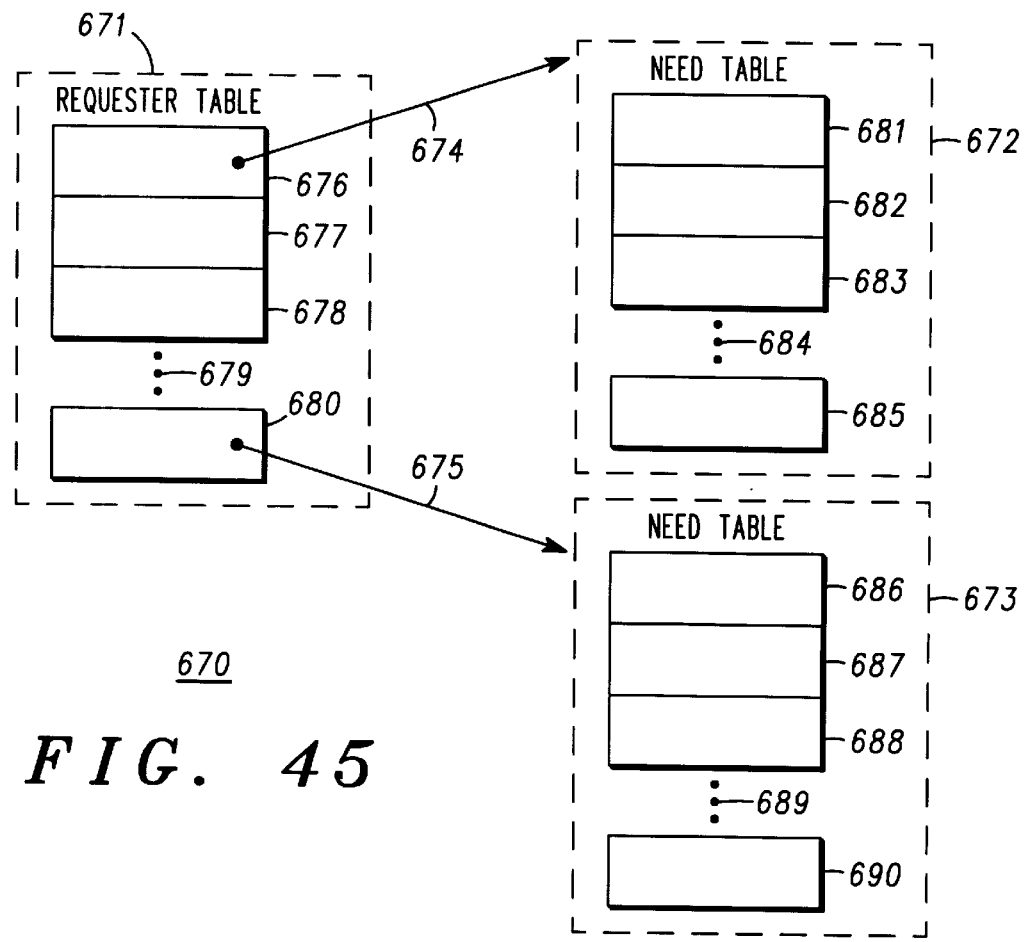
FIG. 45

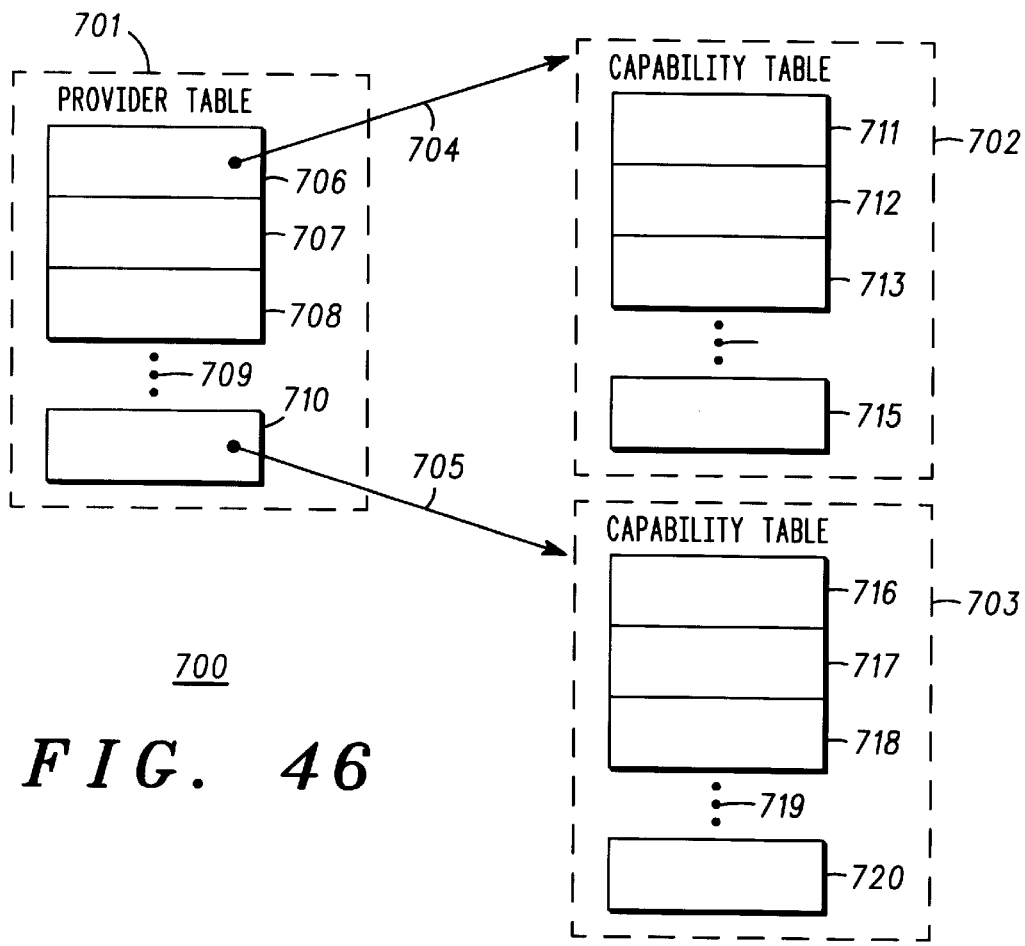

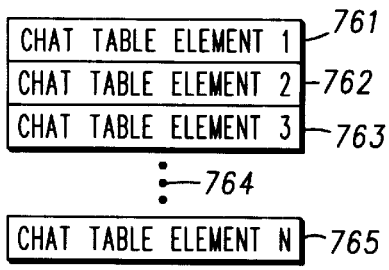
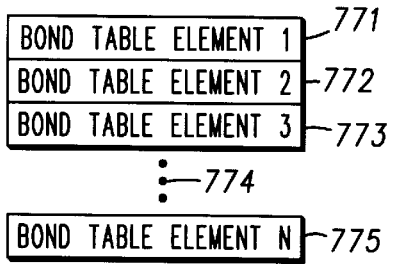
FIG. 48
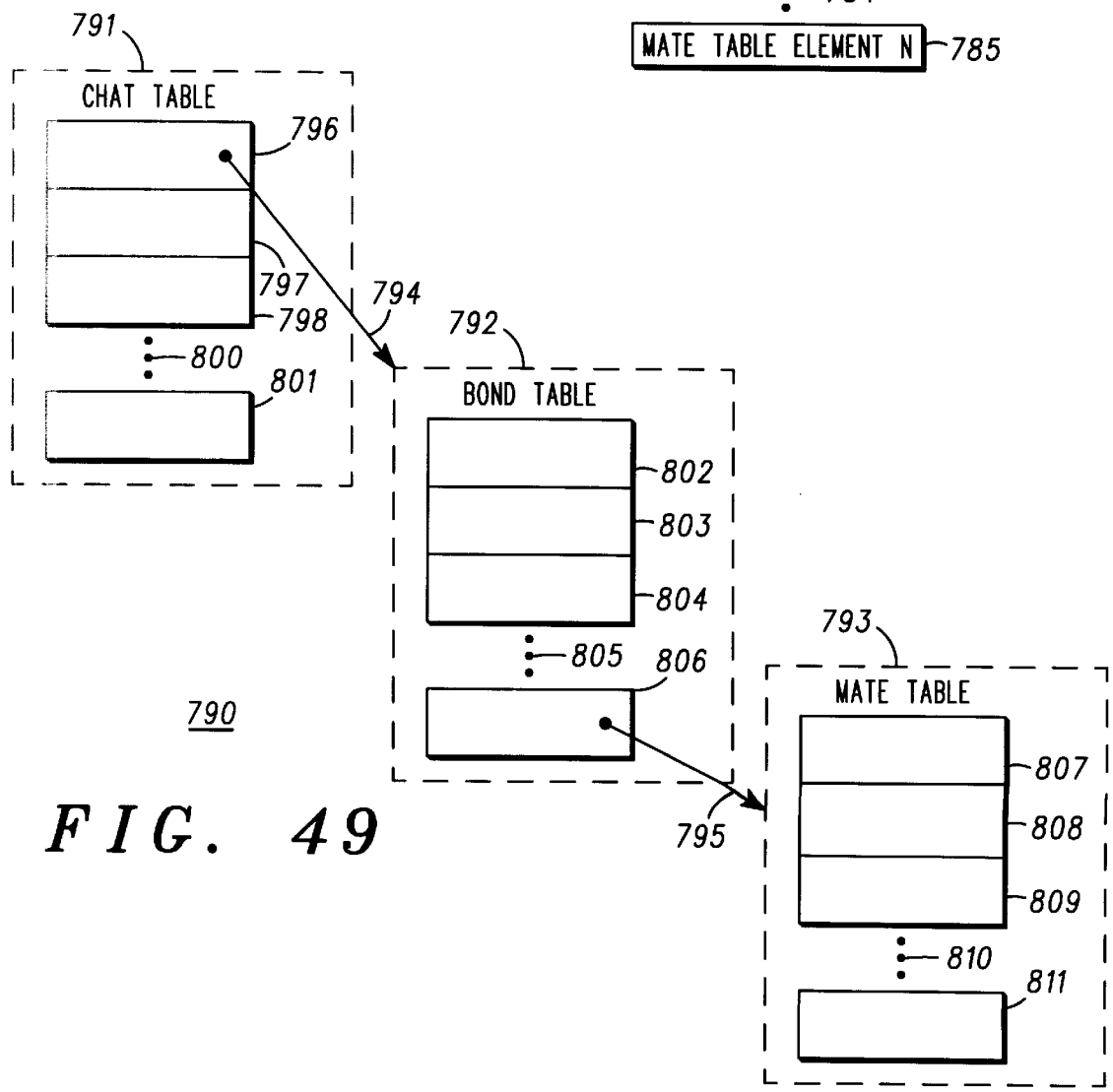
FIG. 49

| ROW CODE | KEY TYPE 852 | NUMBER OF PROVIDERS 853 | NUMBER OF REQUESTERS 854 | MEANING 855 |
|---|---|---|---|---|
| 860 | DEVICE KEY 870 | ONE AND ONE ONLY 871 | MANY 872 | ANY REQUESTER USING THIS KEY CAN BOND TO THIS PROVIDER AND THIS PROVIDER ONLY. 873 |
| 861 | PERSONAL KEY 874 | MANY 875 | ONE AND ONLY ONE. (AN INDIVIDUAL) 876 | ANY PERSONAL KEY IS UNIQUELY ASSIGNED TO A PERSON LIKE A SOCIAL SECURITY NUMBER. THE REQUESTER REPRESENTING SAID PERSON MAY BOND TO THIS PROVIDER. 877 |
| 862 | OWNER KEY 878 | MANY 879 | 1 (OR FEW) 880 | ANY REQUESTER THAT HAS THE SAME OWNER AT THIS PROVIDER IS ELIGIBLE TO BOND WITH THIS PROVIDER 881 |
| 863 | GROUP KEY 882 | MANY 883 | MANY 884 | A GROUP OF ONE OR MORE INDIVIDUALS EACH ACTING AS REQUESTERS MAY BOND TO THIS PROVIDER 885 |
| 864 | HAT KEY 886 | MANY 887 | ONE (THE PERSON WEARING THAT HAT) 888 | A PERSON HAVING A DIFFERENT SET OF NEEDS THAN THAT ASSOCIATED WITH THEIR PERSONAL KEY MAY BOND TO THIS PROVIDER 889 |
| 865 | ROLE KEY 890 | MANY 891 | MANY 892 | ANY ONE OR MORE PEOPLE EACH PERFORMING THE SAME FUNCTION ROLE MAY BOND TO THIS PROVIDER. SIMILAR TO A GROUP KEY BUT IN A MUCH MORE RESTRICTED FASHION BY THE REQUESTER. 893 |
| 866 | SYSTEM KEY 894 | MANY 895 | MANY 896 | ANY DEVICE THAT IS A MEMBER OF THE SAME LOGICAL GROUP OF DEVICES MAY BOND WITH THIS PROVIDER. LIKE A GROUP KEY EXCEPT THE PROVIDER HOLDING THIS KEY MAY HAVE A SYSTEM LIKE SYNERGY. 897 |

FIG. 52

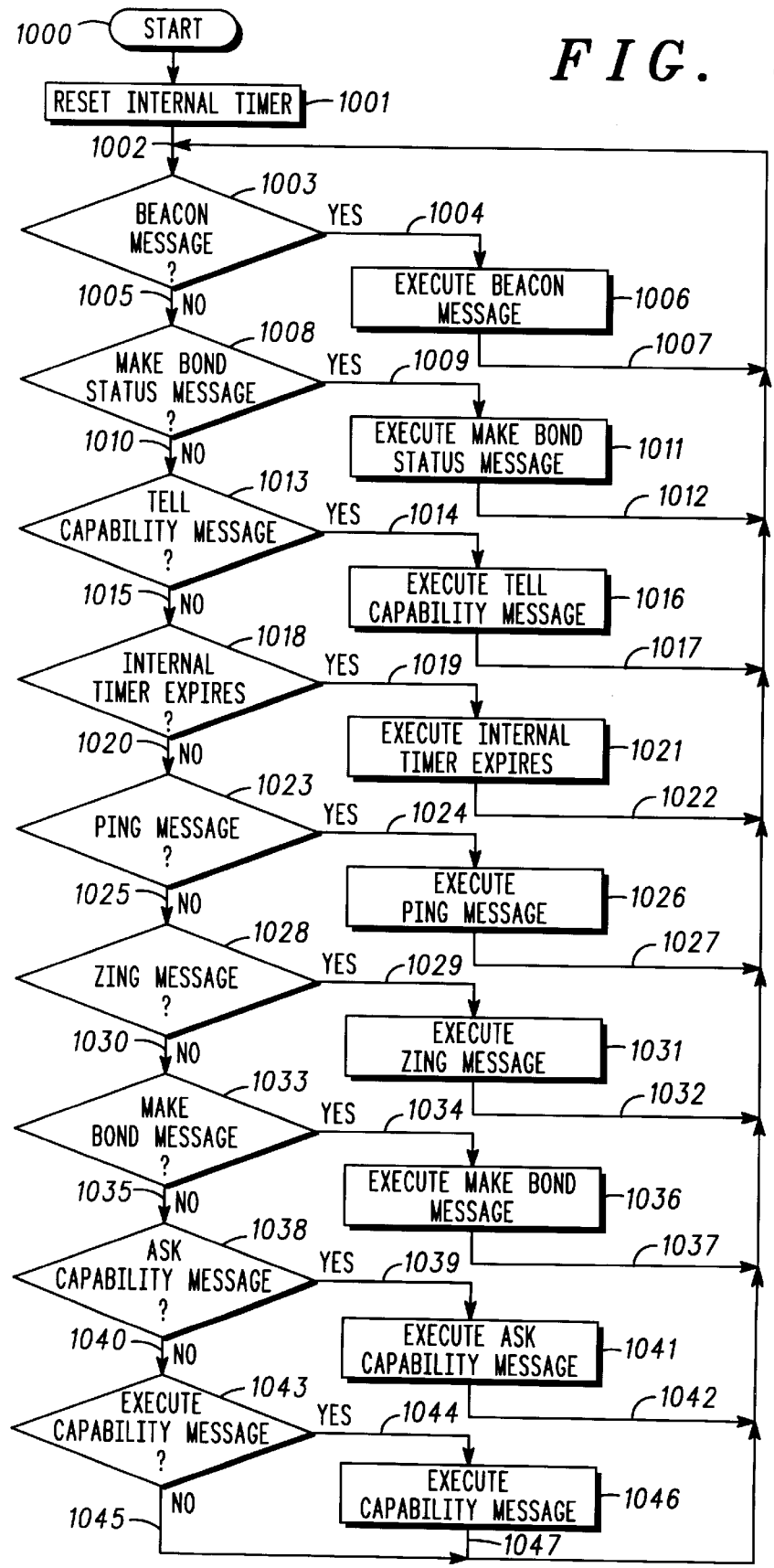

METHOD FOR AUTHORIZING COUPLINGS BETWEEN DEVICES IN A CAPABILITY ADDRESSABLE NETWORK

CROSS-REFERENCE TO RELATED APPLICATIONS

This application is a CIP of Ser. No. 08/862,311 filed Jun. 02, 1997 now abandoned.

This application is related to application Ser. No. 08/729,207, filed on Oct. 15, 1996, now U.S. Pat. No. 6,069,896 application Ser. No. 08/762,127, filed on Dec. 9, 1996 now abandoned; application Ser. No. 08/766,652, filed on Dec. 16, 1996 now U.S. Pat. No. 5,898,821; application Ser. No. 08/774,977, filed on Dec. 26, 1996 now U.S. Pat. No. 5,909,183; and application Ser. No. 08/794,312, filed on Feb. 3, 1997, which are assigned to the same assignee as the instant application.

TECHNICAL FIELD OF THE INVENTION

The present invention relates generally to data communication networks. More specifically, the present invention relates to a peer-to-peer network in which node addressing is dynamically configurable. Even more specifically, the present invention relates to method for authorizing couplings between and/or access to services on devices in a capability-addressable network.

BACKGROUND OF THE INVENTION

A personal area network is formed when capability addressable network devices communicate meaningfully in a peer-to-peer fashion. The networking occurs spontaneously and with no overt action by the user when the devices come into proximity. The networking takes place between unforeseen devices, that is to say, for any given device it is not predictable which devices will be networked with it at any given instant in time. Capability addressable network functionality can be built into many electronic devices, some of which may be carried on a person, and a person may wander about during the course of a day. As the person carrying, for example, a first device, coupled to a personal area network, comes into range of a second, decoupled device, the second device becomes coupled into the individual's personal area network, and as the person leaves the range of the second device, the second device becomes decoupled again. These very fluid network couplings are established and broken many times throughout the course of the day.

Capability addressable network devices have broad requirements with regard to security issues. In some cases it is necessary to restrict usage of a device to authorized parties. In other cases, resources that a device offers can and should be freely shared amongst any device in proximity. For example, an office would typically have one printer intended to be shared with almost any passerby; the printer or other device should accommodate this sharing will little or no overt action from a user. On the other hand, an individual may carry out financial transactions from a digital wallet, and therefore access to that resource must be private and authenticated. The coupling mechanism must accommodate completely secure systems at one end of the spectrum and readily shareable systems at the other end of the spectrum; the challenge is to prescribe a low interaction mechanism for positioning to any point within that spectrum. The challenge is compounded with the knowledge that the configuration of a personal area network is not static; it dynamically changes as devices move in and out of range.

BRIEF DESCRIPTION OF THE DRAWINGS

FIG. 3 shows a list of appliance circuits which may be included in the hardware illustrated in FIG. 2;

FIG. 4 shows a list of gateways which may be included in the hardware illustrated in FIG. 2;

FIG. 5 shows a list of I/O devices which may be included in the hardware illustrated in FIG. 2;

FIG. 7 is a data format diagram of an exemplary need/capability message communicated from a peer to initiate a setup coupling;

FIG. 8 shows an exemplary need table which identifies possible network service needs which might occur at a peer;

FIG. 9 shows an exemplary capability table which identifies possible network capabilities which may be provided by a peer;

FIG. 30 is a diagram illustrating a sequence of data exchange messages between parties involved in a financial transaction;

FIG. 31 is a block diagram of exemplary communications between parties involved in a financial transaction;

FIG. 32 is another block diagram of exemplary communications between parties involved in a financial transaction;

FIG. 33 is an exemplary configuration of a barcode reading pen and the telephone functions on one side of the Personal Store and Transaction Device;

FIG. 34 is an diagram illustrating exemplary message formats involved with implied action barcodes;

FIG. 42 shows more exemplary messages that may be communicated between devices in a preferred embodiment;

FIG. 43 shows exemplary data structure descriptions referring to needs and capabilities that may be employed in a preferred embodiment;

FIG. 44 includes exemplary data structure descriptions referring to requester devices and provider devices that may be employed in a preferred embodiment;

FIG. 45 includes a description of how elements of the requester data structure relate;

FIG. 46 includes a description of how elements of the provider data structure relate;

FIG. 47 includes exemplary data structure descriptions referring to tracking couplings that may be employed in a preferred embodiment;

FIG. 48 includes more exemplary data structure descriptions referring to tracking couplings that may be employed in a preferred embodiment;

FIG. 49 includes a description of how elements of the chat data structure relate;

FIG. 52 is a matrix enumerating bonding key types and explains their usage in a preferred embodiment;

FIG. 53 is an exemplary flow chart outlining the main control loop for a device;

DETAILED DESCRIPTION OF THE DRAWINGS

Figure 1:
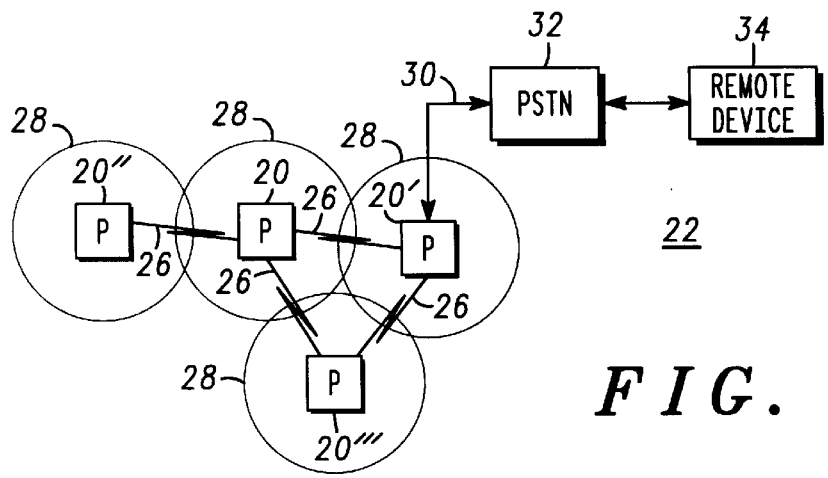
FIG. 1 is a layout diagram depicting exemplary relationships between various peers in a wireless peer-to-peer data communication network configured in accordance with the teaching of the present invention.

FIG. 1 is a layout diagram depicting relationships between various peers (P) 20, 20', 20" . . . in capability addressable, wireless, peer-to-peer data communication network 22 configured in accordance with the teaching of the present invention. While FIG. 1 shows only a few peers 20, virtually any computer or microprocessor controlled electronic device may serve as a peer 20. Accordingly, network 22 supports an unlimited number of possible couplings between peers 20.

As used herein, the term "peer-to-peer" is defined to mean having at least common portions of communications protocol and/or capability and does not refer to equivalence of physical size, functional capability, data processing capacity or transmitter/receiver range or power. Each peer or communication node 20 of communications network 22 may establish personal area network 22. For example, first and second nodes 20 determine that each other is a compatible node. Then, as a result of self-initiated processes, first and second nodes 20 form the personal area network. First and second nodes 20 detect that they are in a particular proximity to one another and establish a communication link. This link may be accomplished by known RF, IR, optical or acoustic techniques or by conduction through a living body. When a link is established, first and second nodes 20 exchange needs and capabilities. When needs and capabilities are not able to be satisfied or matched, one of first and second nodes 20 may alternately route the communications link to a third communication node 20. Put another way, a communications platform that includes at least two nodes having overlapping communications regions could also include means for exchanging needs and capabilities information to another communication node 20 in communication network 22.

Network 22 is desirably configured in a peer-to-peer architecture so that only a minimal number of network-specific components are used and no fixed infrastructure is required. In the preferred embodiments, each peer 20 can initiate a coupling with other peers 20 without servers being required to manage the couplings. Moreover, peers 20 can freely move about within the overlapping communications regions without affecting the network structure or the performance of the communication and thereby not require reconfiguration, setup or activation procedures.

Free movement of peers 20 is further supported by using wireless communication links 26 as a physical transport layer in network 22. In the preferred embodiments, wireless communication links 26 are RF links operating in the higher regions of the microwave band so that small, lightweight, inexpensive, omni-directional antennae may be used. However, other RF frequencies, optical links and other wireless communication links may be used as well. The specific protocols such as TDMA, FDMA and/or CDMA techniques used in implementing wireless communication links 26 are not important to the present invention. However, all peers 20 in network 22 desirably have the ability to communicate using one of the known protocols, regardless of the capabilities and needs of the peers 20.

FIG. 1 depicts detection zone 28 that surrounds each peer 20. Wireless communication links 26 are operated in the preferred embodiments at a sufficiently low power and over a communication range that is less than about 5 meters, although the range may be 5 to 20 meters. The limited range reduces interference between independent couplings which may share the wireless spectrum at different locations. Moreover, the limited range and low power transmissions is compatible with configuring a substantial portion of peers 20 as portable devices. The hand-held portable electronic devices are lightweight and include a battery that is not quickly depleted by using low power transmissions in the limited range.

While peers 20 may potentially couple through network 22 with a vast multitude of peers 20, use of low power wireless communication links 26 limits the number of potential couplings at any given instant in time to those peers 20 which are physically proximate to one another. In other words, a coupling through network 22 occurs when a first peer 20 resides in the detection zone 28 of a second peer 20 and that second peer 20 resides in the detection zone 28 of the first peer 20.

Rather than specifying a network unique address to initiate a coupling, network 22 uses physical proximity along with a needs and capabilities evaluation (discussed below) to target a peer 20 with which a coupling is desired. By not specifying a network-unique address to initiate a coupling, user involvement in making couplings is reduced and network addressing becomes dynamically configurable. Such an addressing scheme is useful in exchanging data between devices a user carries and comes into contact with on a daily basis. Relaying information between peers not in direct communication is also possible. For example, peer 20" may establish a communication link with peer 20'" via peer 20. In this case, peer 20 provides the relay interface between the other two peers.

In addition, not all peers 20 are required to be portable devices. FIG. 1 shows a communication link 30, which may or may not include a wireline link, coupling a peer 20' to public switched telecommunication network (PSTN) 32. Through PSTN 32, peer 20' may communicate with a vast assortment of remote devices 34, of which FIG. 1 shows only one. Peer 20' may be powered from a public power network (not shown) so that minimizing power consumption is not a significant design issue. While FIG. 1 depicts only PSTN 32 linking peer 20 to remote device 34, other local area network (LAN), wide area network (WAN) or communication links may couple peers 20 to remote devices 34. Remote devices 34 may or may not themselves be peers 20. While network 22 uses proximity as a factor in selecting peers 20 to which couplings are formed, the use of routing, gateway or relaying peers 20' permits couplings to be extended over great distances through use of other networks.

Figure 2:
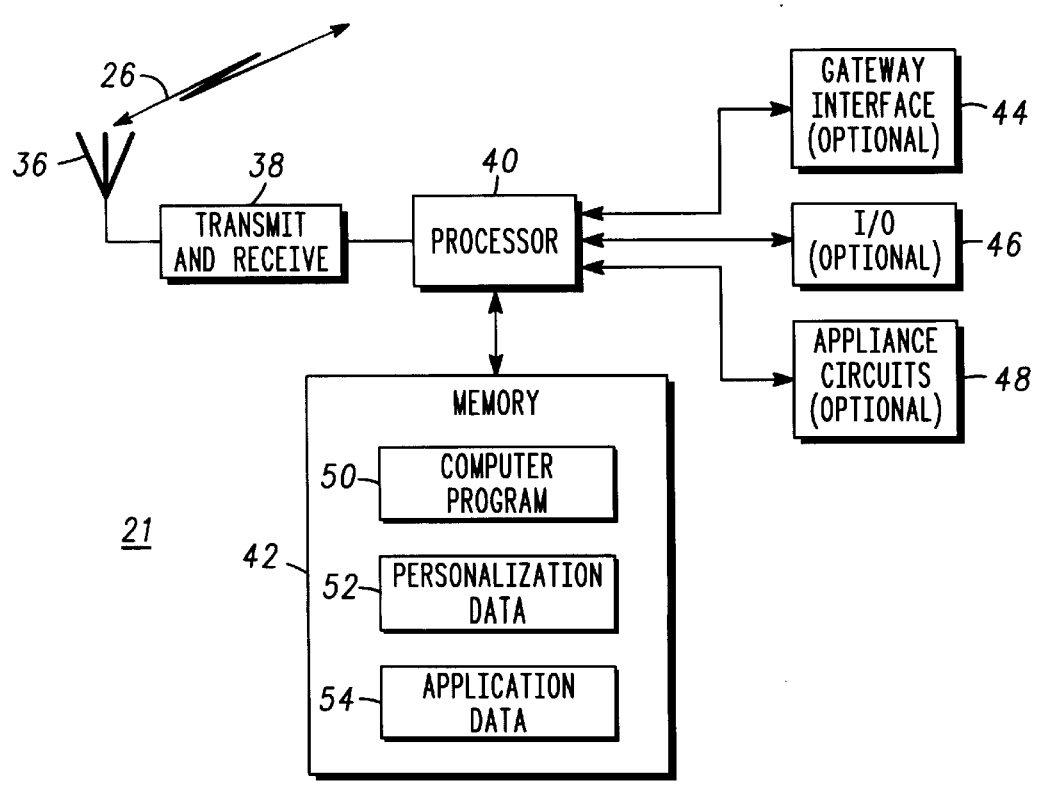
FIG. 2 is a block diagram of hardware included in a peer.

FIG. 2 is a block diagram of hardware 21 included in peer 20. It should be noted that the same reference numbers are used in the figures to denote the same elements. Peer 20 includes antenna 36 configured to support wireless communication link 26. Antenna 36 is coupled to transmit and receive section 38. Transmit and receive section 38 is compatible with the protocols peers 20 use to communicate with one another. Transmit and receive section 38 is coupled to processor 40. Processor 40 couples to memory 42, optional gateway 44, communication link 30, optional I/O section 46, transmit and receive unit 38 and optional appliance circuits 48.

Processor 40 executes computer programs 50 which are stored in memory 42. Computer programs 50 define processes performed by processor 40 and peer 20. Memory 42 additionally stores personalization data 52 and application data 54. Personalization data 52 such as ID codes, PINs, passwords, radio or TV channel presets, language preferences, and speed dial telephone numbers characterize a user or owner of peer 20 and may change from user to user or from time to time. Application data 54 are provided by performing peer applications and may change from moment to moment. A facsimile, a telephone number received over a pager, data scanned in using a bar code reader, and a sound snippet received from a microphone or other audio source represent examples of application data 54.

In one embodiment, the present invention is realized as an integrated circuit for providing wireless communication by interactively coupling one or more communication nodes 20 in a common network 22. The integrated circuit includes, in combination, a receiver for receiving input data, a transmitter for transmitting output data, and a processor. The processor is coupled to the receiver and transmitter for interactively coupling a first common node to a second common node. Processor 40 includes apparatus for activating a communications link between the first and second common nodes when the first and second common nodes are within a predetermined distance from each other and when needs and capabilities of the first and second common nodes overlap. Processor 40 has a terminal coupled to the terminal of memory 42 for transferring the need of the integrated circuit and the capability of the integrated circuit through transmit and receive section 38 to a terminal of the integrated circuit. Antenna 36 is attached to the terminal of the integrated circuit and transmit and receive section 38 periodically transmits a beacon message as an unsolicited message from antenna 36 to initiate the communications link with other peers. The beacon message is stored in memory 42 and contains an identity of the integrated circuit that is sufficiently unique to distinguish the integrated circuit from other peers 20 within communications network 22.

FIG. 3 shows a non-exhaustive list of examples of appliance circuits 48 which may be included in a peer 20. Referring to FIGS. 2 and 3, appliance circuits 48 may be configured as any type of a wide variety of everyday, commonly encountered, electronically controlled devices, fixed or portable. Thus, a peer 20 may, in addition to being a peer 20, be a personal digital assistant (PDA), television, radio, CD player, tape player, copier, facsimile machine, telephone, cellular telephone, cordless telephone, pager, watch, computer, point of sale (POS) terminal, automated teller, smartcard, or other electronic device.

FIG. 4 shows a non-exhaustive list of gateways 44 which may be included in a peer 20. Referring to FIGS. 2 and 4, gateways 44 may be configured as any of a wide variety of relay, routing or protocol conversion devices. For example, a peer 20 may, in addition to being a peer 20, be a modem coupling peer 20 to PSTN 32 (FIG. 1). Other gateways 44 may couple a peer 20 to LANs or WANs. Still other gateways 44 may couple a peer 20 modem to a satellite, a peer 20 cell phone to PSTN 32, a plain old telephone peer 20 to PSTN 32, for example.

FIG. 5 shows a non-exhaustive list of I/O devices 46 which may be included in a peer 20. Referring to FIGS. 2 and 5, I/O devices 46 may be classified into input devices and output devices. Input devices may include keyboards, pointing devices, optical scanners, microphones and other well known input devices. Output devices may include printers, monitors, speakers and other well known output devices. Thus, in addition to being a peer 20, a peer 20 may be an I/O device 46. It should be noted that gateways 44, I/O section 46, and appliance circuits 48 are not mutually exclusive categories. For example, many devices fall into multiple categories. A computer considered as an appliance may include both an I/O section and a gateway. Likewise, a gateway may serve an I/O role.

Figure 6:
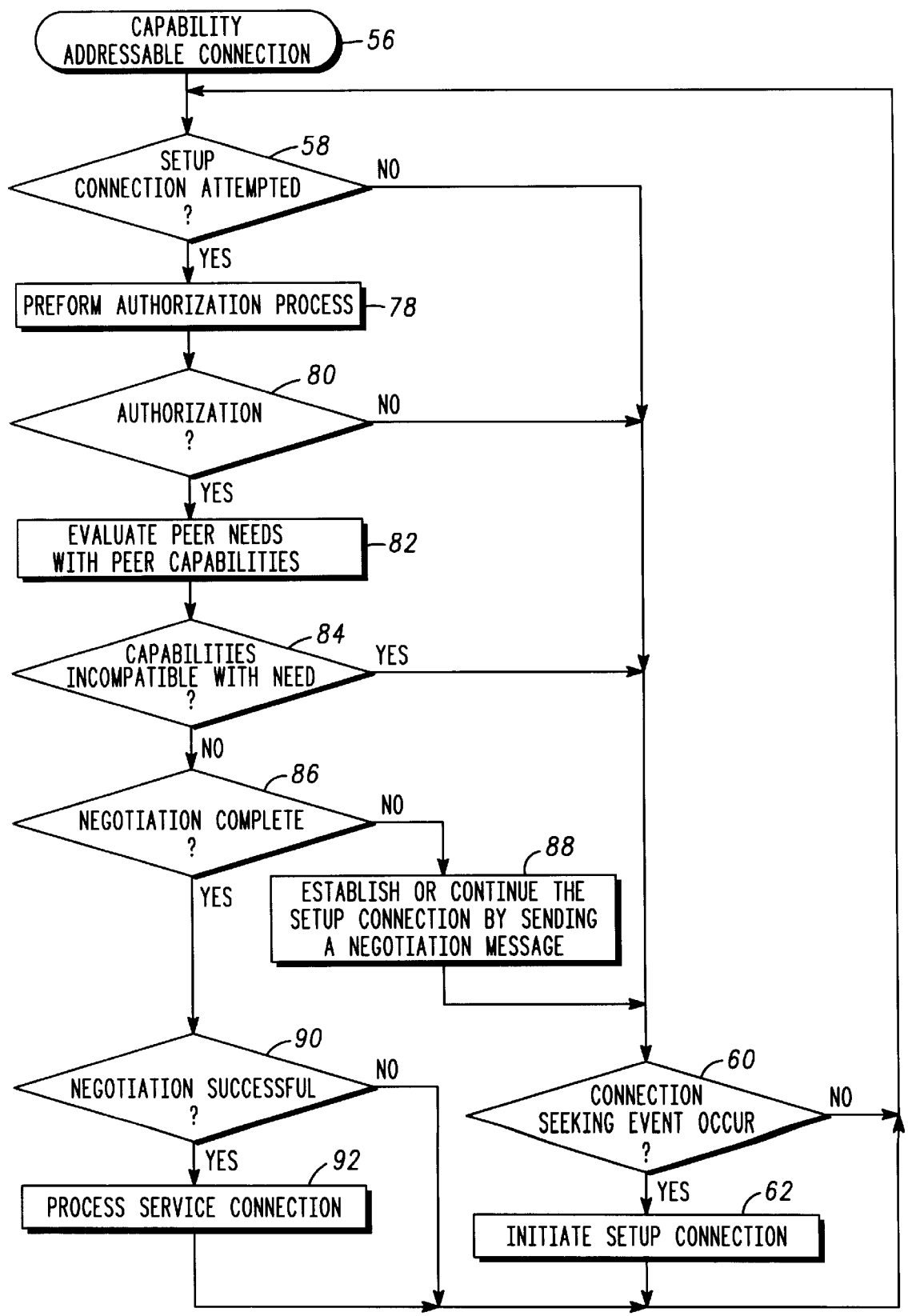
FIG. 6 is a flow chart of exemplary tasks included in a capability addressable coupling process performed by a peer.

FIG. 6 is a flow chart of tasks included in a capability addressable coupling process 56 performed by a peer 20. Process 56 is defined by a computer program 50 stored in memory 42 of peer 20 (FIG. 2). In the preferred embodiments, all peers 20 perform a process similar to process 56. Process 56 includes a query task 58 during which peer 20 determines whether a setup coupling is being attempted. Generally, task 58 allows a first peer 20 to determine whether a second peer 20 is physically proximate to the first peer 20. Task 58 causes transmit and receive section 38 (FIG. 2) to monitor wireless communication link 26 (FIG. 1) to determine whether a signal compatible with a protocol being used by network 22 can be received. Due to the above-described low transmission power levels used by most peers 20, when a signal is detected, the peer 20 sending the signal is located near the receiving peer 20.

When task 58 fails to determine that a setup coupling is being attempted, a query task 60 determines whether a coupling-seeking event has occurred. A coupling-seeking event causes a peer 20 to seek out a coupling with another peer 20. Coupling-seeking events can be triggered using a periodic schedule. For example, couplings may be sought out every few seconds. In this example, the schedule may call for more frequent periodic coupling attempts from peers 20 which are powered from a public power network and less frequent coupling attempts from peers 20 which are battery powered. Coupling-seeking events can also be triggered upon the expiration of a fixed or random interval timer or upon the receipt of other external information. The external information can include information obtained through appliance circuits 48, gateway 44 or I/O section 46 (FIG. 2), including user input.

When task 60 fails to determine that a coupling-seeking event has occurred, program control loops back to task 58.

On the other hand, process 56 performs a task 62 when task 60 determines that a coupling-seeking event has occurred. Task 62 initiates an unsolicited setup coupling. The setup coupling is not addressed to any particular peer 20 of network 22. Rather, it is broadcast from the peer 20 making the attempt and will be received by all peers 20 within the detection zone 28 (FIG. 1) of the broadcasting peer 20. It is not necessary that the broadcast signal be answered by another peer 20 even when another peer 20 is within detection zone 28. Further, the broadcasting peer 20 may not know whether another peer 20 receives the broadcast signal. At this point, the broadcasting peer 20 may or may not know any particular needs or capabilities of other peers 20 that are proximate to broadcasting peer 20.

Task 62 initiates a setup coupling by broadcasting a need/capability message 64, an exemplary format for which is depicted in FIG. 7. Referring to FIG. 7, message 64 includes peer ID 66, an authorization key 68, a need specification 70, and a capability specification 72, among other data elements. Peer ID 66 is desirably sufficiently unique within the domain of network 22 so that it may be used in an addressed service coupling, should the setup coupling prove successful. Authorization key 68 includes one or more data codes which may be used by a receiving peer 20 in performing an authorization process. Needs specification 70 is a list of network needs currently experienced by the broadcasting peer 20. Capability specification 72 is a list of network capabilities which the broadcasting peer 20 may provide to other peers 20 of network 22.

Needs specification 70 may be determined by consulting need table 74, an exemplary and non-exhaustive block diagram of which is depicted in FIG. 8. As illustrated in FIG. 8, data codes may be associated with a variety of network service needs which a service-requesting peer 20 may experience. One exemplary need is that of appliance personalization. In the appliance personalization need example, a PDA might need to personalize nearby appliances. To satisfy this need, personalization data 52 (FIG. 2) is programmed into certain nearby appliances without user intervention. As a result, the appliances will be programmed with a particular user's personalization data whenever that user is near, without requiring action on the user's part, and regardless of prior persons who may have used the appliance.

Other exemplary needs include printing application data 54 (FIG. 2), displaying application data 54, annunciating application data 54 at a speaker, routing connectivity to the Internet or other network resources, POS transactions, passage through secure areas or toll booths and the like.

Capability specification 72 (FIG. 7) is determined by consulting a capability table 76, an exemplary and non-exhaustive block diagram of which is depicted in FIG. 9. As illustrated in FIG. 9, data codes are associated with a variety of network capabilities provided by a service-providing peer 20. For example, a service-providing peer 20 capability can be that of appliance personalization. Thus, a peer 20 is capable of being personalized by personalization data 52 (FIG. 2). Other examples include capabilities of printing, displaying, annunciating over a speaker, relaying a coupling through the Internet or other network or POS terminal and unlocking a secured passageway. In general, potential capabilities are compatible with potential needs.

Referring back to FIG. 7, need/capability message 64 includes those codes from tables 74 and 76 (FIGS. 8–9) that currently apply. While a peer 20 may have more than one need 70 or capability 75 at a given instant, it is not required that a peer 20 have multiple needs or capabilities. Moreover, a peer 20 may have a network need, a network capability, or both. Message 64 serves as a need message when peer need 70 is specified regardless of whether peer capability 75 is specified and as a capability message when peer capability 75 is specified regardless of whether peer need 70 is specified.

Referring back to FIG. 6, after task 62 broadcasts message 64 (FIG. 7), program control loops back to task 58. When task 58 detects that a setup coupling is being attempted by receiving a message 64, task 78 performs an authorization process. Task 78 uses authorization key 68 (FIG. 7) from message 64 to determine that the peer 20 attempting to setup a coupling is authorized to couple to the receiving peer 20. Task 78 allows an owner of a peer 20 to restrict access to the owned peer 20 through network 22. The authorization process of task 78 is used, for example, to restrict personalization capabilities of an appliance to a small family group. Alternatively, a peer 20 having a POS capability may perform an extensive authorization process before permitting a transaction to take place. A peer 20 having a need may also qualify the receipt of provided services depending upon the authorization process provided by task 78.

After task 78, a query task 80 determines whether the authorization process 78 authorized the attempted setup coupling. When authorization is denied, program control loops back to task 60. The receiving peer 20 need not reply or otherwise acknowledge the attempted setup coupling. When authorization is accepted, a task 82 evaluates peer needs with peer capabilities. In other words, task 82 causes the message-receiving peer to compare its available capabilities (if any) to any needs listed in a received unsolicited need/capability message 64 (FIG. 7) and to compare its available needs (if any) to any capabilities listed in the message 64. After task 82, a query task 84 acts upon the result of the evaluation of task 82. When no internal capabilities match needs indicated in an unsolicited message 64 received in a first peer 20, and no internal needs match capabilities indicated in an unsolicited message 64 received in a second peer 20, neither peer 20 can be of service to the other. Program control loops back to task 60 and the receiving peer 20 need not reply or otherwise acknowledge the attempted setup coupling.

At this point, the vast multitude of potential couplings which a peer 20 may make within network 22 has been greatly reduced in scope without the use of network-unique addressing. The low power transmission scheme excludes most peers 20 in network 22 from being connectable at a current instant because most peers 20 will not be proximate one another. Of the few peers 20 which may be within each other's detection zones 28 (FIG. 1), the scope of potential couplings has been further limited through the authorization process of task 78 (FIG. 6) and the needs and capabilities evaluation of task 82. Additional exclusions on the remaining potential couplings are performed through a negotiation process carried on between a service-requesting peer 20 and a service-providing peer 20.

When task 84 determines that capabilities and needs appear to be compatible, a query task 86 determines whether this negotiation process is complete. When the negotiation process is not complete, a task 88 establishes or otherwise continues the setup coupling in furtherance of the negotiation process by sending an addressed negotiation message (not shown) to the peer 20 whose peer ID 66 (FIG. 7) was included in a just-received needs/capabilities message 64. The negotiation message can have a form similar to that of needs/capabilities message 64 but be specifically addressed to the other peer 20.

After task 88, program control loops back to task 60. Subsequent negotiation messages may, but need not, be received. When such subsequent negotiation messages indicate that both peers 20 of the prospective coupling have completed negotiation, query task 90 determines whether the negotiation was successful/complete. When negotiation is not successful, program control loops back to task 58 and no service coupling results. However, when negotiation is successful, process service coupling procedure 92 is performed. During procedure 92, a one-to-one, addressed coupling is established between peers 20 to perform network services. Upon completion of the service coupling, program flow loops back to task 58.

While nothing prevents capability addressable coupling process 56 from relying upon user intervention during the setup coupling process, user intervention is not required. Whether user intervention is required or not should depend upon the security, a priori knowledge and other considerations coupled with the nature of the peers 20 involved. For example, peers 20 involved in financial transactions can benefit upon user intervention to ensure security. However, personalization of user-owned appliances and many other coupling scenarios need not rely on user intervention.

Figure 66:
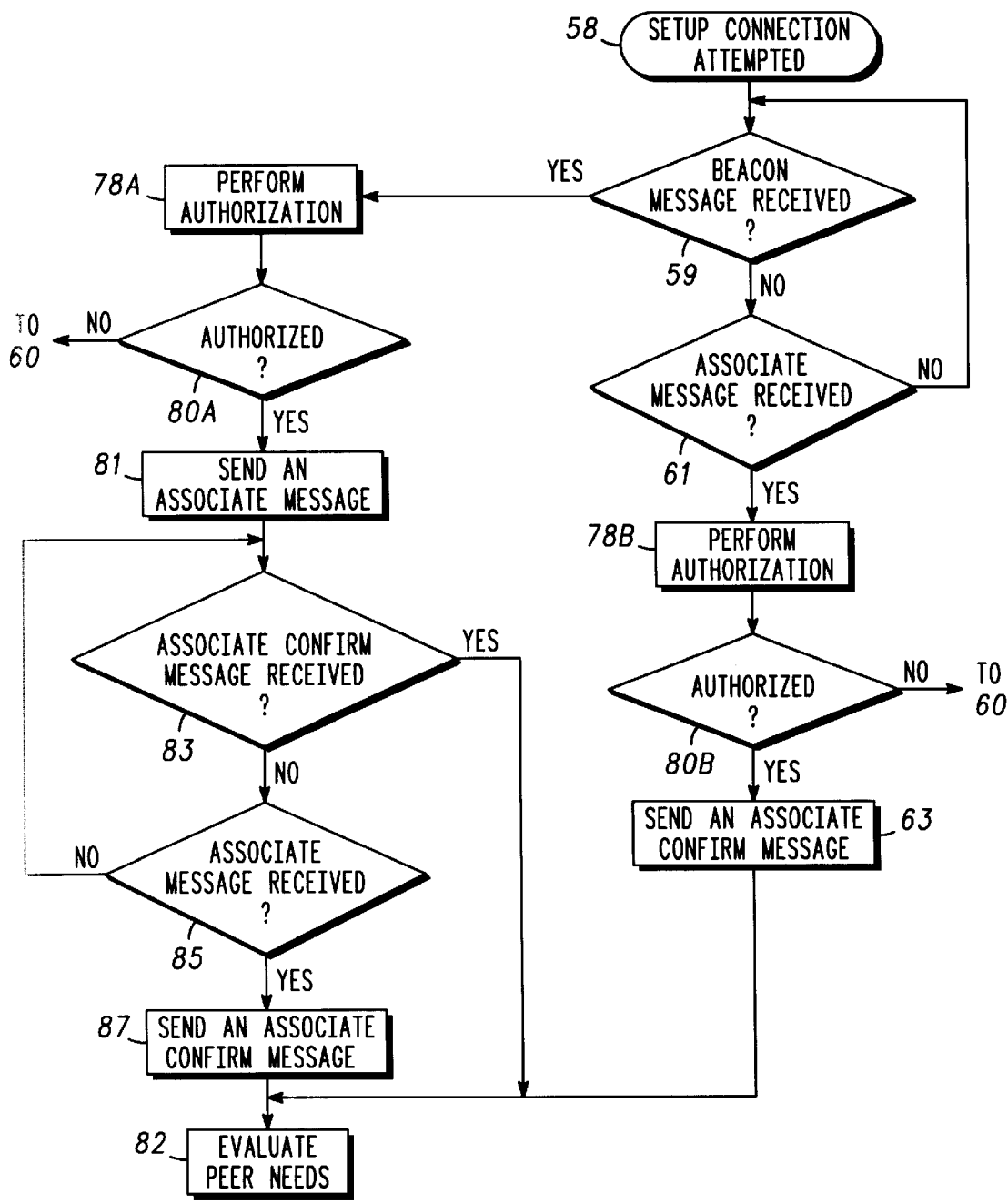
FIG. 66 is a flow chart providing further detail of a capability addressable coupling process as shown in FIG. 6.

FIG. 66 is a flow chart providing further detail of the capability addressable coupling process as shown in FIG. 6. FIG. 66 illustrates a method of initiating a communication link between first and second electronic devices or first and second peers 20. Referring briefly to FIGS. 1, 2, and 6, task 58 causes transmit and receive section 38 to monitor wireless communication link 26 to determine whether a signal compatible with a protocol being used by network 22 can be received. In particular, task 58 of FIG. 66 indicates that a setup connection or coupling process in transmitting a beacon message from a first peer 20 is received by a second peer 20. The beacon message transmitted by the first peer 20 is an unsolicited message that is broadcast to any listening electronic device. The type of information transmitted in the beacon message is not a limitation of the present invention. In other words, the beacon message may or may not include all of the elements in need/capability message 64 as illustrated in FIG. 7. By way of example, the beacon message could only include the peer ID 66 portion of need/capability message 64 in order to save bandwidth and power when transmitting data. Thus, the first peer 20 transmits a beacon message, i.e., the identity of the first peer 20 as contained in peer ID 66, as an unsolicited periodic message independent of whether any other electronic device is within a close enough proximity to receive the message.

Task 78A of FIG. 66 causes second peer 20 to perform an authorization of the identity message received from first peer 20. If authorized to establish a communications link as determined by task 80A, second peer 20 sends or transmits an associate message as indicated by task 81 to first peer 20. Thus, second peer 20 acknowledges receipt of the identity of first peer 20 based on authorization of the second peer 20 to communicate with the first peer 20 by transmitting an associate message from second peer 20. If not authorized to establish a communications link, second peer 20 returns from task 80A (see FIG. 66) to task 60 (see FIG. 6).

The associate message sent by second peer 20 to first peer 20 confirms that second peer 20 is authorized to communicate with first peer 20 based on the transmitted identity of the first electronic device. First peer 20 receives the associate message and moves from task 61 to task 78B. Task 78B (also see task 78 in FIG. 6) causes first peer 20 to determine whether authorization is granted for first peer 20 to establish communications with second peer 20. If authorization is granted first peer 20 moves from task 80B to task 63 (FIG. 66). Task 63 causes first peer 20 to send or transmit an associate confirm message to second peer 20. Thus, first peer 20 acknowledges both a receipt of the associate message from second peer 20 and a granted authorization of first peer 20 to communicate with second peer 20 by transmitting an associate confirm message. When second peer 20 receives the associate confirm message in task 83, the two-way communications link between first peer 20 and second peer 20 is established. At this point, the first and second electronic devices have initiated and established a communication link and are ready to pass additional information between themselves. Task 82 in FIG. 66 corresponds with task 82 in FIG. 6, which causes an exchange of needs and capabilities between first peer 20 and second peer 20.

Figure 67:
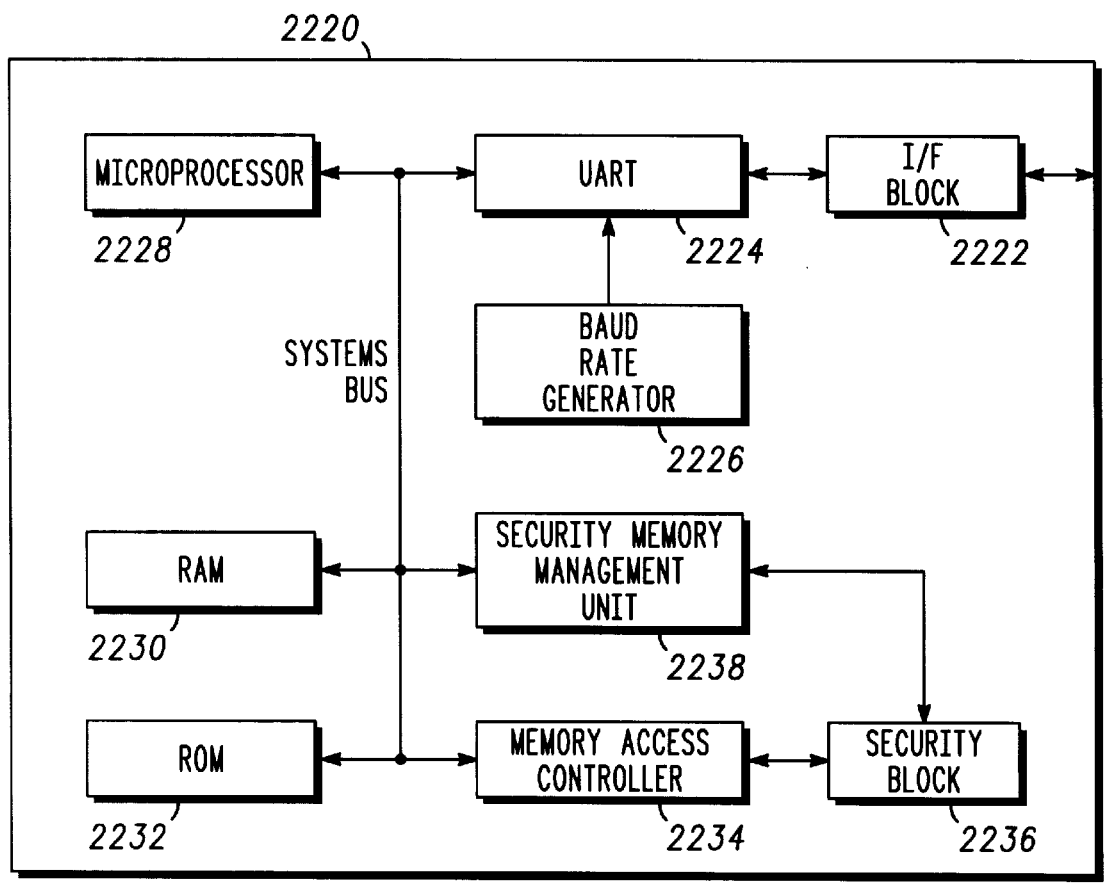
FIG. 67 illustrates a block diagram of a smartcard configured to operate in a wireless peer-to-peer data communication network.

FIG. 67 illustrates a block diagram of a smartcard 2220 that is configured to operate in a wireless peer-to-peer data communication network. In a "contacted" configuration, smartcard 2220 includes an interface (I/F) block 2222 connected to a number of contact points that allow the transfer of electrical signals between a terminal device (not shown) that makes physical contact with smartcard 2220. Smartcard 2220 receives an operating potential from the terminal device through one of the contact points of smartcard 2220 for supplying energy to the functional blocks within smartcard 2220. Additional contact points are used to transfer input/output signals between smartcard 2220 and the terminal device.

Alternatively, smartcard 2220 is a "contact-less" smartcard that operates without making physical contact with the terminal device. In this case, smartcard 2220 both receives input signals and transmits output signals as modulated signals over a carrier. In addition, Radio Frequency (RF) energy is radiated to a coil (not shown) within smartcard 2220 for supplying the operating potential that enables operation of the functional blocks within smartcard 2220.

Smartcard 2220 includes an interface circuit, i.e., I/F block 2222, for receiving data from the external terminal device, a Universal Asynchronous Receiver-Transmitter device (UART) 2224 for interfacing to the external terminal device, a dynamically adjustable baud rate generator 2226 for driving UART 2224, and a microprocessor 2228 for controlling the transfer of data between the external terminal device and the output of UART 2224. In addition, a Random Access Memory (RAM) 2230 stores data received from UART 2224, a Read Only Memory (ROM) 2232 provides data for the operating system and instructions for the program control of microprocessor 2228. A portion of RAM 2230 is a nonvolatile memory such as Electrically Erasable ($E^2$) memory, ferroelectric memory, or the like for storing data when smartcard 2220 is not receiving an operating potential. A Memory Access Controller (MAC) 2234 under control of microprocessor 2228 receives data from RAM 2230 for transfer to a security block 2236. Security block 2236 performs mathematical operations to encrypt the data received from RAM 2230. The encrypted data is transferred through UART 2224 to the terminal of smartcard 2220 and the external terminal device. A security memory management unit 2238 supports security block 2236.

In operation, smartcard 2220 functions as a peer 20 having a capability addressable coupling process for initiating a communication link between smartcard 2220 and other electronic devices or additional peers 20. As a "contact-less" smartcard 2220, the beacon message contains the identity of smartcard 2220, i.e., peer ID 66 (FIG. 7), and is transmitted from RAM 2230 through UART 2224 and I/F block 2222 to radiate to other peers 20. In addition, smartcard 2220 also receives a beacon message from other peers 20 in proximity to smartcard 2220 through I/F block 2222 and UART 2224. Thus, UART 2224 both receives data, i.e., the beacon message, for storage in RAM 2230 and transmits data that is stored in RAM 2230. After smartcard 2220 has completed the handshake process whereby an associate message and an associate confirm message are exchanged, a communication link has been established with another peer 20.

In addition to storing the data consisting of peer ID 66 information (FIG. 7), RAM 2230 also stores information for the needs and capabilities of smartcard 2220. After the communication link with another peer 20 is established, an exchange of needs and capabilities between smartcard 2220 and the other peer 20 in the communication link takes place. The needs are determined by consulting need table 74 (FIG. 8) and the capabilities are determined by consulting capability table 76 (FIG. 9). The needs and capabilities information is stored in RAM 2230 and transferred under the control of microprocessor 2228 via a SYSTEMS BUS to UART 2224. I/F block 2222 receives the needs and capabilities data from UART 2224 and the data is transmitted from an antenna (not shown) attached at a terminal of smartcard 2220.

A need of smartcard 2220 is a function that smartcard 2220 is not capable of performing, such as a visual display for an owner of data stored in smartcard 2220. Thus, RAM 2230 stores need table 74 having an entry describing the need of displaying data. The information stored in the entry of need table 74 (FIG. 8) is transferred to the other peer 20 in the established communication link. Further, a capability of smartcard 2220 is a function that smartcard 2220 is capable of performing. By way of example, smartcard 2220 has security memory management unit 2238, memory access controller 2234, and security block 2236 that cooperate to execute mathematical algorithms. The algorithms compute modular exponentiation equations for encrypting portions of the data stored in RAM 2230 in order to provide a secure communication link. Smartcard 2220 transfers the information stored in the entry of capability table 76 (FIG. 9) that describes the capability of providing encrypted data to the other peer 20 that is connected in the established communication link. Should the other peer 20 need data encryption functions, data from the other peer 20 is transferred to smartcard 2220 to take advantage of the encryption capabilities provided by smartcard 2220. Thus, two peer 20 devices exchange needs and capabilities information after establishing a communications network. Data is transferred between the two peers 20 based on needs that a peer 20 is deficient to solve and capabilities that a peer 20 is equipped to service.

Figure 10:
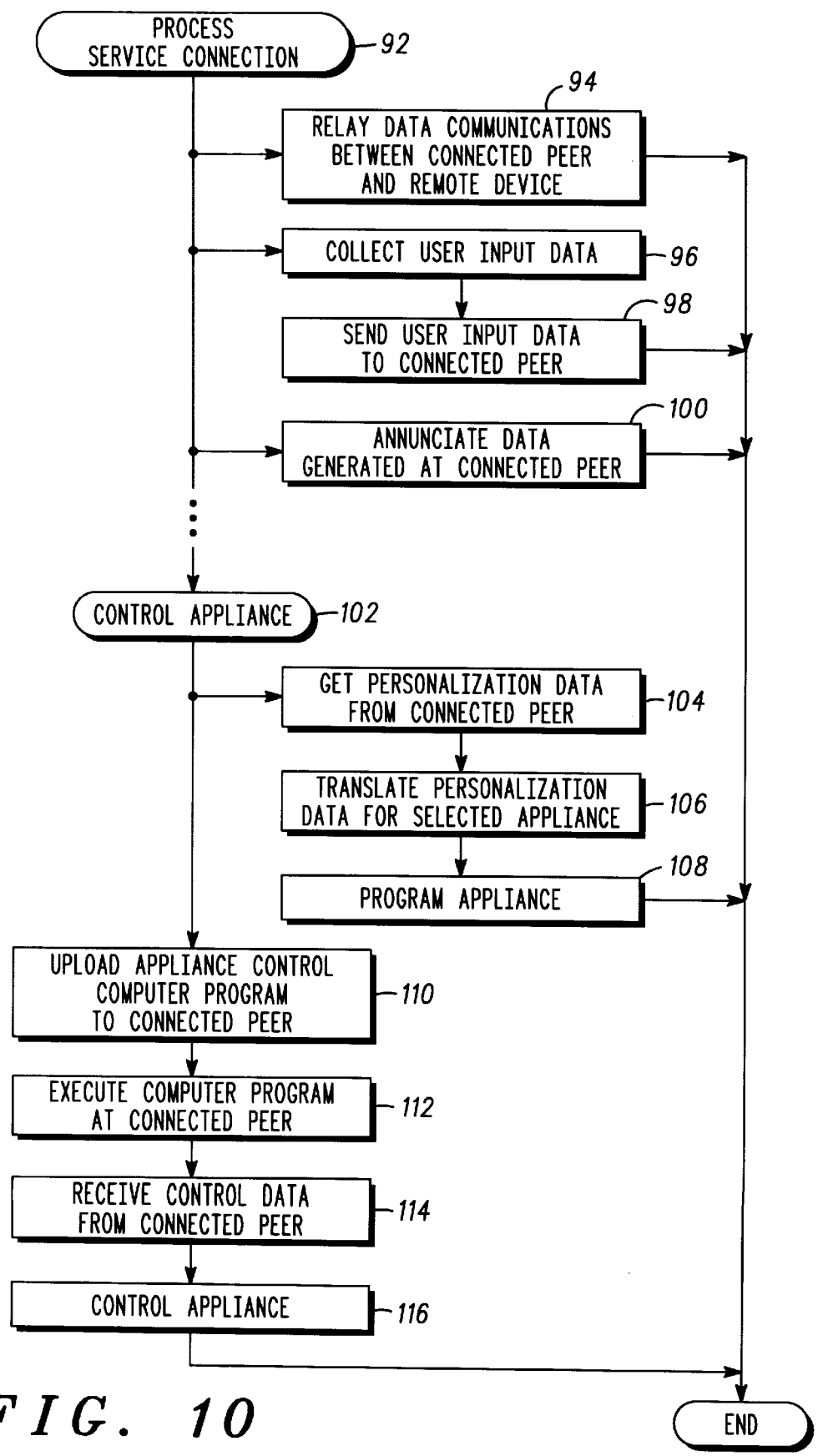
FIG. 10 shows an exemplary flow chart of a process service coupling procedure performed at a peer.

FIG. 10 is a flow chart of process service coupling procedure 92 of FIG. 6. Procedure 92 illustrates a collection of tasks which can be performed at service-providing peer 20 in support of a service coupling. Not all peers 20 need to be able to perform all the tasks depicted in FIG. 10. Likewise, many peers 20 may include other tasks suiting the nature of those particular peers 20.

Procedure 92 performs a task 94 to provide a network relay, router or gateway capability for a service-receiving peer 20 of network 22 through an established service coupling. During task 94, a service-providing peer 20 relays data communications between the coupled peer 20 and a remote device 34 (FIG. 1). After task 94, program flow returns to process 56 (FIG. 6). Task 94 may be used to extend the service coupling to the Internet or other network.

In addition, procedure 92 performs tasks 96 and 98 to provide a user input capability for a service-receiving peer 20 of network 22 through an established service coupling. During task 96, the service-providing peer 20 collects user input from its I/O section 46 (FIG. 2). During task 98, the service-providing peer 20 sends the collected user input data to the coupled service-receiving peer 20. After task 98, program flow returns. Tasks 96 and 98 may be used to control or program appliances from a PDA or other device which may have enhanced user input capabilities.

Procedure 92 performs task 100 to provide user output capability for any service-receiving peer 20 of network 22 through an established service coupling. During task 100, the service-providing peer 20 receives data generated from the service-receiving peer 20 over the service coupling and annunciates the data at an output device in its I/O section 46 (FIG. 2). The data may be annunciated audibly, visibly, or in any other format(s). Task 100 may be used to annunciate data collected in a portable peer 20 at a non-portable annunciating device. Alternatively, task 100 may be used to annunciate data generated by a stationary appliance with limited I/O capability at a portable annunciating device. After task 100, program flow returns.

Procedure 92 performs control appliance process 102 to support the controlling of appliances. Tasks 104, 106 and 108 of process 102 are performed to program an appliance peer 20 with personalization data 52 (FIG. 2). During task 104, a service-providing peer 20 receives personalization data 52 from the coupled, service-receiving peer 20 using the service coupling. Next, task 106 translates the network compatible personalization data 52 into a format suitable for the specific appliance to be programmed with personalization data 52. Not all personalization data 52 available in a service-receiving peer 20 needs to be applicable to all appliances. Thus, task 106 uses the portion of personalization data 52 that applies to the specific appliance. After task 106, task 108 causes the appliance to be programmed with the translated personalization data 52. After task 108, program flow returns.

Tasks 110, 112, 114, 116 are performed to allow a user to easily control an appliance. These tasks can be performed on a PDA, for example, which has a display and user input capability exceeding the user I/O capabilities typically found on appliances. In this case, an appliance is a service-receiving peer 20 while the PDA is a service-providing peer 20. During task 110, the service-receiving peer 20 uploads an appliance control computer program to the coupled service-providing peer using the service coupling. Next, during task 112, service-providing peer 20 executes the just-uploaded computer program. Task 112 causes the service-providing peer 20 to become configured to specifically provide a desirable user interface for the specific appliance being controlled. Next, during task 114 control data are received at the service-receiving peer 20 over the service coupling. Control data, originating from user input, are supplied through the control computer program being executed on the service-providing peer 20. Task 116 controls the subject appliance in accordance with the control data received in task 114. After task 116, program flow returns.

EXAMPLE I

Figure 11:
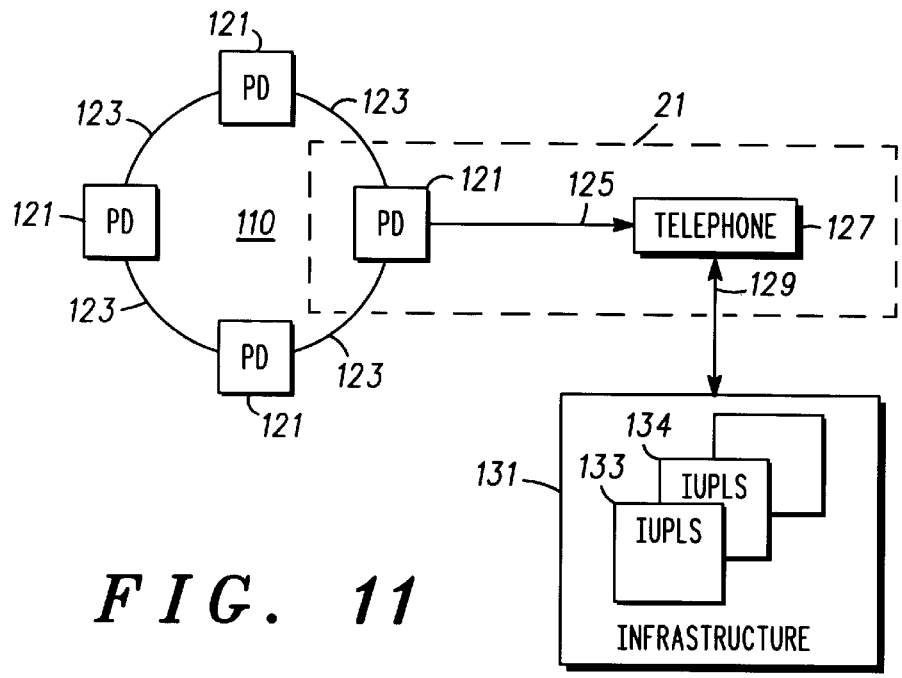
FIG. 11 is a block diagram illustrating relationships between a personal area network, a communications device and an external infrastructure.

FIG. 11 is a block diagram illustrating relationships between personal area network 120, communications device 127 and external infrastructure 131. Personal area network 120 comprises personal devices 121 interlinked via, for example, RF interconnections, represented as links 123. Personal area network 120 is linked to communications device 127 via RF link 125 and in turn via link 129 to external infrastructure 131 comprising, in this example, personalized records describing an individual user's preferences, location and/or statistics (IUPLS 134), or a roaming user's preferences of location, local telephone number, and statistics (RUPLS 133). Each of personal devices 121 and telephone 127 is equipped with a bi-directional RF linkage device such as RF linkage device 135 of FIG. 12.

Figure 12:
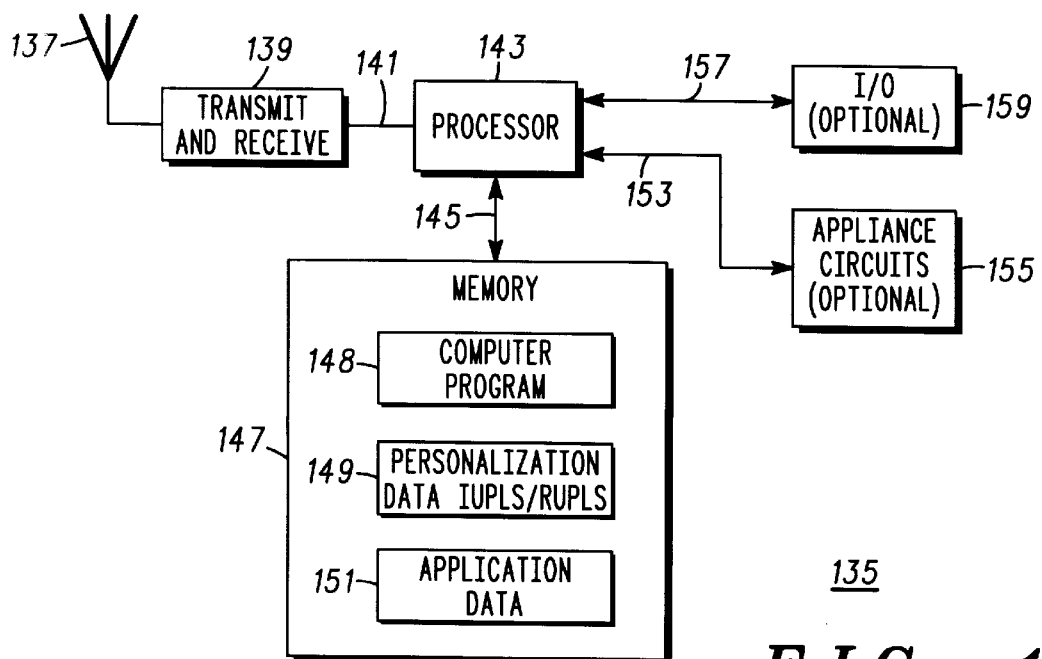
FIG. 12 is a block diagram of an exemplary peer communications and control device.

FIG. 12 is a block diagram of exemplary peer communications and control device 135, analogous to that of FIG. 2. Control device 135 includes an antenna 137 coupled to T/R module 139, a processor 143, a memory 147, an optional I/O device 159, and optional appliance circuits 155, which are analogous to antenna 36, transmit and receive section 38, processor 40, memory 42, optional I/O section 46 and optional appliance circuits 48 of FIG. 2, respectively. Optional gateway interface 44 of FIG. 2 may be a separate element, as shown in FIG. 2, or may be included under the aegis of optional I/O device 159, as in the system illustrated in FIG. 12. When present, optional I/O device 159 is linked to processor 143 via link 157 while optional appliance circuits 155 are linked to processor 143 via link 153. Processor 143 couples to T/R module 139 via link 141 and to memory 147 via link 145. Memory 147 includes computer program(s) 148, personal data 149 including IUPLS 133 and RUPLS 134, and application data 151. Application data 151 includes device configuration preferences, network topologies, and the like.

Appliance circuits 155 or 48 (FIG. 2) are adapted to interface to control systems associated with a given appliance. These may be included with the appliance when manufactured or appliance circuits 155 or 48 may be adapted to retrofit an appliance that was not manufactured with a personal networking capability. In either case, memory 147 includes data relevant to control of the appliance, such as internal commands, capabilities, interface protocol, and interface commands. In addition, memory 147 includes information allowing appliance circuits 155 or 48 to program and assert a measure of control over the appliance through commands generated by processor 143 in response to information coupled via antenna 36 or 137. Memory 147 is configured to allow data to be updated as circumstances change. An example of a transaction which causes memory 147 to be updated is described in FIG. 13.

By way of example, T/R module 139 (analogous to transmit and receive module 38, FIG. 2) is a DTR-9000 from Radio Design Group, Inc., 3810 Almar Road, Grants Pass Oreg. 97527-4550. Processor 143, memory 147 and optional I/O device 159 are included in a MPC821 microprocessor available from Motorola of Phoenix Ariz., Austin Tex. and Schaumburg Ill.

Figure 13:
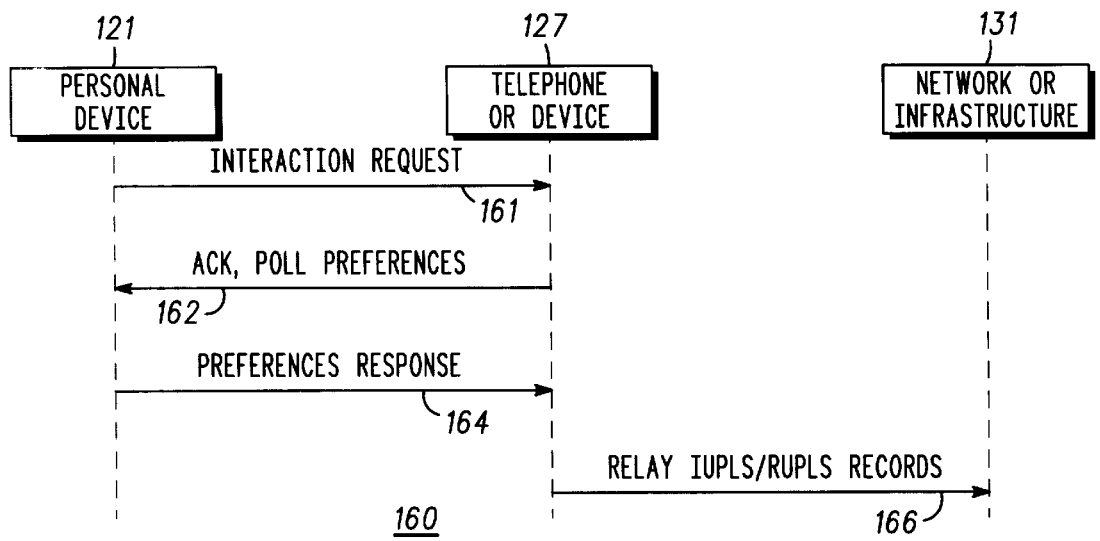
FIG. 13 is a diagram illustrating a sequence of data exchange messages between the devices of FIG. 11.

FIG. 13 is a diagram illustrating sequence 160 of data exchange messages between the devices of FIG. 11. Personal device 121 of FIG. 11 (analogous to device 20, FIG. 1) initiates the exchange of data with interaction request 161 directed to telephone 127, for example. Telephone 127 acknowledges interaction request 161 with message 162 and polls personal device 121 for preferences with message 162. Personal device 121 then provides preferences response 164 to telephone 127. Telephone 127 then sends message 166 to network or infrastructure 131 including location information and/or IUPLS 133 and/or RUPLS 134, depending on the nature of the data contained in preferences response 164. This type of interchange could occur when a person enters an area and the person's personal communications device begins to interact with a network of appliances that are relatively fixed in some environment. For example, a client who walks into a doctor's office might have a personal digital assistant that interacts with the appliances in the doctor's office to tell the infrastructure where the person is and to have all calls to the person's home and/or office telephone rerouted to the doctor's office phone. This type of transaction is described below with reference to FIG. 14 and associated text.

Figure 14:
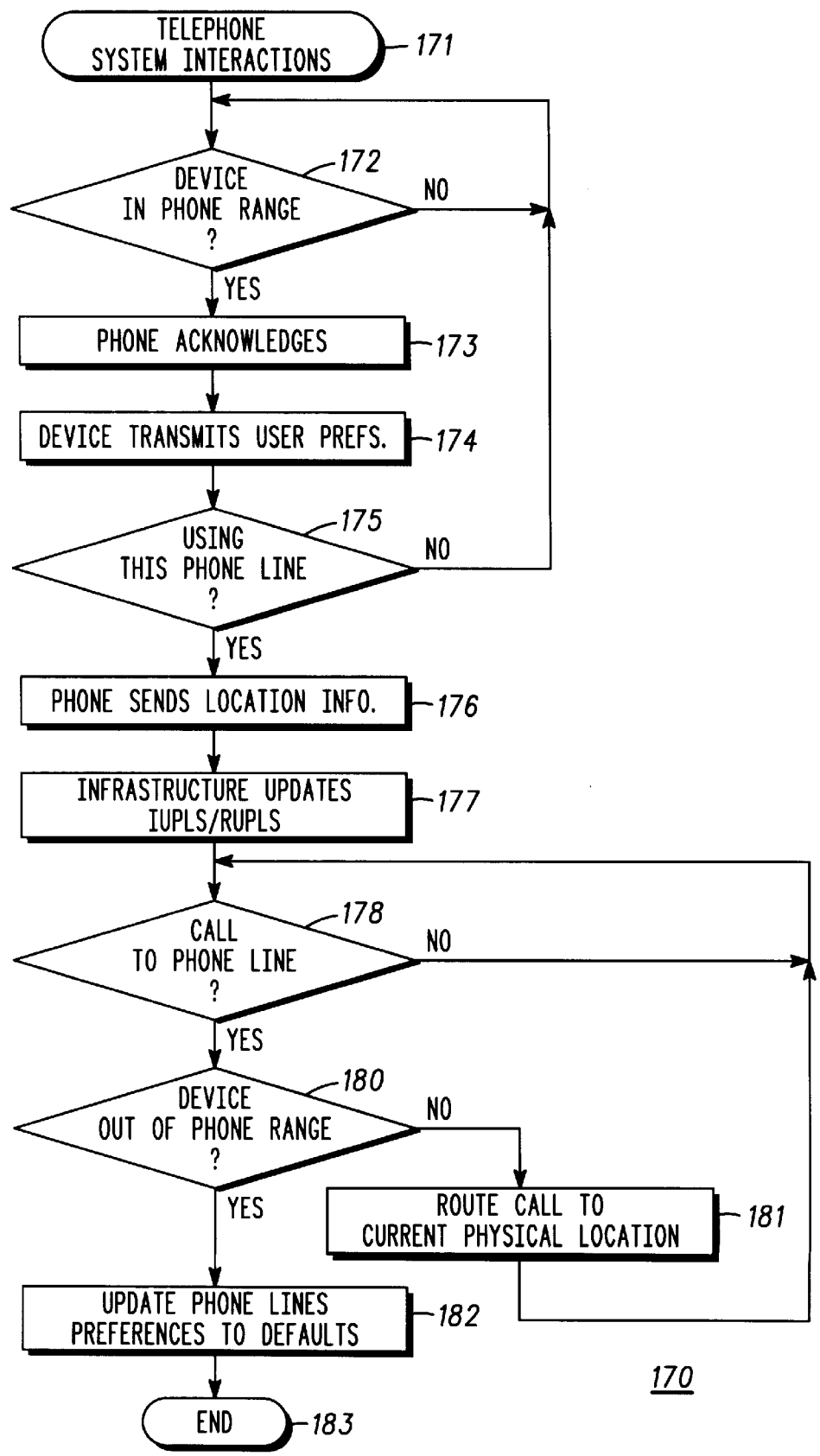
FIG. 14 is a flow chart outlining steps in the data communications sequence of FIG. 13 for the devices of FIG. 11.

FIG. 14 is a flow chart of process 170 outlining steps in data communications sequence 160 (FIG. 13) for devices 121, 127 (FIG. 11). Process 170 begins with telephone system interactions 171 with telephone 127 (FIG. 11). When process 170 determines that personal device 121 is in range of phone 127 (block 172), telephone 127 acknowledges that personal device 121 is in range (block 173). In return, personal device 121 transmits user preferences (block 174).

When personal device 121 indicates that the line coupled to telephone 127 is not to be used to transmit data or when personal device 121 is determined (block 172) not to be in range of phone 127, control loops back to block 172. When personal device 121 indicates (block 175) that the line coupled to phone 127 is to be used to transmit or receive data, phone 127 sends location information (block 176) to infrastructure 131. The location information describes the location and telephone number(s) for telephone 127, which includes the location of the user because the user is within range of telephone 127. This information is used to update RUPLS 134 when telephone 127 is not the user's phone or in the user's usual haunts and is used to update RUPLS 134 and IUPLS 133 when the user returns home or to the office. When this phone line is not to be used, for whatever reason, program control loops back to block 172. Additionally, when physical motion of the personal device 121 or when another personal device 121 through which personal device 121 is establishing coupling to the network moves out of range, the program steps through decision block 180 to update preferences to defaults (block 182) or to set them to those from another personal device 121 that is in range of the television.

When a call is made to the user's home or office phone (block 178), the call is routed to the user's current location (block 181) provided that the system determines that the user is still within range of telephone 127 (block 180). When it is determined that the user is no longer within range of telephone 127 (block 180), telephone 127 updates the phone line preferences to default values (plus any deriving from interactions that telephone 127 may be having with other users). Process 170 then ends (block 183).

EXAMPLE II

Figure 15:
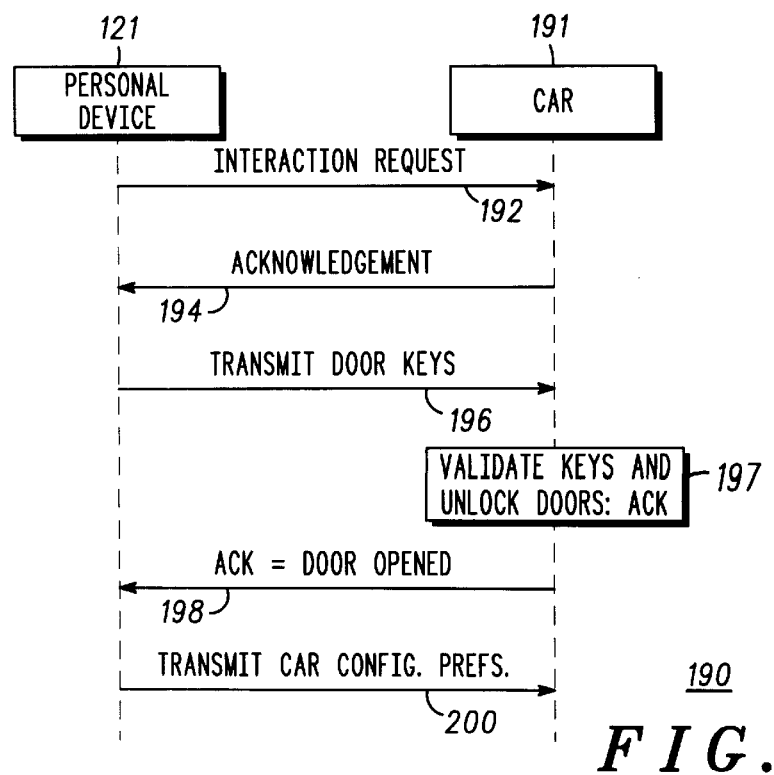
FIG. 15 is a diagram illustrating a sequence of data exchange messages between another set of devices.

FIG. 15 is a diagram illustrating sequence 190 of data exchange messages between another set of devices 121, 191. In this example, personal device 121 is carried by a user who is approaching, for example, rental car 191, which is equipped with and controlled by a peer analogous to personal devices 121 (FIG. 11), 135 (FIG. 12) or peers 20 (FIG. 1) and 21 (FIG. 2). Personal device 121 transmits interaction request 192. Car 191 transmits acknowledgment 194 back to personal device 121 via hardware 135 (FIG. 12) and 21 (FIG. 2). Personal device 121 transmits electronic codes, i.e., car keys, unique to car 191 to hardware 135 or 21 in car 191. Car keys were previously loaded into personal device 121 in the course of making arrangements for rental of car 191. Car 191 then validates the car keys via hardware 135 and 21, unlocks the doors, and acknowledges receipt of the car keys (block 197), again via hardware 135 and 21.

Acknowledgment message 198 from hardware 135 and 21 of car 191 to personal device 121 coincides with the opening of the car door by the user. Personal device 121 transmits car configuration preferences to hardware 135 and 21 of car 191 in message 200. Car 191 then accommodates as many of these preferences as possible, by setting seat position and height, mirror adjustments, lighting levels, and personal device adjustments such as setting a radio to a desired station. These operations are described in more detail with reference to FIG. 16.

Figure 16:
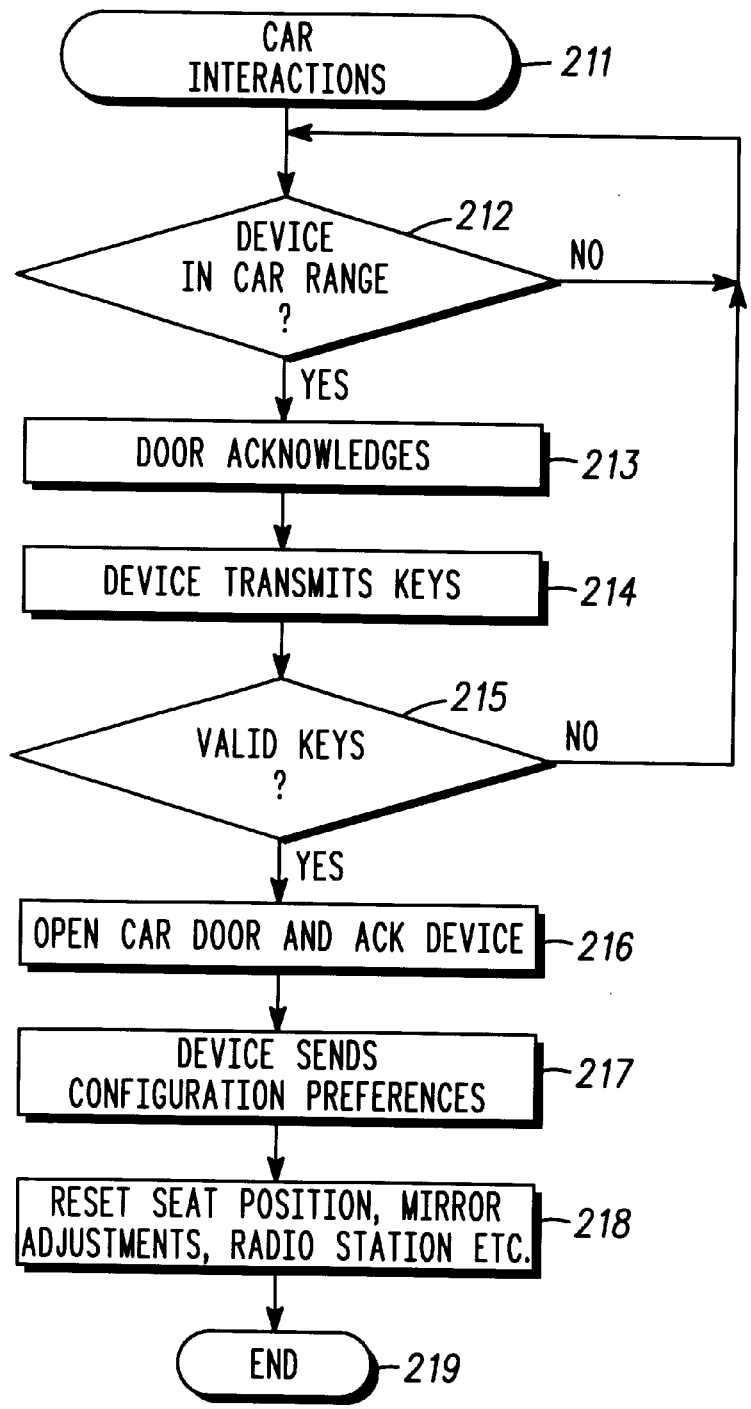
FIG. 16 is a flow chart outlining steps in the data exchange sequence of FIG. 15.

FIG. 16 is a flow chart of process 210 outlining steps in data exchange sequence 190 of FIG. 15. Process 210 begins when personal device 121 forms a personal network with car 191 (block 211) via hardware 135 (FIG. 12) and 21 (FIG. 2). When it is determined in step 212 that personal device 121 is in range of hardware 135, 21, an acknowledgment signal is sent (block 213) from hardware 135, 21 of car 191 and personal device 121 transmits car keys (block 214). Car 191/hardware 135, 21 determine when the car keys are valid (block 215).

When personal device 121 is not in range of hardware 135, 21 of car 191 or when the car keys are determined not to be valid for this car 191 (block 215), program control loops back to block 212. When the car keys are determined to be valid (block 215), car 191 unlocks and opens the car door and sends an acknowledgment to personal device 121 (block 216) via hardware 135, 21. Personal device 121 then sends configuration preferences to hardware 135, 21 of car 191 (block 217). Car 191 then accommodates these preferences as described above in conjunction with text associated with FIG. 15 and process 210 ends (block 219).

EXAMPLE III

Figure 17:
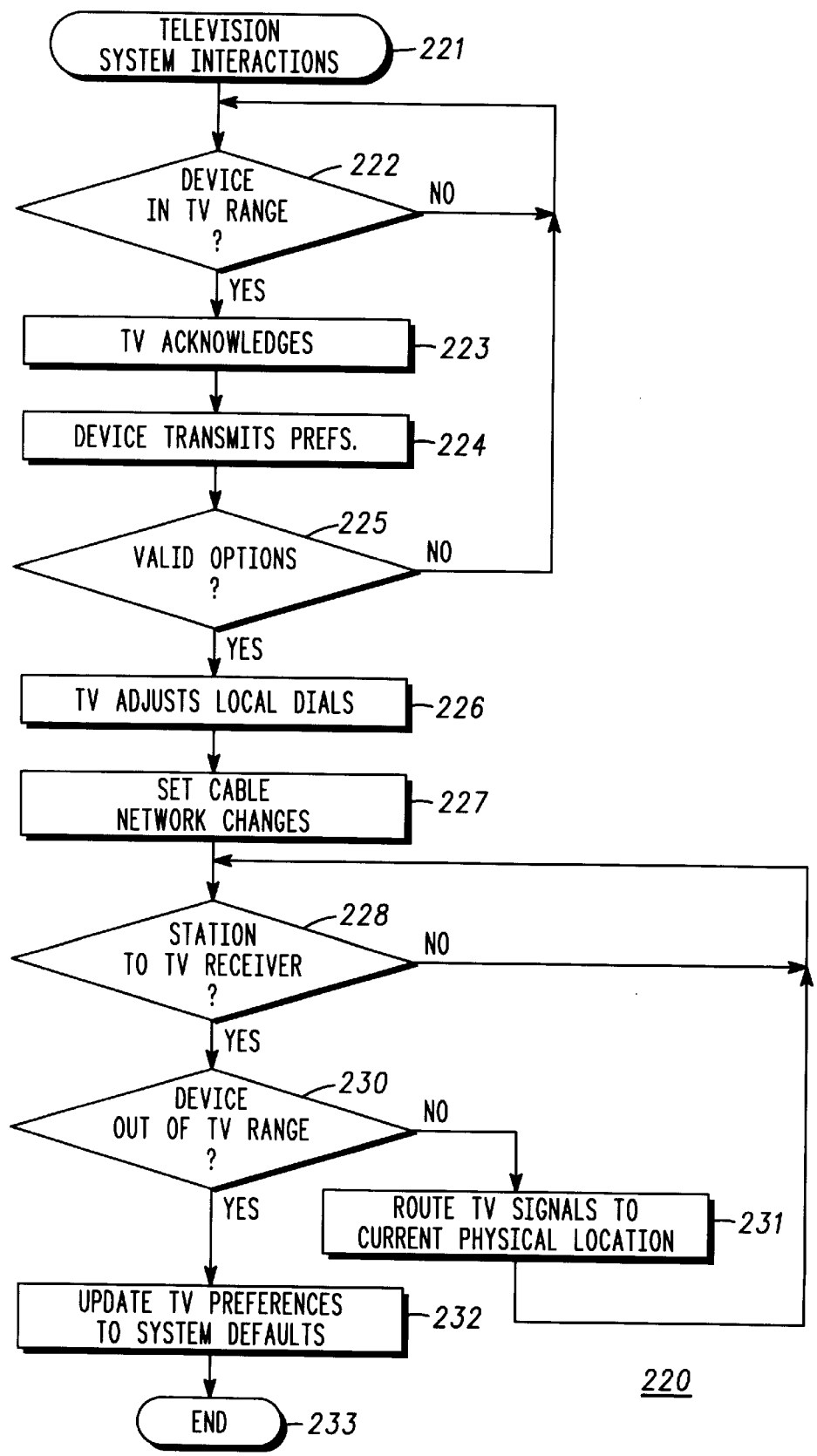
FIG. 17 is a flow chart outlining steps in a data exchange sequence between yet another set of devices.

FIG. 17 is a flow chart of process 220 outlining steps in a data exchange sequence between yet another set of devices. Process 220 begins (block 221) when it is determined (block 222) that personal device 121 comes in range of a television (e.g., by a periodic "pinging" process described elsewhere). The television acknowledges (block 223) presence of personal device 121. Personal device 121 transmits (block 224) preferences such as channel or network, volume level, contrast, and the like. When the options or preferences are not valid options for this television or when personal device 121 is not in range of the television, control loops back to block 222. The television otherwise accommodates these preferences (block 226) and sets any network changes that are transmitted (block 227).

In response to messages sent in conjunction with the tasks of block 227, the system routes the desired station to the television receiver (block 228). Additionally, when personal device 121 is moved out of range or when another personal device 121 through which personal device 121 is establishing coupling to the network moves out of range of the television, the program steps through decision block 230 to update TV preferences to system defaults (block 232) or sets the preferences to those from another personal device 121 that is in range of the television. Optionally, the chosen TV signals are routed to the TV (block 231) and displayed. Process 220 then ends (block 233).

EXAMPLE IV

Figure 18:
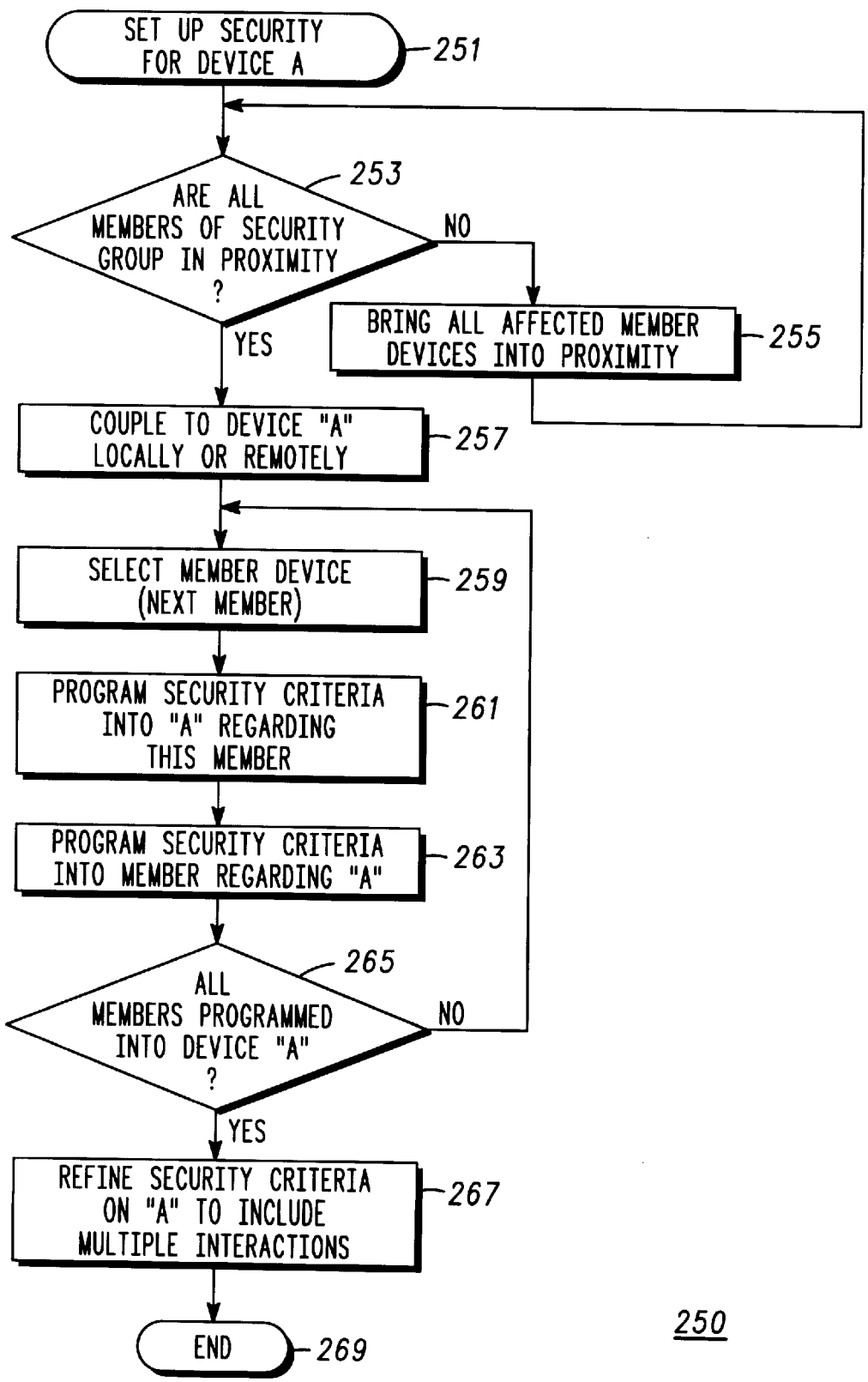
FIG. 18 is a flowchart outlining a procedure for the introduction of a new appliance into an established personal area network.

FIG. 18 is a flowchart outlining procedure 250 for the establishment of security criteria for device A. Procedure 250 assumes that (i) the person programming device A has authority to do so based on an ownership code or password and (ii) the person programming each of the member devices has the authority to do so based on the ownership code or password. A member device is an electronic device that expects to be in proximity with device A. Rules governing the proximity relationship can be determined by the person having authority to do so. For example, the proximity relationship could limit either the number of communication relays or the physical distance separating the member devices from device A, or both. Each communication can be tagged with a relay count, i.e., a count that is incremented each time a message passes from one device 121 to another device 121.

When devices 121 come into proximity, they detect each other (see FIG. 1 and associated text). At this point, they could potentially network together but they have not yet done so. After a short negotiation, each device 121 decides whether it wants to network with the other device 121. When both devices 121 agree to participate in a dialog, devices 121 couple ("bond"), i.e., are in data communication. Note that a dialog between two devices 121 beyond the initial negotiation may never occur, but the two devices 121 are considered to be coupled because they know of each other's existence, they have a mechanism established for communication, and they have agreed that they can participate in a dialog.

However, devices 121 that are in proximity and detect each other may elect not to network or bond. This situation occurs when two devices 121 are owned by two different individuals and each device 121 is programmed to dialog with other devices 121 owned by the same individual. Thus, peer devices 121 can selectively bond to other devices 121 in proximity while rejecting other peer devices 121 based on their unique ownership identification code. This technique serves the situation where a first person has devices 121 in an apartment where they are in proximity to another person's devices 121 in another apartment. Even though these devices 121 can detect each other, they will not network together if they have been programmed to only network with other devices 121 owned by the same individual. Of course, other authorization schemata exist, e.g., devices 121 can be networked together and separated into disjoint sets called security sub-groups.

Procedure 250 begins (block 251) when the security criteria for a specific device 121 ("device A") is to be programmed into device A. In the case where devices 121 do not have intrinsic input capabilities, this programming may be effected via an RF link, hardwired link, or optical link. At the opposite end of the chosen link there is an interface device such as a keyboard, voice recognition system, or similar device, for programming device A. The first step determines (block 253) when all devices 121 of a specific security group are in proximity or in data communication with device A. When this is not the case, the program may either strive to effect communication with the available network (dashed line) or wait until the missing member devices 121 are brought into proximity/data communication with the network (block 255).

In either case, the coupling step (block 257) precedes programming device A with information that may desirably contain the security needs regarding other devices in device A's security group (blocks 259–265). In particular, a member device is selected (block 259), security information relevant to member device 121 is programmed into device A (block 261), and security information relevant to device A is programmed into member device 121 (block 263). Additionally, device A may be programmed to be recognized by one or more of the following: a security group unit serial number, a unique security group identifier that identifies the owner, a physical address and/or a telephone number for the usage site, and the like.

Security criteria for member devices 121 may involve specifications that are both inclusive and exclusive. For example, an inclusive specification might be "when I no longer see device B then I am missing". An exclusive specification might be "When I see device D then I am missing". Desirably, when all member devices 121 in the security group have been programmed with each other's data, security information with respect to device A is refined to include multiple interactions (block 267) and program 250 ends (block 269). For example, suppose that device A's security group includes three devices named B, C, and D. In block 267 the security criteria contained within device A could be refined with inclusive statements like "When any two of the devices B, C, D are absent for two hours or more then I am missing". The criteria could also be refined with exclusive statements like "When I see devices C and D within three minutes of each other then I am missing".

When it is not the case that all member devices 121 have been programmed with each other's data, control reverts to block 259, another member device 121 is selected and the steps of blocks 259–265 are repeated until all member devices 121 of the security group have been programmed.

Note that when a security group is established for device A, the security group exists with respect to device A only. For example, suppose device A has one member device B in its security group. On the other hand, device B may define a security group of its own, e.g., with device C as its member. This does not, however, establish any implied relationship from B to A, nor between A and C. So just because B is a member of A's security group does not imply that A is a member of B's security group, nor does it imply that C is a member of A's security group. This scheme allows for great flexibility in the implementation of the present invention.

Figure 19:
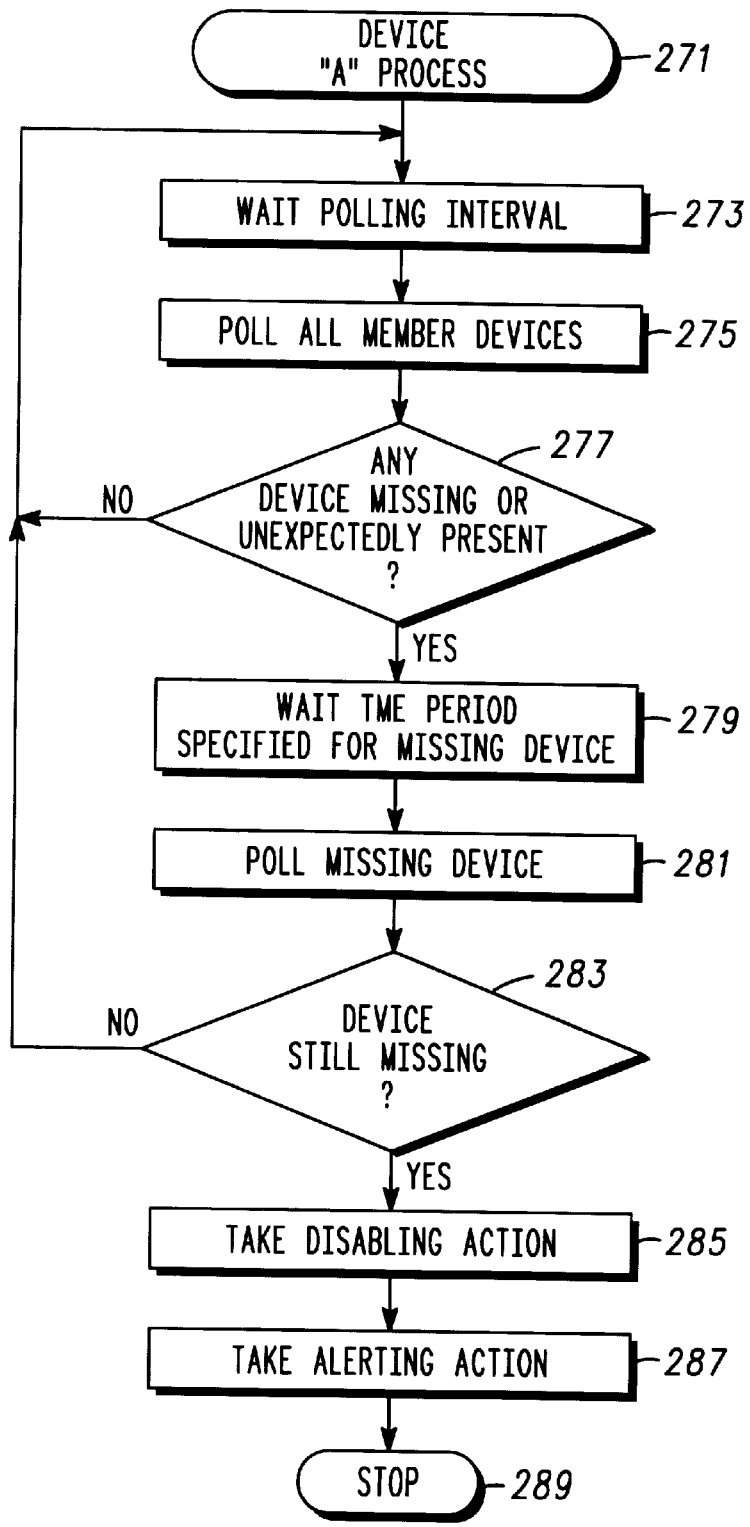
FIG. 19 is a flowchart outlining a polling/alarm procedure for use in a personal area network.

FIG. 19 is a flowchart outlining polling/alarm procedure 270 for use in conjunction with a security group. Procedure 270 begins (block 271) by device A waiting a prescribed polling interval (block 273). The polling interval may be specific to the nature of device A and may vary from a very short (e.g., five minutes) polling interval in some cases to relatively long polling intervals for other types of devices (e.g., a day).

Following the polling interval wait, device A may poll all members 121 in the security group (block 275) to determine whether or not they are in proximity. When this has been accomplished, device A determines (block 277) when any members 121 are missing from the security group and when any devices are unexpectedly present. When no members 121 are missing from the security group and no devices 121 are present that are not expected, program control passes back to block 271/273 and steps outlined in blocks 273–277 repeat at appropriate intervals.

When it is determined (block 277) that a member 121 is missing from the security group or that an unexpected member 121 is present, device A waits (block 279) a specified interval for the return of the missing device or for removal of unexpectedly present devices and then polls (block 281) the missing or unexpectedly present member. When the member 121 is determined (block 283) not to be actually missing, control passes to block 271/273 and steps outlined in blocks 273–277 are repeated. When the member 121 is determined (block 283) to actually be missing or unexpectedly present, affirmative action such as taking steps to disable the device (block 285) and/or raise an alarm (block 287) is taken, prior to procedure 270 ending (block 289).

The alarm condition may include having device A (i) shut down (block 285), (ii) attempt to place a call to police for help (block 287), (iii) attempt to place a call to a central appliance authority for help or for an override code (block 287), or (iv) interact with neighboring devices (block 287) in order to attempt to place a call per (ii) or (iii). Process 270 then ends. When an ordinary telephone line is used to effect the call, the physical address is usually determined from the identity of the line on which the call is placed.

EXAMPLE V

Figure 20:
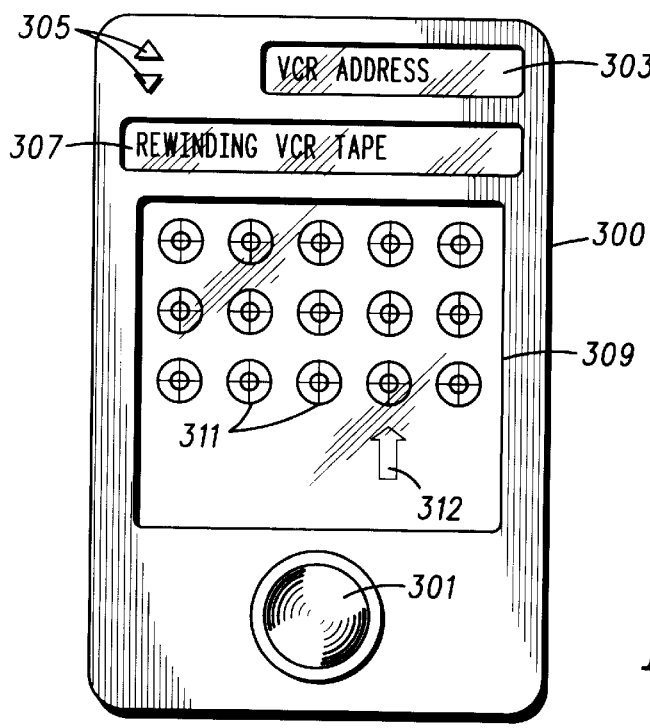
FIG. 20 is a simplified exemplary plan view of a remote controller for a video cassette recorder in accordance with the teachings of the present invention.

FIGS. 20 through 25 address application of concepts previously discussed to the setting of a remote controller for an appliance. FIG. 20 is a simplified exemplary plan view of a first preferred embodiment of remote controller 300 adapted for use with a video cassette recorder. Controller 300 includes three displays 303, 307, and 309 with display 303 showing address notifications, display 307 showing those commands that will be transmitted to the device controlled by controller 300, and display 309 showing icons 311 corresponding to available commands. Cursor 312 indicates which of icons 311 is selected with display 307 providing a textual description or identification of the selected command. Track ball 301 allows an operator to move cursor 312 between different icons 311 in order to select a specific icon 311. Buttons 305 allow switching of addresses displayed in display 303.

Figure 21:
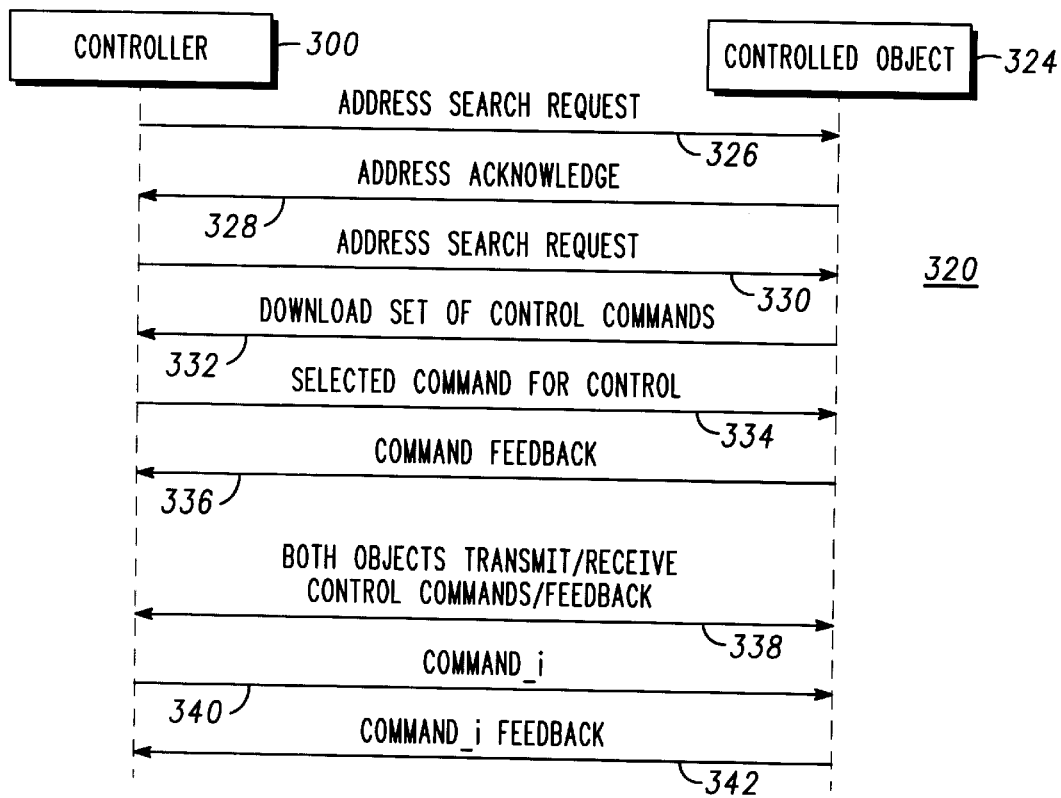
FIG. 21 is a diagram illustrating a sequence of data exchange messages between a controller and a controlled object.

FIG. 21 is a diagram illustrating sequence 320 of data exchange messages between controller 300 and controlled object 324. Process 320 initiates with address search request 326 going from controller 300 to controlled object 324 via devices such as peer communications and control device 135 (FIG. 12) or hardware 21 (FIG. 2) in each of controller 300 and controlled object 324. Address acknowledgment 328 informs controller 300 that controlled object 324 is in data communication with controller 300. Controller 300 sends request 330 that a command set for controlled object 324 be downloaded.

Controlled object 324 then downloads (download "set of control commands" 332) a set of such commands to controller 324. At this point, controlled object 324 has sent a set of commands/actions that it can perform at the behest of controller 300. Those commands selected by the user of controller 300 are sent (selected command(s) for control 334) to controlled object 324 and controlled object 324 provides command feedback 336, including at least an acknowledgment that the command or commands were received. Both controllee 324 and controller 300 send and receive commands and feedback 338 as the user sets the preferences chosen from the list previously sent in download "set of control commands" 332 and this continues through to a last, or $i^{th}$, command (command$_{13}$ i 340) and feedback (command$_{13}$ i feedback 342).

Figure 22:
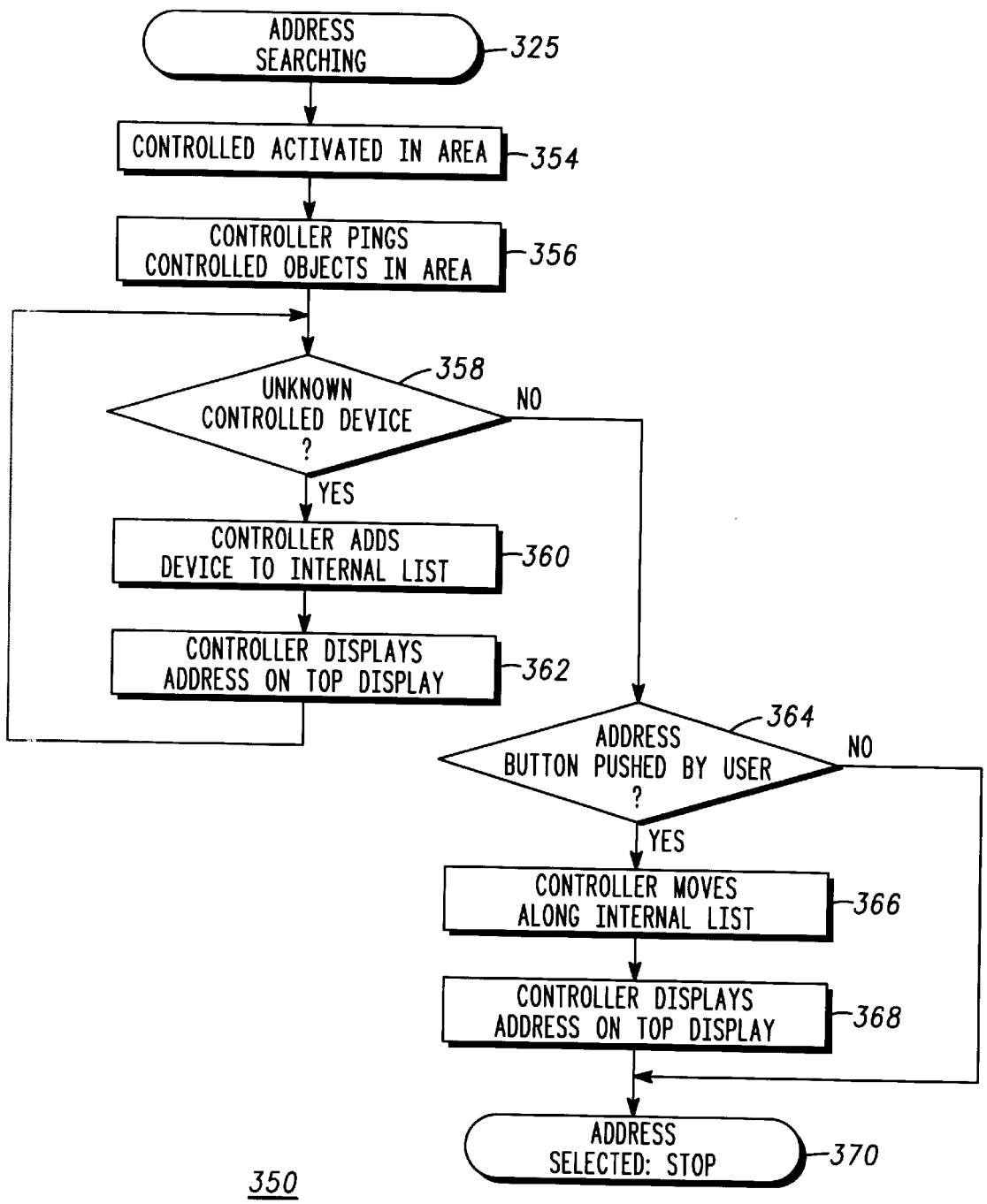
FIG. 22 is a flow chart illustrating a sequence of steps in a process for selecting an address.

FIG. 22 is a flow chart illustrating a sequence of steps in process 350 for selecting an address. Process 350 begins (block 325) when the user initiates address searching for an appliance. Controller 300 (FIGS. 20, 21) is activated in an area that allows interaction of controller 300 with a personal area network (block 354) and controller 300 "pings", or sends interrogative messages to, controlled objects 324 within that personal area network (block 356). When the responses indicate (block 358) that a controlled object 324 unknown to controller 300 is part of, or in communication with, the personal area network, controller 300 adds (block 360) the new controlled object 324 to an internal list (i.e., stores data in memory 42 of FIG. 2 or memory 147 of FIG. 12). Controller 300 also displays (block 362) an address corresponding to new controlled object 324 on display 303 (FIG. 20) and then iterates steps 358-362 until no new controlled objects are encountered within the personal area network.

When controller 300 determines (block 364) that an address button has been pushed or selected by the user, controller 300 increments (i.e., displays sequentially-listed addresses) an internal list of addresses (block 366); otherwise, process 350 ends (block 370). After incrementing sequentially-listed addresses (block 366), controller 300 displays (block 368) an address on display 303 (FIG. 20). The steps outlined in blocks 364–368 are repeated until the user stops incrementing and displaying addresses.

Figure 23:
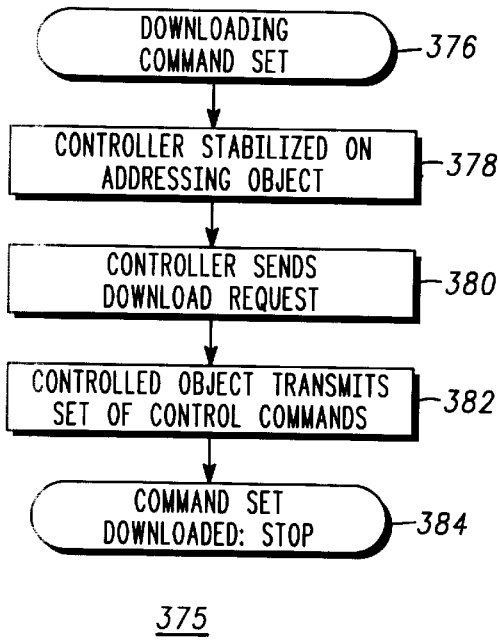
FIG. 23 is a flow chart illustrating a sequence of steps in a process for downloading a command set.

FIG. 23 is a flow chart illustrating a sequence of steps in process 375 for downloading a command set. Process 375 begins (block 376) with controller 300 (FIGS. 20, 21) stabilized on addressing controlled object 324 (block 378), e.g., when the user stops incrementing addresses in steps 364–368 of process 350 (FIG. 22). Controller 300 then sends a download request (block 380) to controlled object 324 (see also download "set of control commands" 332 of FIG. 21). Controlled object 324 downloads a set of control commands to controller 300 (block 382). When controller 300 determines (e.g., from an end of file instruction or a timeout) that the command set has been downloaded, process 375 ends (block 384).

Figure 24:
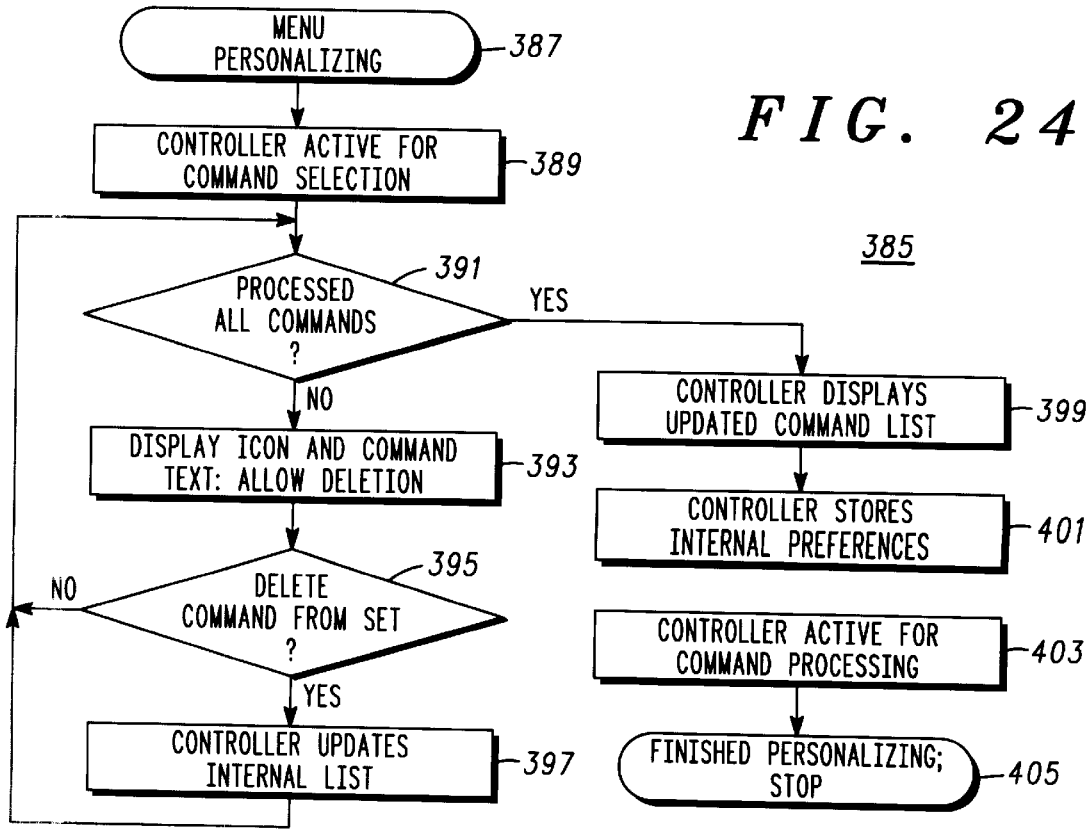
FIG. 24 is a flow chart illustrating a sequence of steps in a process for personalizing choices in a menu.

FIG. 24 is a flow chart illustrating sequence 385 of steps in a process for personalizing choices in a menu of commands for controlling controlled object 324. Process 385 begins (block 387) with controller 300 active for command selection (block 389) (i.e., after having completed items 332–342 of FIG. 21, process 375 of FIG. 23). Controller 300 determines (block 391) when all commands have been processed and passes control to block 399. Otherwise, controller 300 displays (block 393) a suitable icon 311 (FIG. 20) on display 309 and command text on display 307 and allows deletion of a command from the command set by the user.

When controller 300 determines (block 395) that the user wants to delete a command, controller 300 updates its internal list (block 397) of commands and steps 391–397 are repeated until it is determined that all commands have been processed (block 391). When controller 300 determines (block 395) that the user does not want to delete a command, control passes to block 391 and steps 391–397 are repeated until all commands have been processed (block 391). When controller 300 determines that all commands have been processed (block 391), controller 300 displays an updated command list (block 399) on displays 307/309 and stores (block 401) user preferences internally (e.g., in memory 42 of FIG. 2, or memory 147 of FIG. 12). Controller 300 is then active for command processing (block 403) and process 385 ends (block 405) with the internally-stored command set having been personalized to the user's preferences.

Figure 25:
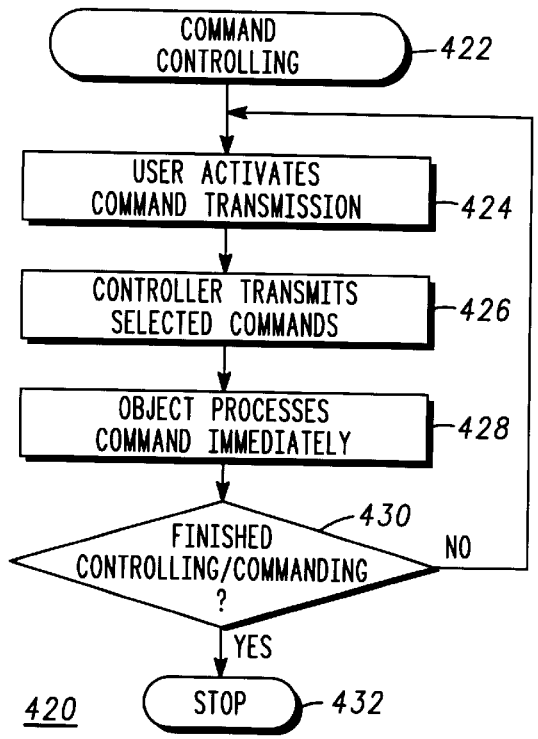
FIG. 25 is a flow chart illustrating a sequence of steps in a process for effecting a command from a remote controller.

FIG. 25 is a flow chart illustrating a sequence of steps in process 420 for effecting a command by controlled object 324 when the command is supplied from remote controller 300 (FIGS. 20, 21). Process 420 begins (block 422) with the user activating (block 424) transmission (block 426) of a command from controller 300 to controlled object 324. Controlled object 324 processes the command (block 428), preferably immediately. When the controlling and commanding process is determined to be complete (block 430), process 420 ends (block 432). When it is determined that the controlling and commanding process is not complete (block 430), process 420 loops back to block 424 and the steps outlined in blocks 424–430 are repeated.

EXAMPLE VI

Personal data, such as those pieces of information that one might carry in their wallet or purse, are digitized (or their functional equivalent is represented in a digital format) and carried with one in a device that may have a form factor similar to a wallet. Various form factors will emerge, but this device is carried instead of a traditional wallet in whatever physical form is useful or desirable. This means that it preferably fits into a man's pocket or a woman's purse. The device is able to interact with other short-range wireless devices in close proximity observing the same protocol and thereby transact business. For example, the counterpart to this device during a transaction might be a "network-compliant digital wireless cash register". This device, an example of a personal data storage and transaction device, is the personal database that one might carry as the focal point of a personal area network and performs functions that would collectively lend themselves to the "electronic wallet". Alternatively, a cellular phone of personal pager can be modified to be the focal point of a personal area network the communicates to other devices based on proximity to those devices.

The present invention comprises at least some of the following components:

1) The basic peer-to-peer communication module as detailed in FIGS. 2 and 12 and associated text. Some optional portions of a peer-to-peer communication node that are unique to personal transaction and storage device 407 (FIGS. 26–29) are listed below.

2) A user interface permitting (i) data entry and (ii) data display. Data entry could be accomplished via a number of well-known techniques including a physical keyboard, handwriting recognition, character recognition, voice and/or word recognition and/or a virtual keyboard with a point-and-click-mouse-type interface. The data display could be accomplished via a number of well-known techniques including a virtual display or a graphics display unit.

3) Memory for database capabilities.

In addition to the hardware capabilities listed above, the following functional capabilities are usefully present in personal transaction and storage device 407:

1) Generalized database capabilities including storage of data, placement of data, retrieval of data and navigation through data. Such capabilities can refer to data being stored locally on personal transaction and storage device 407 or to data stored remotely on another device but accessed via personal storage and transaction device 407.

2) The ability to select specific data from the database and transmit it to one or more third parties over a wireless link.

3) The ability to accept data being transmitted by a third party and to save that data in the database of personal transaction and storage device 407.

4) Capability for storing and broadcasting an identifier or indicator of the person's presence or location relative to the data transactions, e.g., capability for storing and broadcasting information indicating that the owner of this device is currently present with the device.

5) The ability to accept command codes over the wireless link (e.g., link 26, FIG. 1) and to execute the program/command codes locally on the unit (e.g., 324, car 390 etc.).

6) The ability to accept control codes from another peer-to-peer communications device 135/121/21 (FIGS. 12, 11, 2), and the ability to remotely control the device using the downloaded control codes.

In one embodiment, portions of the present invention are realized as an integrated circuit for interactively coupling one or more communication nodes in a common network. The integrated circuit includes, in combination, a receiver for receiving input data, a transmitter for transmitting output data (collectively referenced as 38 in FIG. 2) and processor 40. Processor 40 is coupled to receiver/transmitter 38 for interactively coupling a first common node 135/121/21 to a second common node 135/121/21 (see FIGS. 12, 11, 2 and associated text). Processor 40 includes apparatus for activating communications link 26 between the first and second common nodes 135/121/21 when the first and second common nodes 135/121/21 are within a predetermined distance from each other and when needs and capabilities of the first and second common nodes 135/121/21 overlap.

In this manner, personal transaction and storage device 407 can interact with barcode reading pen 490 (FIG. 33) or other equipment that assists in communications or transactions. For example, communications between buyer 452 (FIG. 30) and merchant 456 can be executed over this type of communications link.

The present invention digitizes information and stores it in a device having the form factor of a wallet. It also includes capacity for moving the information easily from one such device to another over the peer-to-peer wireless short-range link (e.g., link 26, FIG. 1). The present invention can accept command codes that cause its behavior to adapt to the environment. For example, when interacting with an ATM (Automated Teller Machine), the display painted on personal transaction and storage device 407 could become a user interface to the ATM. This is a capability where behavior is not hard-coded into personal transaction and storage device 407 at the time it is manufactured or sold, rather, the behavior is dynamically loaded into personal transaction and storage device 407 based on context and may be erased when the application to which personal transaction and storage device 407 is being put has ceased or finished.

Figure 26:
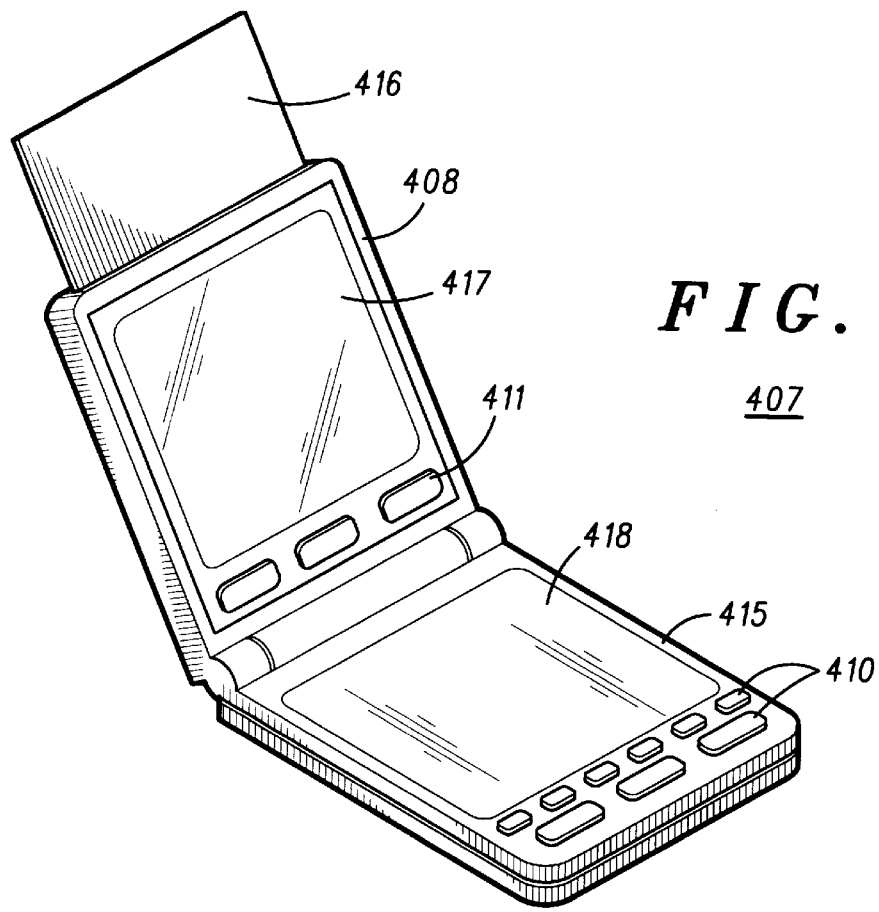
FIGS. 26–29 are a series of sketches of views of a portable, hand-holdable digital device for storing data and effecting transactions.
Figure 27:
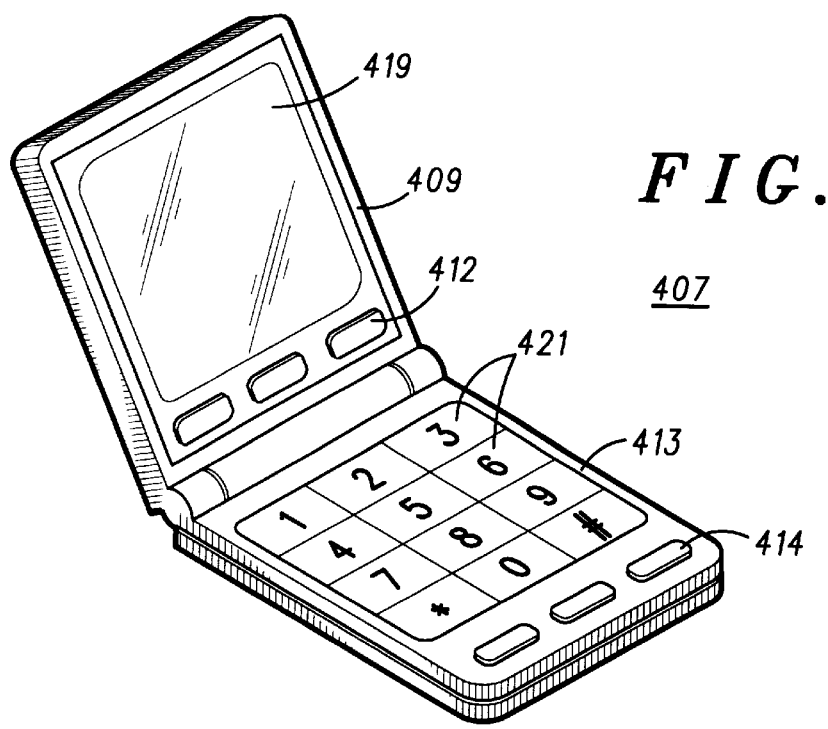
Figure 28:
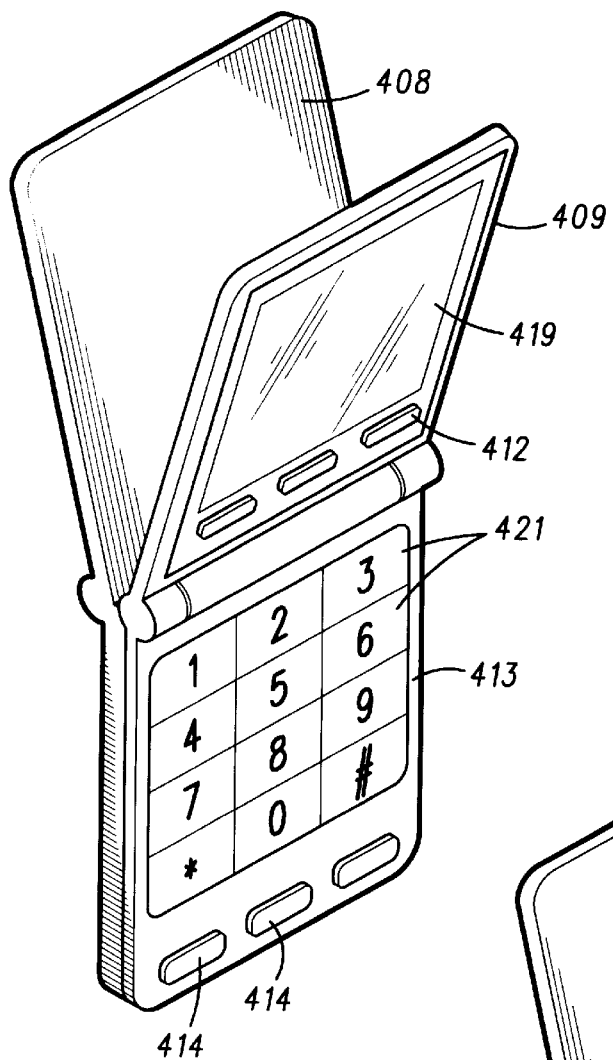
Figure 29:
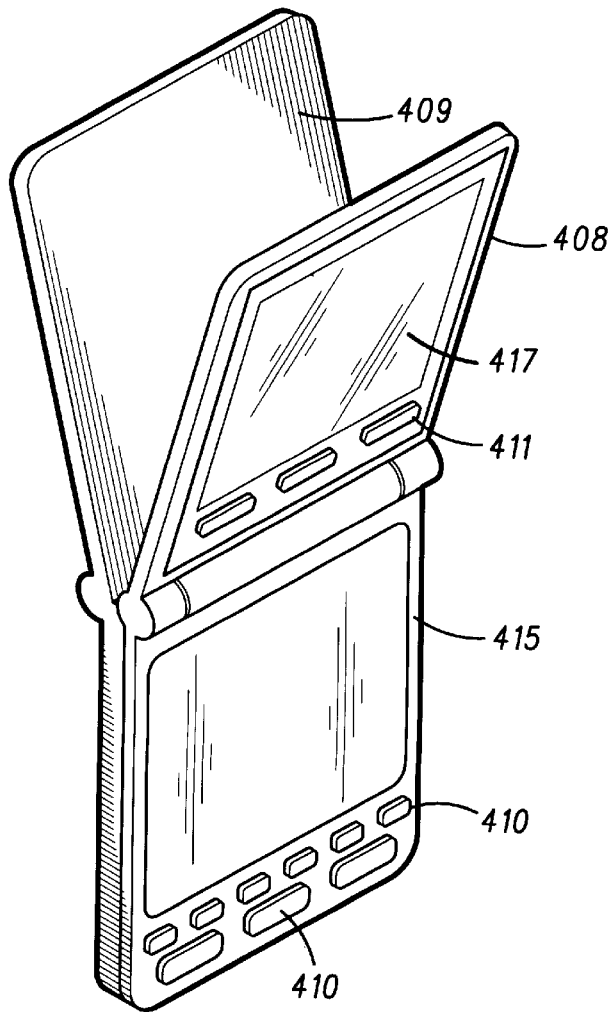

FIGS. 26–29 are a series of sketches of views of portable, hand-holdable digital device 407 for storing data and effecting transactions. FIGS. 26 and 27 are schematic diagrams depicting core functionality on two sides of personal transaction and storage device 407. Personal transaction and storage device 407 optionally contains several folded or hinged layers of display/output-unit panels 408, 409 and soft-key input-unit panels 410, 411, 412, 413, 414. In this fashion, personal transaction and storage device 407 can be unfolded in multiple directions, with each set of display/output-unit panels 408, 409 and soft-key input-unit panels 410, 411, 412, 413, 414 providing functionality in one domain. Examples of two domain fold-outs are shown in FIGS. 28 and 29.

In FIG. 26, top panel or fold-out 408 is used for output displays or hardware-based output-units, e.g., speakers. Bottom panel 418 is used for touch-sensitive screen displays or hardware-based input-units, e.g., buttons 410, track-ball or microphone (the latter two are not illustrated). Below bottom panel 418 is a row of optional buttons 410 that control configurations of the one-sided device functional domain. For example, physical buttons 410 can be located on the bottom to activate or select different soft-key input-units to be displayed on lower panel 418. Distinction between upper panels 408 and lower panels 418 is a simplistic example, particularly applicable to personal transaction and storage device 407 having fold-outs that separate in an upper and lower portion. Some implementations may have a left and right sides in place of, or in addition to, upper and lower.

Top panel 408 also contains optional slide-out unit 416 which can be extended to help create third panel 416 operating within a selected functional domain. For example, third panel 416 can be extended to allow for another input pad used for entering a memo or notes, via handwriting recognition etc.

In a preferred embodiment, panels 408, 409, 410, 411, 412, 413, 414, 415, 416, 417, 418 are touch-sensitive to allow for button selection and/or handwriting entries. Personal transaction and storage device 407 includes peer-to-peer communications node 21, 121 and/or 135 (see FIGS. 2, 11, 12 and associated text) coupled, through wireless communications link 26 (FIGS. 1, 2), with barcode reading pen 490 (see FIG. 33 and associated text, infra), also functioning as a pointing and touch-sensitive-panel-writing element, that also includes peer-to-peer communications node 135/121/21. This coupling enables rapid and automated financial/data transactions through personal transaction and storage device 407. Examples of these barcode pen 490 to personal storage and transaction and storage device 407 interactions are detailed below.

FIGS. 26–29 provide different views of a preferred embodiment of personal transaction and storage device 407. This exemplary configuration includes two functional domains, operating as a personal digital organizer and a telephone. FIG. 26 schematically illustrates personal transaction and storage device 407 with flip-up display 408 on one of two sides, where this side operates as a personal digital organizer. The personal digital organizer of personal transaction and storage device 407 includes upper panel 408 that includes output displays 417 on panel 408, lower panel 415 that includes touch-sensitive soft-key input panel 418, a row of control/configuration buttons 410, slide-out panel 416 functioning as a memo pad and pen 490 (see FIG. 33, infra) capable of reading barcodes and operating as a touch-sensitive-panel-writing element.

FIG. 27 schematically illustrates the other side of the preferred embodiment, which covers another functional domain, operating as a telephone. This side has flip-up panel 409 including speaker 419. Lower panel 413 contains soft-key inputs 421 functioning as telephone buttons. The lowest row of buttons 414, below lower touch-sensitive panel 413, contains some configuration/control buttons and a microphone that accepts vocal and other aural inputs.

FIG. 28 schematically illustrates an upper, sideways view emphasizing that this rendition of personal transaction and storage device 407 has two sides and two functional domains. FIG. 28 primarily shows the side with the telephone, and highlights the fact that flip-up sections 408, 409 are disposed on different sides. FIG. 29 provides an opposite side view than that of FIG. 28, and shows primarily the side with the personal digital organizer.

EXAMPLE VII

FIG. 30 is a diagram illustrating a sequence 450 of exemplary data exchange messages in steps 462–476 between parties 452–460 involved in a financial transaction, e.g., between personal transaction and storage device 407 (FIGS. 26–29) and several objects involved with a financial transaction, and the data transfers associated with a particular financial transaction. Since personal transaction and storage device 407 has capability for omni-directional, higher-ranging, wireless couplings, users can interact with devices throughout a retail store. With these enhanced communications capabilities, a buyer can perform financial transactions and can negotiate exchanges of secure information.

The following methodology describes a merchant-assisted, self-closing transaction system. Retail merchandise is purchased with the implicit actions of three parties: (1) a buyer, (2) a merchant and (3) one or more financial institutions. Self-closing transactions can be easily achieved with (i) an electronic three-way transaction, involving buyer, merchant and banking system or (ii) with electronic cash interactions between the buyer and the merchant.

The system is based on a simplified interaction between buyer and merchant, to enable either mode of electronic financial transactions, i.e., (i) three-way transactions or (ii) cash exchange interactions. Current systems require that an implicitly defined and agreed-upon financial system be used for a given purchase. For example, current credit card users have an implicit agreement between a credit-card institution and the merchant to read information from the credit card and activate transactions for purchasing. Even modern inventions continue to use the implicitly defined infrastructure access, e.g., paging systems with secure electronic transactions.

The following steps, illustrated in FIG. 30, explain exemplary financial transactions used in three-way electronic purchases. Sequence 450 begins with a buyer in party 452 scanning (step 462) the bar-code on the product with bar-code reader 490 (FIG. 33). This can be magnetic information or common UPC bar-coded lines. The financial transaction is initiated (step 464) by the buyer after carrying out the scanning step (step 462).

Financial transactions comprise a three-way mechanism involving the buyer, the merchant and a set of banking sources (in this case, just the merchant's bank and the buyer's bank). Buyer 452 needs to supply a bank account or credit card number and also needs to relay product information which helps banks 458, 460 determine the price and allows merchant 456 to control inventory and security.

After merchant 456 parses out the price and product information, along with the buyer's banking information, merchant 456 initiates a banking request (step 466) to merchant's bank 458. Merchant's bank 458 then initiates appropriate financial transactions with buyer's bank 460, most likely a simple transfer request to cover the cost of the requested purchase. Once merchant's bank 458 receives acknowledgment (step 470) of the financial transaction from buyer's bank 460, the information can be processed for the merchant's account. Merchant's bank 458 sends acknowledgments (step 472) to merchant 456. Merchant 456 receives the acknowledgment of financial transfers (step 472) and sends tailored information (step 474) back to buyer 452. Along with this acknowledgment, desirably the product code, receipt and generalized product tags associated to the purchase transactions are sent to buyer 452. Buyer 452 can then record financial transaction information and generalized product tags (step 476) on the product.

Sequence 450 modifies the financial transaction system to allow buyer 452 to directly transfer information to merchant 456, with complete control of information transfer resident with buyer 452, and assists in banking transactions, when necessary. Alternatively, electronic cash transactions can be done without interacting with a banking system at the time of the purchase, in a form commonly known as "stored value electronic cash transactions".

This invention modifies the current approach of secure electronic transactions, moving away from implicit financial systems and infrastructures to a flexible configuration of financial systems that are assisted through couplings between buyer 452 and merchant 456.

FIG. 31 shows current approach 480, where buyer 452 and merchant 456 use implicitly defined financial institution 459 as a third party that supervises or guarantees the transaction. FIG. 32 shows new approach 482, where transactions are initiated, controlled and completed through buyer 452, with cooperation from merchant 456 and banks 458, 460. Note that there is an optional assistance from buyer 452 to financial institutions 459, comprising banks 458, 460 (indicated by curved arrows), in cases where buyer 452 is not using a direct electronic cash transfer to merchant 456 (e.g., as shown in FIG. 31).

FIGS. 33 and 34 show an example of modified or enhanced transaction processing. This invention can be described as two major parts, (i) the devices and their interaction (FIG. 33) and (ii) the barcodes (FIG. 34).

FIG. 33 is an exemplary configuration of barcode reader 490 and telephone 492 disposed on one side 409/413 of personal transaction and storage device 407 (FIGS. 27 and 28, supra), with each of barcode reader 490 and telephone 492 including capabilities such as those shown in FIGS. 2, 11, 12, i.e., including device 21/121/135. In FIG. 33, barcode reader 490 is drawn in the shape of an ordinary pen, hereinafter referred to simply as "pen 490". Low-power short-range RF link 491 exists between telephone 492 and pen 490. Assume that any information read by pen 490 is immediately broadcast to telephone (or other device) 492. Telephone 492 is capable of interpreting the information received from pen 490 and acts on that information.

FIG. 34 is an diagram illustrating exemplary message formats 495, with some involving implied action barcodes. The most common form of barcoded information is UPC (universal product code). The UPC identifies the product in question by giving it a unique identification, as illustrated by block 496. However, no verb or action information is normally encoded into a UPC. The system of the instant invention requires that additional information be added to the barcode, specifically an action command, as shown in blocks 497 ("DIAL") and 498 ("DIAL" and "WAIT FOR ANSWER"). The information barcoded in blocks 497–498 now becomes a string of VERB-OBJECT pairs, called an "implied action barcode".

EXAMPLE VIII

Examples of how implied action barcodes such as 497, 498 may be structured include: a bar code that states (i) "initiate purchase transaction", which may include specific requests for specific information; (ii) "request quotes", which may include implied requests for "quotes with respect to which of our products", "what is your name, credit card number, mailing address" and the like; (iii) "assemble information describing product or service with information identifying requester and method of payment"; or (iv) "add to organizer list", i.e., include this information in your database (e.g., stored in memory 42, 147, FIGS. 2, 12) describing other activities, services or products.

For example, the user might see an advertisement for reduced air fares, which advertisement includes an implied action bar code. The user scans this information into a personal data storage and transaction device 407 (FIGS. 26–29). The bar code includes information on several different flights, dates available and the like and includes a prompt to display these data to the user and request that one or more selections be made and transmitted along with the other data, and also includes a request for information identifying the user by name, photo etc., information describing a payment method (e.g., credit card number, bank account information, mailing address etc.). The bar code also includes information sufficient to allow personal data storage and transaction device 407 to contact the travel agency, e.g., telephone or facsimile number, email address and/or the like.

Personal data storage and transaction device 407 displays the flight information and prompts the user to make selections, and also assembles the information describing the travel agent, the user and the method of payment into a message. When personal data storage and transaction device 407 then or later establishes contact with a telephone or other communications medium (e.g., 34 of FIG. 1; 21 of FIG. 11; 159 of FIG. 12), a message tailored to use that medium is sent to the travel agency, which message includes information describing the flight or flights chosen, the number of people traveling, their identities, and payment and/or billing information. These data are processed by the travel agency when received and the flight reservations and payment arrangements are made. Confirmation may be made via the financial institution or by the travel agency or both.

EXAMPLE IX

Table I is a table of exemplary access levels corresponding to data structuring within personal transaction and storage device 407. This invention is capable of performing several varieties of transactions, with financial transactions being one such transaction type. With this enhanced variety of transaction possibilities, data structuring becomes more complex. There needs to specify and examine the protection of personal information at various levels. Even though devices and units can "talk to each other", there is always a need or desire that only certain information can be exchanged or modified.

TABLE I

ACCESS LEVELS AND MEANINGS.

| LEVEL | EXEMPLARY ACCESS LEVELS AND MEANINGS |
|---|---|
| 0 | ANONYMOUS |
| 1 | BUSINESS CASUAL |
| 2 | SOCIAL |
| 3 | INTIMATE |
| 4 | SENSITIVE (READ BUT NOT WRITE) |
| 5 | COURIER (CONVEY BUT NOT READ OR WRITE) |

For these reasons, there is at least a six level division of data protection:

(i) at level 0—anonymous, the user will only exchange information that will leave the identity as anonymous;

(ii) at level 1—business casual, the data exchange will be business-related and not very personal, e.g., exchange of business card information;

(iii) level 2—social, more information (at a "social" level) is exchanged, e.g., social activity calendar;

(iv) at level 3—intimate, information is of a more intimate nature, e.g., sizes of clothes or family event dates;

(v) at level 4—sensitive, data is protected in a "restricted data" fashion where information can be read but not written, so that a person can carry certified information that is authorized by a third party, e.g., financial records that are authenticated and heavily protected; and (vi) at level 5—courier, another group of "restricted data", information is built for items such as medical files or letters of recommendation that are authenticated and heavily protected, and may even be carried by a user while the user cannot ever manipulate the data values or read the information.

Figure 35:
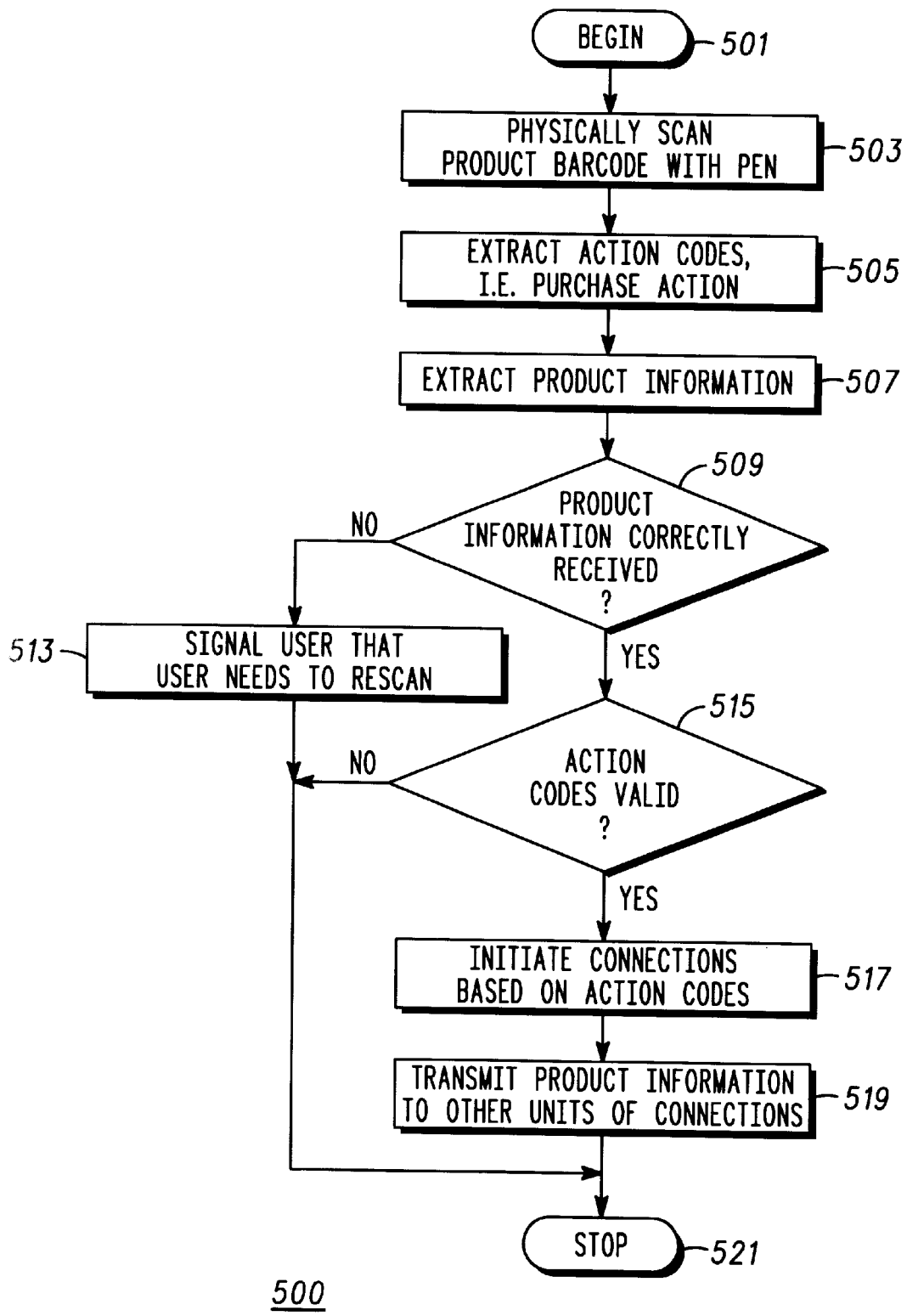
FIG. 35 is a flow chart illustrating a sequence of steps in a process for reading barcode information from a product, using a barcode reading pen and a personal store and transaction device.

FIG. 35 is a flow chart illustrating an exemplary sequence of steps in process 500 for reading barcode information (FIG. 34) from a product 454 (FIG. 30), using pen 490 (FIG. 33) and personal transaction and storage device 407 (FIGS. 26–29). The process begins (block 501) when buyer 452 (FIG. 30) swipes a barcode (block 503) on product 454 with pen 490. This barcode is an implied action barcode (see FIG. 34 and associated text), with implied actions to have a purchase made in behalf of buyer 452. Personal transaction and storage device 407 extracts action codes (block 505) and product information (block 507).

When it is determined (block 509) that the barcode information is not received correctly by personal transaction and storage device 407, a signal is sent (block 513) to the user to warn that another scan should be attempted and the process stops (block 521) until re-initiated by another barcode scan (block 503). When it is determined (block 509) that the barcode information is received correctly, personal transaction and storage device 407 needs to validate the action codes (block 515), checking to make sure that the action codes fall within an understandable vocabulary.

When the action codes are valid, personal transaction and storage device 407 initiates a coupling with a merchant device (block 517) and transmits all necessary product and financial information (block 519). Process 500 then ends (block 521). When the action codes are determined (block 515) to not be valid, process 500 also ends (block 521).

Figure 36:
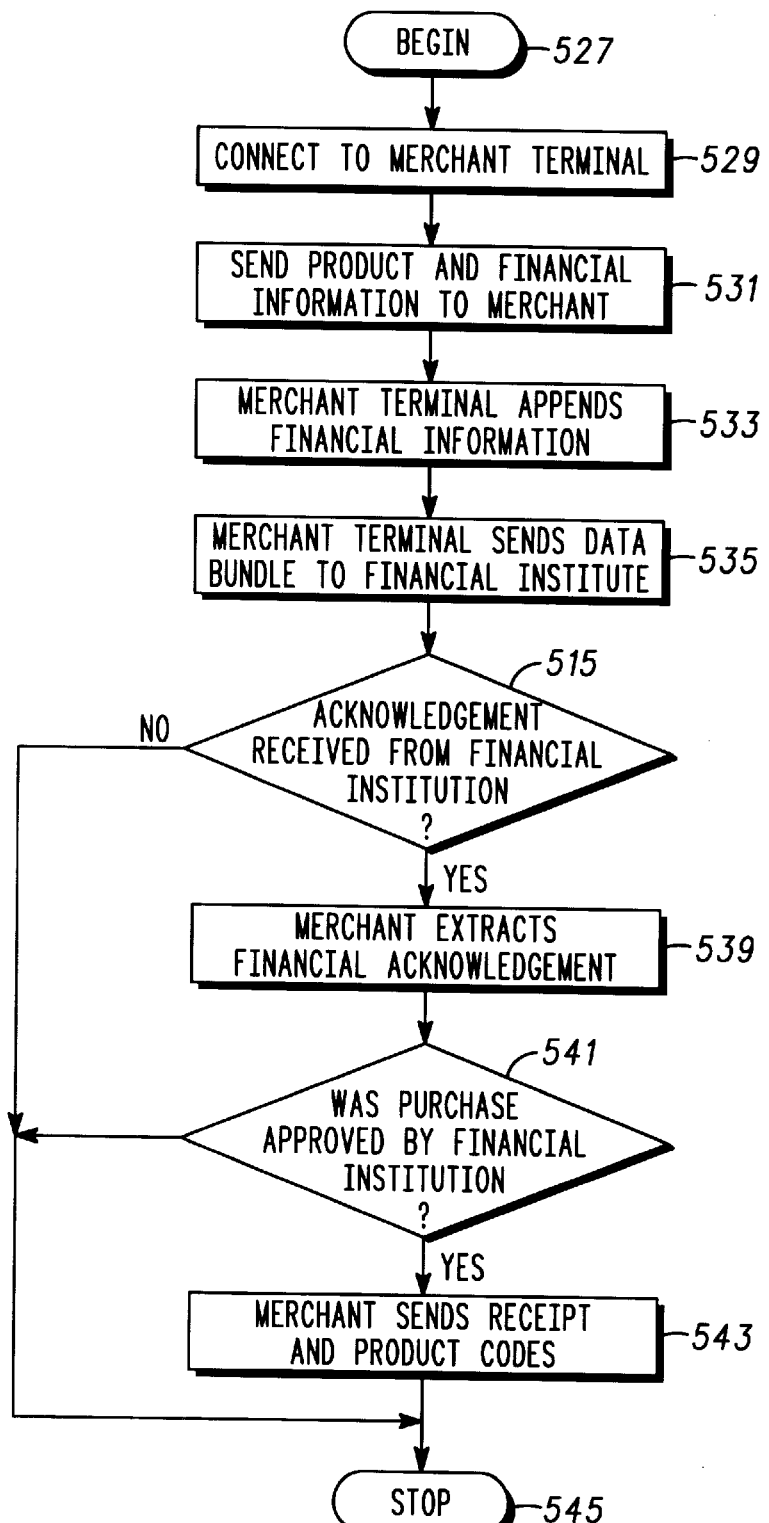
FIG. 36 is a flow chart illustrating a sequence of steps in a process for exchanging financial transaction information between a personal store and transaction device and a merchant device/terminal.

FIG. 36 is a flow chart illustrating a sequence of steps in process 525 for exchanging financial transaction information between personal transaction and storage device 407 (FIGS. 26–29) and merchant 456 (FIG. 30) or a merchant device/terminal. This algorithm demonstrates the modified approach of exchanging financial transactions through a merchant, as shown in FIG. 32.

Process 525 begins (block 527) with personal transaction and storage device 407 coupling (block 529) to a terminal of merchant 456 (FIG. 30), and sends product and financial information (block 531), as mentioned in text associated with FIGS. 31–35. The terminal of merchant 546 appends financial information (block 533), i.e., merchant bank account, merchant billing address, merchant mailing address etc. The bundled information, including the purchasing account information, product codes and merchant account information, is transmitted (block 535) from the terminal of merchant 456 to a terminal of bank 458, 460 belonging to a third-party financial institution. The terminal of merchant 456 waits until it receives an acknowledgment from the bank 458, 460. When it is determined that an acknowledgment is received (block 537), merchant 456 extracts financial information relevant to the approved purchase (block 539). When it is determined that the purchase is approved by bank 458, 460 (block 541), merchant 456 sends a receipt and product codes back to buyer 452 making the purchase (block 543) and process 525 ends (block 545).

When it is determined that an acknowledgment is not received (block 537) or it is determined that the purchase is not approved by the financial institution (block 541), the financial transaction is stopped and process 525 ends (block 545). Merchant 456 then decides to pursue alternative financial transactions.

Figure 37:
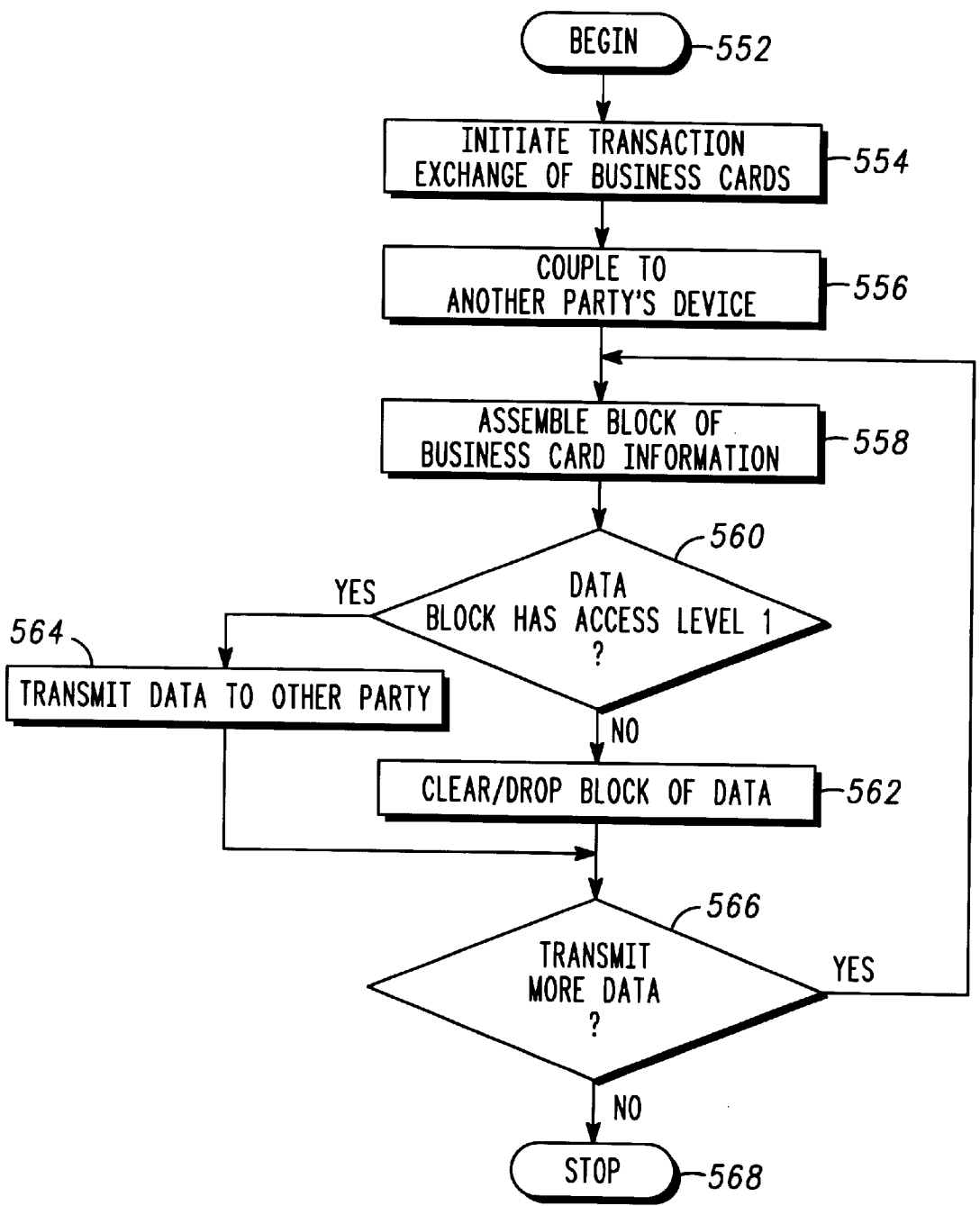
FIG. 37 is a flow chart illustrating a sequence of steps in a process of checking access levels transmitted between a personal store and transaction device and another party's device.

FIG. 37 is a flow chart illustrating a sequence of steps in process 550 of checking access levels transmitted between personal transaction and storage device 407 (FIGS. 26–29) and another party's device. As shown in Table I and associated text (supra), there are various access levels in personal transaction and storage device 407 that help build more complex data structuring. These various access levels are used to control release of information on a corresponding data transaction. For example, while exchanging business cards, a holder of personal transaction and storage device 407 needs to have access levels checked.

Process 550 begins (block 552) with the initiation of a transaction (block 554) and the coupling to another device (block 556). Process 550 includes the assembly of information into transmission blocks (block 558) and the checking of access levels (block 560). Transmission of information to the coupled device follows (block 564) when it is determined that this appropriate, and, when the data access level is not level 1—business casual, the affected data are deleted from the transmission (block 562). When further transmissions are determined to be desired (block 566), control loops back to block 558 and otherwise process 550 terminates (block 568).

Figures 38, 39:
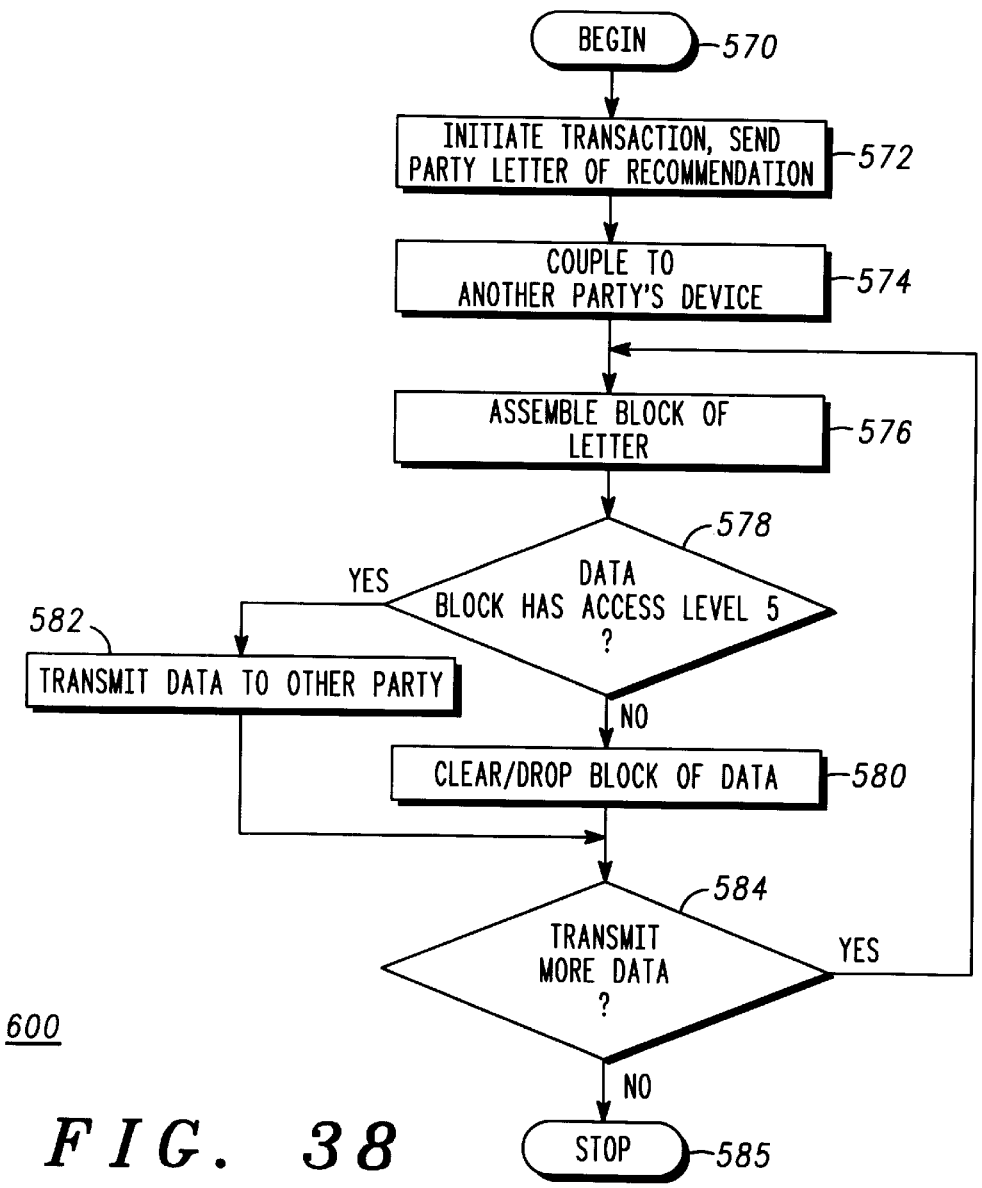
FIG. 38 is yet another flow chart illustrating yet another sequence of steps in a process of checking access levels transmitted between a personal store and transaction device and another party's device.
FIG. 39 is a diagram depicting exemplary components of a bonding key.

FIG. 38 is yet another flow chart illustrating yet another exemplary sequence of steps in process 2600 of checking access levels transmitted between personal storage and transaction device 407 (FIGS. 26–29) and another party's device. As a first example, various access levels (see Table I, supra) within personal transaction and storage device 407 are used to control release of information on a corresponding data transaction. As a second example, while exchanging a letter of recommendation a holder of personal transaction and storage device 407 needs to have access levels checked.

Process 2600 begins (block 570) with initiation of a transaction (block 572) and proceeds through steps including coupling to another device (block 574), assembly of information into transmission blocks (block 576), checking of access levels (block 578) and transmission of information to the coupled device 901/901 (block 582) when data access levels are appropriate. When the data access level is not level 5—courier, the transmission is skipped (block 580). When it is determined that further data transmission is in order (block 584), process 2600 skips back to block 576 and assembles another block of data with steps outlined in blocks 578 through 584 following. When it is determined that further data transmission is not desired, process 2600 ends (block 585).

Personal data storage and transaction device 407 is a versatile tool enabling many network interactions, particularly interacting with other elements in a capability addressable network. Examples I–IX supra feature embodiments of other devices in a capability addressable network, and, therefore, can be described as interacting with personal data storage and transaction device 407. Personal data storage and transaction device 407 maintains the personalized data for telephone or data access services described in Example I. This allows personalized records describing an individual user's preferences, location and/or statistics (IUPLS 134, FIGS. 11–13) or a roaming user's preferences, location, local telephone number and/or statistics (RUPLS 134) to be maintained and stored in convenient fashion.

As in Example II, personal storage and transaction device 407 carried by a user who is approaching, for example, rental car 191 (FIGS. 15, 16) allows transmission of personalized information to car 191. Or, as shown in Example III, personal information maintained in the personal store and transaction device relative to entertainment media, e.g., television program viewing preferences can be transmitted to a nearby television set or system (FIG. 17).

Example IV describes a more complex situation. Personal data storage and transaction device 407 can be either a client or service device within a security system described therein. For example, as a client of the security system of Example IV, personal data storage and transaction device 407 can be monitored and protected from theft or misplacement or misuse following theft or misplacement. As a server in the security system of Example IV, personal data storage and transaction device 407 can be used to configure security information into other devices of the security family (FIGS. 18, 19).

Example V shows an interactive remote controller application (FIGS. 20–24), which is a functional domain that can be implemented within personal data storage and transaction device 407. Personal data storage and transaction device 407 contains multiple functional domains (FIGS. 26–29) where a personal organizer and telephone were shown in Example VI, but the remote controller function could be added or substituted in personal data storage and transaction device 407.

FIG. 39 is a diagram depicting exemplary parts of bonding key 2480. Although bonding key 2480 is treated as one logical entity and its components are indistinguishable to an untrained observer, it actually includes many parts. Device ID 2481 is coded for requester device 901 (FIG. 40) that bonding key 2480 goes into. Best before date 2482 is an encoded date field after which bonding key 2480 is no longer effective. Key type 2483 is a field describing intended usage of bonding key 2480; refer to FIG. 52 for a more detailed explanation of key usage. Other cryptography information in bonding key 2480 is stored in crypto 2484.

Figures 40, 41:
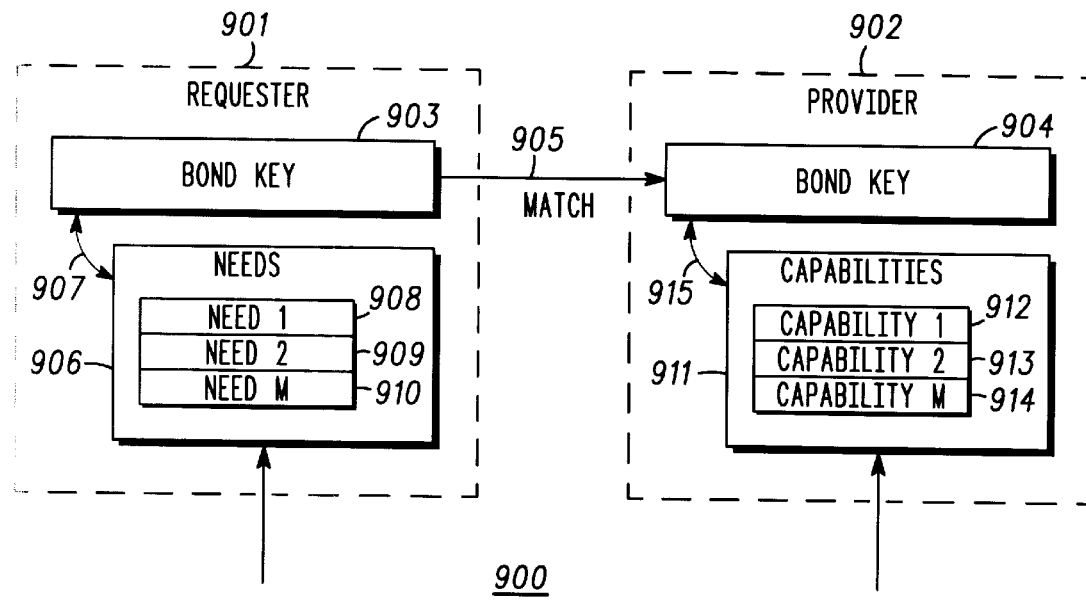
FIG. 40 is a diagram giving an overview of the bonding process.
FIG. 41 shows exemplary messages that may be communicated between devices in a preferred embodiment.

FIG. 40 is a diagram depicting a simplified overview of bonding process 900. The diagram depicts requester device 901 (a device seeking a capability) and provider device 902 (a device offering a capability which may be performed at the behest of a requester). When requester device 901 and provider device 902 come into proximity with one another, requester device 901 becomes aware of the presence of provider device 902; this process is discussed in conjunction with other diagrams below. Requester device 901 transmits one or more bond keys 903, 2480 to provider device 902. Provider device 902 then compares bond key 903, 2480 sent by requester device 901 to one or more bond keys 904, 2480 stored in provider device 902. When match 905 is made between bond key 903, 2480 sent by requester device 901 and bond key 904, 2480 in provider device 902, capabilities 911 associated with provider device 902's bond key 915, 2480 are unlocked for requester device 901. There may be one or more capabilities 911 (e.g., 912, 913, 914) stored in provider device 902 associated with this bond key 904, 2480.

After successful bond attempt 905, requester device 901 will unlock capability 911 and attempt to satisfy needs 906 associated 907 with bond key 903, 2480 in requester device 901. There may be one or more needs 906 (e.g., 908, 909, 910) associated 907 with any particular bond key 903, 2480. For every need 906 on requester device 901 that matches capability 911 on provider device 902, an invocation of capability 911 on provider device 902 will be initiated by requester device 901.

FIG. 41 includes exemplary messages 2499 that may be communicated between devices 901, 902 in a preferred embodiment. Beacon message 2500 is a message periodically sent by device 901, 902 to announce its presence to any other device 901, 902 within detection zone 28 (FIG. 1). In effect, any device 901, 902 sending beacon message 2500 is saying "here I am world!" The motivation for device 901, 902 to send beacon message 2500 will vary in a preferred embodiment according to a number of factors, depending upon whether device 901, 902 is requester device 901 or provider device 902 (FIG. 38) or both, whether device 901, 902 is battery powered or powered from a less consumable source such as the public power network, whether device 901, 902 is portable or stationary, the frequency of other message traffic, the feedback that device 901, 902 is receiving from appliance circuits 155 (FIG. 12), the intended application for device 901, 902, and arbitrary policies of device 901, 902 that have been implemented.

Beacon message 2500 includes opcode 2501, a fixed but otherwise arbitrary pattern identifying this message uniquely as beacon message 2500. ID 2502 identifies device 901, 902 sending beacon message 2500. Devices 901, 902 wishing to communicate with this device 901, 902 should use this ID 2502.

ID type 2503 is a pattern identifying some characteristics of device 901, 902 sending beacon message 2500. ID address 2504 is space allocated in beacon message 2500 to describe an optional device address. This may be useful when devices 901, 902 are communicating via gateways or via relays (see, e.g., gateway 44, FIGS. 2, 12 and associated text).

Common message header 2510 is not a message, rather it is a component of other messages, that is to say, that it is something also included in other messages below. Common message header 2510 includes opcode 2511, which includes a fixed but otherwise arbitrary pattern identifying common message header 2510 uniquely. This pattern will vary according to which message the common message header 2510 is imported into.

ID of sender 2512 identifies the sender of beacon message 2500 that message header 2510 is imported into. Address of sender 2513 is space allocated in the message to describe an optional device address. This may be useful when devices 901, 902 are communicating via gateways or via relays (see, e.g., gateway 44, FIGS. 2, 12 and associated text). Device type of sender 2514 is a pattern identifying some characteristics of device 901, 902 sending beacon message 2500.

ID of target 2515 identifies which device 901, 902 that the message is intended for. Address of target 2516 is space allocated in beacon message 2500 to describe an optional device address for device 901, 902 that the message is intended for. This may be useful when devices 901, 902 are communicating via gateways or via relays (see, e.g., gateway 44, FIGS. 2, 12 and associated text).

Ping message 2520 is a message that may be sent by any device 901, 902 after it has not heard from some other device 901, 902 that it has been communicating with in a given time period (see, e.g., FIGS. 18, 19 and associated text). The time period will vary from one device 901, 902 to another in a preferred embodiment according to a number of factors. In effect, device 901, 902 sending this message to another device 901, 902 says "are you still there?"

Ping message 2520 comprises common message header 2521 (analogous to message header 2510) containing a fixed but otherwise arbitrary pattern in opcode field 2511 uniquely identifying the message as ping message 2520. Zing message 2525 is a message that may be sent by device 901, 902 after it has received ping message 2520. In other words, zing message 2525 replies to ping message 2520. In effect, any device 901, 902 sending this message to another device 901, 902 says "yes, I am still here." Zing message 2525 comprises common message header 2526 (analogous to message header 2510) containing a fixed but otherwise arbitrary pattern in opcode field 2511 uniquely identifying the message as zing message 2525.

FIG. 42 illustrates more exemplary messages that may be communicated between devices 901, 902 in a preferred embodiment. Make bond message 2530 is a message sent by requester device 901 (FIG. 38) when it attempts to bond 905 with potential provider device 902.

First portion 2531 of make bond message 2530 includes common message header 2510 containing a fixed but otherwise arbitrary pattern in opcode field 2511 uniquely identifying the message as make bond message 2530. Key of requester 2532 is bond key 903 offered by requester device 901 to provider device 902. Make bond status message 2540 is a message sent by provider device 902 to requester device 901 to indicate the status of a bond attempt initiated via make bond message 2530. First portion 2541 of make bond status message 2540 includes common message header 2510 containing a fixed but otherwise arbitrary pattern in opcode field 2511 uniquely identifying the message as make bond status message 2540.

Key of requester 2532 is bond key 903 offered by requester device 901 to provider device 902 that provider device 902 is now reporting back on. Result code 2543 indicates the status of the bond attempt. The status includes whether or not the bond attempt was successful.

Ask capability message 2550 is a message sent by requester device 901 to provider device 902 to query capabilities 911. First portion 2551 of ask capability message 2550 includes common message header 2510 containing a fixed but otherwise arbitrary pattern in opcode field 2511 uniquely identifying the message as ask capability message 2550.

Key of requester 2552 is bond key 904 under which the bond was established. Capability number 2553 includes a fixed but otherwise arbitrary pattern uniquely identifying capabilities 911.

Tell capability message 2560 is a message sent by provider device 902 to requester device 901 in response to ask capability message 2550. First portion 2561 of tell capability message 2560 includes common message header 2510 containing a fixed but otherwise arbitrary pattern in opcode field 2511 uniquely identifying the message as a tell capability message 2560.

Key of requester 2562 is bond key 903 under which bond 905 was established. Capability number 2563 includes a fixed but otherwise arbitrary pattern uniquely identifying capabilities 911. Result code 2564 indicates whether or not need 906 corresponds to capabilities 911 (and/or is presently available on provider device 902). Capability description 2565 is an optional description of capabilities 911. Execute capability message 2570 is a message sent by requester device 901 to provider device 902 to invoke capabilities 911 on provider device 902.

First portion 2571 of execute capability message 2570 includes common message header 2510 containing a fixed but otherwise arbitrary pattern in opcode field 2511 uniquely identifying the message as execute capability message 2570.

Key of requester 2572 is bond key 903 under which bond 905 was established. Capability number 2573 includes a fixed but otherwise arbitrary pattern uniquely identifying capabilities 911, and capability parameters 2574 includes operational parameters given to these capabilities 911. Capability preamble 2575 includes instructions to be executed before any capability 911 is invoked. This could be used to set the state of some appliance circuit (e.g., 48, FIG. 2; 155, FIG. 12 etc.) to some known state before the capability begins to run. For further explanation of the capability preamble feature, refer to the detailed explanation of FIG. 50.

Capability postamble 2576 includes instructions to be executed after capability 911 has terminated. This could be used to set the state of some appliance circuit to some known state at the termination of capability 911. For further explanation of the capability postamble feature, refer to the detailed explanation of FIG. 50.

FIG. 43 is a diagram depicting exemplary data structure elements. Need table element 2580 includes data items storing information about one need 906 of requester device 901 and need table element 2580 is stored on requester device 901. Capability code 2581 includes a fixed but otherwise arbitrary pattern uniquely identifying need 906. Capability name 2582 includes the textual name of need 906. Enable/disable flag 2583 indicates whether the user of this device 901 has enabled or disabled need 906 at this time. Passive/active flag 2584 describes whether need 906 is active, which means that it will be automatically sought out and acted upon without any user interaction, or passive, which means that the user must explicitly invoke capability 911 themselves. Requester preamble 2585 includes instructions to be executed on requester device 901 before need 906 is satisfied via execute capability message 848 (FIG. 51); refer to the detailed explanation of FIG. 50 for additional information on this field.

Figure 50:
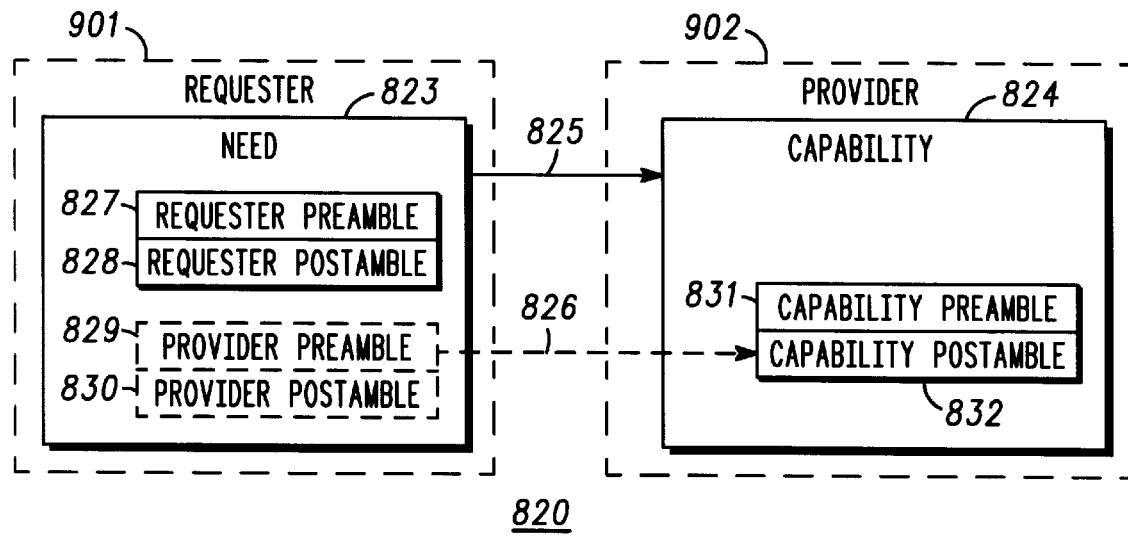
FIG. 50 is a diagram depicting location of execution of various preamble and postamble instructions.

Requester postamble 2586 includes instructions to be executed on requester device 901 after requester device 901 has decoupled from provider device 902; refer to the detailed explanation of FIG. 50 for additional information on this field. Provider preamble 2587 includes a set of instructions to be executed on provider device 902 before provider device 902 invokes capability 911; refer to the detailed explanation of FIG. 50 for additional information on this field. Provider postamble 2588 includes instructions to be executed on provider device 902 after provider device 902 disconnects from requester device 901; refer to the detailed explanation of FIG. 50 for additional information on this field.

Capability table element 2590 includes data items storing information about one capability 911 on provider device 902. Capability code 2591 includes a fixed but otherwise arbitrary pattern uniquely identifying capability 911. Capability name 2583 is the textual name of capability 911. Enable/disable flag 2584 indicates whether capability 911 is enabled or disabled at this time. Physical restrictions 2594 is a field describing constraints on the hardware of requester device 901 in order to use capability 911.

Logical restrictions 2595 is a field specifying logical constraints on the user of this capability 911. For example, perhaps certain files or functions are out of bounds (see, e.g., FIGS. 37, 38, Table I and associated text). Capability preamble 2596 includes instructions to be executed on provider device 902 before the capability is invoked; refer to the detailed explanation of FIG. 50 for additional information on this field.

Capability postamble 2597 includes instructions to be executed on provider device 902 after provider device 902 has decoupled from requester device 901; refer to the detailed explanation of FIG. 50 for additional information on this field. Provider preamble 2598 includes instructions to be executed on provider device 902 before provider device 902 invokes capability 911; refer to the detailed explanation of FIG. 50 for additional information on this field. Provider postamble 2599 includes instructions to be executed on provider device 902 after provider device 902 disconnects from requester device 901; refer to the detailed explanation of FIG. 50 for additional information on this field. Capability instructions 2600 are instructions for capability 911 itself or refer to it.

Need table 610 includes a data structure that stores need table element 2580. In this case, need table 610 is depicted as a linear array of need table elements 2580, however, other table techniques, e.g., trees, hashing, linked lists and other data structures well known to those skilled in the art of software engineering may be employed.

Capability table 620 includes a data structure that stores capability table element 2590. In this case, capability table 620 is depicted as a linear array of need table elements 2590, however, other table techniques, e.g., trees, hashing, linked lists and other data structures well known to those skilled in the art of software engineering may be employed.

FIG. 44 is a diagram depicting exemplary data structure elements. Requester table element 630 includes data items storing information associated with one bond key 903, 2480. This data structure is stored in requester device 901. Bond key 631 is a bonding key 903, 2480. Enable/disable flag 632 indicates whether the user of this device 901 has enabled or disabled bond key 631 at this time. The pointer to need table 633 references need table 610.

Provider table element 640 includes data items that store information associated with one bond key 904. This data structure is stored in provider device 901. Bond key 641 is bonding key 904. Enable/disable flag 642 indicates whether the user of this device has enabled or disabled bond key 641 at this time. The pointer to capability table 643 references capability table 620.

Provider table 650 includes a data structure that stores provider table element 640 as one of stored provider table elements 651 . . . 655. Requester table 660 includes a data structure that stores requester table element 630 as one of stored requester table elements 651 . . . 655. In this case, provider table 650 is depicted as a linear array of provider table elements 651 . . . 655 and requester table 660 is depicted as a linear array of requester table elements 651 . . . 655, however other table techniques, such as trees, hashing, linked lists and other data structures well known to those skilled in the art of software engineering may be employed.

FIG. 45 depicts relationships between requester tables 671 and need tables 672, 673. As previously discussed, requester table 671 includes requester table elements 676 . . . 680, corresponding to 661 . . . 655 (FIG. 44), and need table 672 includes need table elements 681 . . . 685, corresponding to 611 . . . 615 (FIG. 43). Also shown is need table 673 comprising need table elements 686 . . . 690, corresponding to 611 . . . 615. Requester table element 676 contains reference 674 to need table 672; this is done via a pointer to need table 633. Also shown is reference 675 from requester table element 680 to need table 673. Not shown are the references from the other requester table elements 677 and 678 to need tables.

FIG. 46 is a diagram depicting the relationships between provider tables 701 (analogous to provider table 650, FIG. 44) and capability tables 702, 703 (analogous to capability table 620, FIG. 43). As previously discussed, provider table 701 includes provider table elements 706 710 and capability table 702 includes capability table elements 711 . . . 715. Also shown is capability table 703 comprising capability table elements 716 . . . 720. Provider table element 706 includes reference 704 to capability table 702; this reference is done via the pointer to capability table 643. Also shown is reference 705 from provider table element 710 to capability table 703. Not shown is that other provider table elements 707 . . . 710 also reference capability tables.

FIG. 47 is a diagram depicting exemplary data structures. Chat table element 730 includes data items that store information associated with one device 901, 902 in the chat space. The chat space is defined to be all those devices 901, 902 in proximity and all those devices 901, 902 that can be communicated with via gateways (44, FIG. 1; 159, FIG. 12) or relays (46, FIG. 1; 159, FIG. 12), independent of whether or not devices 901, 902 are in meaningful communication at the moment. This data structure is stored in device 901, 902, whether device 901, 902 comprises requester device 901, provider device 902 or both.

Device ID 731 is identification for device 901, 902 in the chat space. Chat state 732 defines the status of communication with device 901, 902; some valid chat states are (i) ignoring and (ii) bonded. Pointer to bond table 733 is a reference to bond table 770 (discussed below, FIG. 48). Number of bonds 734 describes the number of bonds that are currently active with this device. Time stamp 735 is the value of the clock the last time this device 901, 902 was heard from. Pings remaining 736 stores an integer specifying how many times we will try to awaken this device 901, 902 when no zing message 2525 (FIG. 44) is received from this device 901, 902.

Bond table element 740 includes data items that store information associated with one bond 905 with one device 901, 902. Key 741 is the bond key under which bond 905 was made. Device ID 742 is the device identification for device 901, 902 that bond 905 refers to. Bond state 743 defines the status of bond 905; some valid bond states are (i) requester, (ii) provider and (iii) pending. Pointer to mate table 744 is a reference to mate table 780 (discussed below). Number of mates 745 is an integer specifying the number of matches (FIGS. 51, 53, 57) between needs 906 and capabilities 911 under this bond 905.

Mate table element 750 includes data items that store information on one match between needs of requester device 901 and capabilities of provider device 902 under one bond 905. Pointer to provider/requester table element 751 references provider table element 640, 651 (FIG. 44), 706 (FIG. 46) or requester table element 630, 661 (FIG. 44), 676 (FIG. 48). Pointer to need/capability table element 752 is a reference to need table element 2580, 611 (FIG. 43), 681 (FIG. 45) or capability table element 2590, 621 (FIG. 43), 711 (FIG. 46), depending upon bond state 743.

FIG. 48 is a diagram depicting three data structures, (i) chat table 760, (ii) bond table 770 and (iii) mate table 780 (FIG. 47) as one of table elements 761 . . . 765, 771 . . . 775 and 781 . . . 785. Chat table 760 includes a data structure that stores chat table element 730. In this case, chat table 760 is depicted as a linear array of chat table elements 761 . . . 765, however, other table techniques, such as trees, hashing, linked lists and other data structures well known to those skilled in the art of software engineering may be employed.

Bond table 770 includes a data structure that stores bond table element 740 (FIG. 47) as one of bond table elements 771 . . . 775. In this case, bond table 770 is depicted as a linear array of bond table elements 771 . . . 775, however, other table techniques, such as trees, hashing, linked lists and other data structures well known to those skilled in the art of software engineering may be employed.

Mate table 780 includes a data structure that stores mate table element 750 (FIG. 47) as one of mate table elements 781 . . . 785. In this case the mate table 780 is depicted as a linear array of mate table elements 781 785, however, other table techniques, such as trees, hashing, linked lists and other data structures well known to those skilled in the art of software engineering may be employed.

FIG. 49 depicts relationships between chat tables 791, bond tables 792 and mate tables 793. Chat table 791 includes chat table elements 796 . . . 801 (analogous to chat table element 730, FIG. 47) and bond table 792 includes bond table elements 802 . . . 806 (analogous to bond table element 740). Also shown is mate table 793 comprising mate table elements 807 ... 811 (analogous to mate table element 750). Chat table element 796 includes reference 794 to bond table 792 via pointer to bond table 733 (FIG. 47). Bond table element 806 includes reference 795 to mate table 793; this reference is done via the pointer to mate table 744 (FIG. 47).

FIG. 50 is a diagram depicting an overview of preamble and postamble instructions 820. FIG. 50 depicts mating 825 of need 823 (analogous to need 906, FIG. 40) on requester device 901 and capability 824 (analogous to capability 911, FIG. 40) on provider device 902. Before requester device 901 satisfies need 823 by sending execute capability message 2570 (FIG. 42), requester device 901 first executes instructions contained in requester preamble 827. Requester device 901 sends execute capability message 2570 to provider device 902. Included in execute capability message 2570 are two sets of instructions called provider preamble 829 and provider postamble 830.

When provider device 902 receives execute capability message 2570, it first executes instructions contained in capability preamble 831. Second, provider device 902 executes instructions contained in provider preamble 829. Third, provider device 902 invokes capability 824 itself.

When provider device 902 notices that bond 905 between requester device 901 and provider device 902 is broken, provider device 902 first terminates capability 911/824. Second, provider device 902 executes instructions in provider postamble 830. Third, provider device 902 executes instructions in capability postamble 832. When requester device 901 notices that bond 905 between requester device 901 and provider device 902 is broken, requester device 901 executes instructions contained in requester postamble 828.

Figure 51:
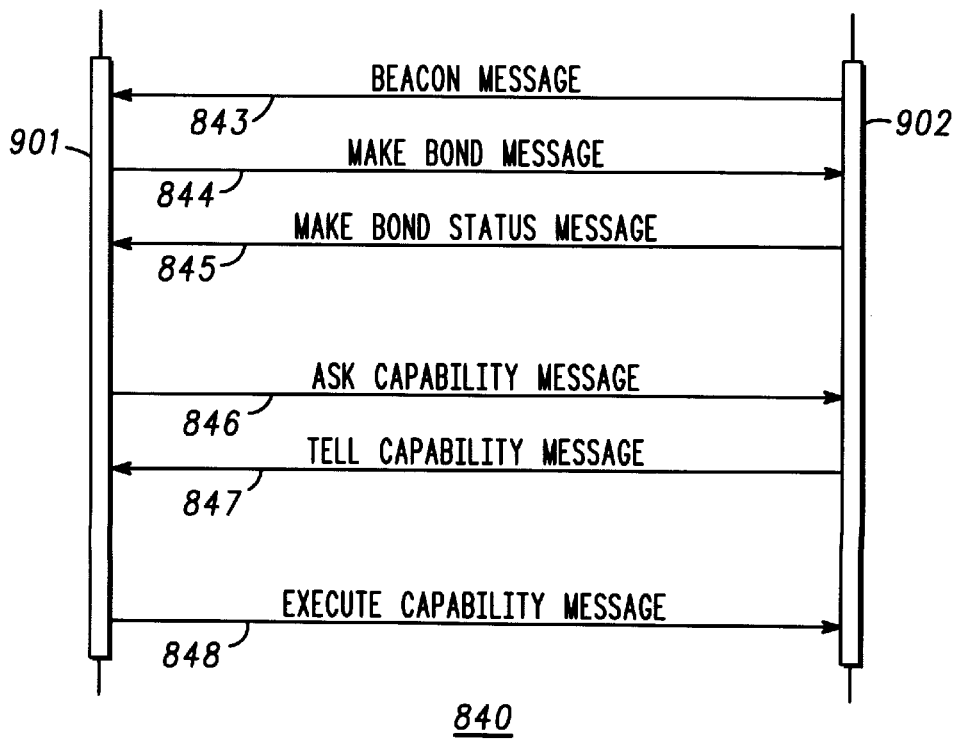
FIG. 51 is a message sequence chart depicting messages and sequence of messages exchanged between two devices establishing a coupling.

FIG. 51 is message sequence chart 840 depicting the sequence of messages (see also FIG. 42) exchanged between requester device 901 and provider device 902 in establishing bond 905 (FIG. 40). The sequence is initiated by requester device 901 becoming aware of provider device 902 via provider device 902's beacon message 2501 (FIG. 41). Once aware of the presence of provider device 902, requester device 901 attempts to establish bond 905 by sending make bond message 844 to provider device 902.

Provider device 902 then responds with make bond status message 845 describing whether or not bond 905 was made via this bond key 2480 (see also FIG. 39). Whether the bond attempt succeeded or failed, requester device 901 repeats sending make bond messages 844 to provider device 902, and requester device 901 does this once for each enabled bond key 2480 harbored by requester device 901 (i.e., once for each active bond 905). Provider device 902 responds with make bond status message 845 corresponding to each make bond message 844 sent by requester device 901.

Once one or more bonds 905 are established between requester device 901 and provider device 902, requester device 901 determines whether or not provider device 902 has capabilities 911 (see also FIG. 40) meeting any of requester device 901's needs 906. For each enabled and bonded need 906 being sought, requester device 901 sends ask capability message 846 to provider device 902. Provider device 902 responds with tell capability message 847/2560 describing whether or not need 906 being sought can be accommodated by this provider device 902. In other words, each ask capability message 846 and tell capability message 847 form a combination that is repeated in sequence, once for each active need 906 on requester device 901 within each active bond 905.

Requester device 901 then sends execute capability message command 848 to provider device 902 for each need 906 on requester device 901 that can be fulfilled by capabilities 911 on provider device 902. Execute capability message command 848 is sent once for each active match 905 between needs 906 on the part of requester device 901 and capabilities 911 on provider device 902.

FIG. 52 includes matrix 850 giving exemplary bonding key types and explaining their usage in a preferred embodiment. A first row 851 of matrix 850 gives titles for the columns. Column key type (block 852) identifies particular kinds of bond key 2480 and usage. Column number of providers (block 853) describes how many provider devices 902 would harbor this kind of bonding key 2480. Column number of requesters (block 854) describes how many requester devices 901 harbor this kind of bonding key 2480 (see also FIG. 39). Column meaning (block 855) gives textual explanation of bonding key 2480 usage.

Row 2 (block 860) of matrix 850 describes bonding key 2480 of the type device key 870, which is used to bond 905 only to one (block 871) provider device 902. Device key 870 can be carried by many (block 872) requester devices 901, but all requester devices 901 use it to bond to one and only one (block 871) provider device 902.

Row 3 (block 861) of matrix 860 describes bonding key 2480 of the type personal key 874, which may be carried in many (block 875) provider devices 902 but is only carried by one (block 876) requester device 901. Personal key 874 is used to identify an individual user.

Row 4 (block 862) of matrix 850 describes bonding key 2480 of the type owner key 878, which may be carried by many (block 879) provider devices 902, each device that is owned by the same owner, whether that owner be a person or an entity (e.g., a corporation, synagogue etc.). The number of requester devices 901 that may carry owner key 878 is one or few (block 880). Typically, administrative privileges are associated with owner key 878, so the number of owner keys 878 should be kept to a minimum.

Row 5 (block 863) of matrix 850 describes bonding key 2480 of the type group key 882, which may be carried in many (block 883) provider devices 902 and it also may be carried by many (block 884) requester devices 901. Group key 882 is for sharing devices.

Row 6 (block 864) of matrix 850 describes bonding key 2480 of the type hat key 886, which may be carried in many (block 887) provider devices 902, however, hat key 886 may be carried by one and only one (block 888) requester device 888, and it is intended that this device represent an individual (like personal key 874). Using hat key 886, an individual may sub-divide their access privileges into categories, depending upon different roles that they perform in.

Row 7 (block 865) of matrix 850 describes bonding key 2480 of the type role key 890, which may be carried in many (block 891) provider devices 901 and also in many (block 892) requester devices 902. Role key 890 is assigned to individuals who collectively act in a role, either simultaneously or on a rotation basis. It is similar to group key 882 but different in application. Role key 890 differs from hat key 886 in that hat key 886 is used by one and only one person to subdivide roles, whereas role key 890 accommodates many individuals sharing a role.

Row 8 (block 866) of matrix 850 describes bonding key 2480 of the type system key 894. System key 894 may be carried by many (block 895) provider devices 902 and by many (block 896) requester devices 901. System key 894 is used to logically group a set of devices 901, 902 together into a system, which is called a logical system. System key 894 is similar to group key 882, except in application all provider devices 902 harboring the same system key 894 may have a special synergy.

FIG. 53 is an exemplary flowchart of process 999 for the main control loop of device 901, 902. In the preferred embodiments, all peer devices 901, 902 perform a process similar to process 999, which starts by starting device 901, 902's internal timer (block 1001). Then control flows into a nonterminating loop (block 1002). Loop 1002 polls for events (see FIGS. 42, 43) to process, processes each event in turn, and then repeats.

Figure 61:
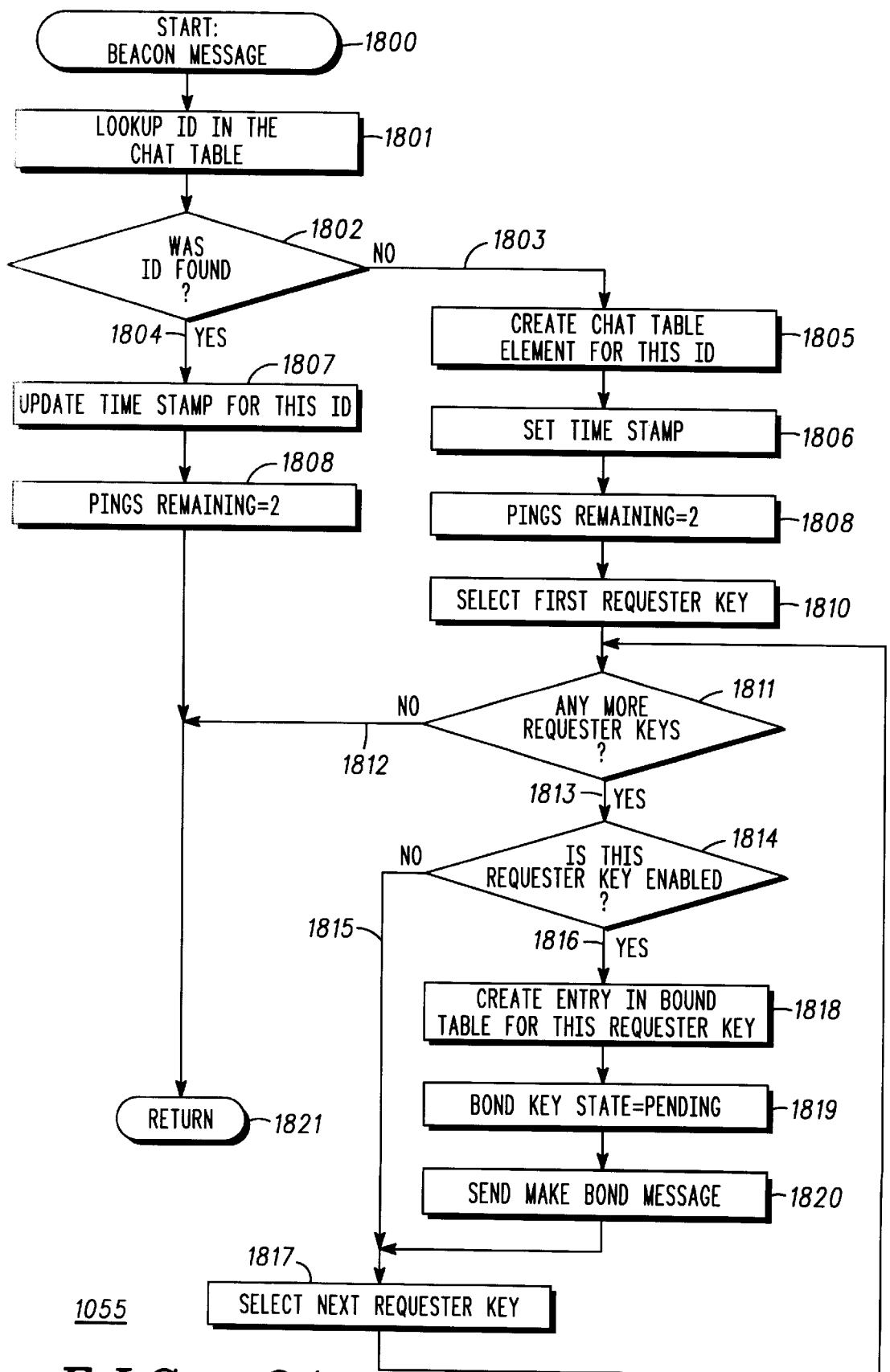
FIG. 61 is an exemplary flow chart outlining the processing of a Beacon Message in a device.

Control determines (block 1003) when beacon message 2500 is pending and, when so, control passes via branch 1004 to process the message (block 1006, see FIG. 61). Control then passes back to the top of the loop via branch 1007. When no beacon message 2500 pending 1003 then processing continues via branch 1005 to determine (block 1008) when make bond status message 2540 is pending.

Figure 57:
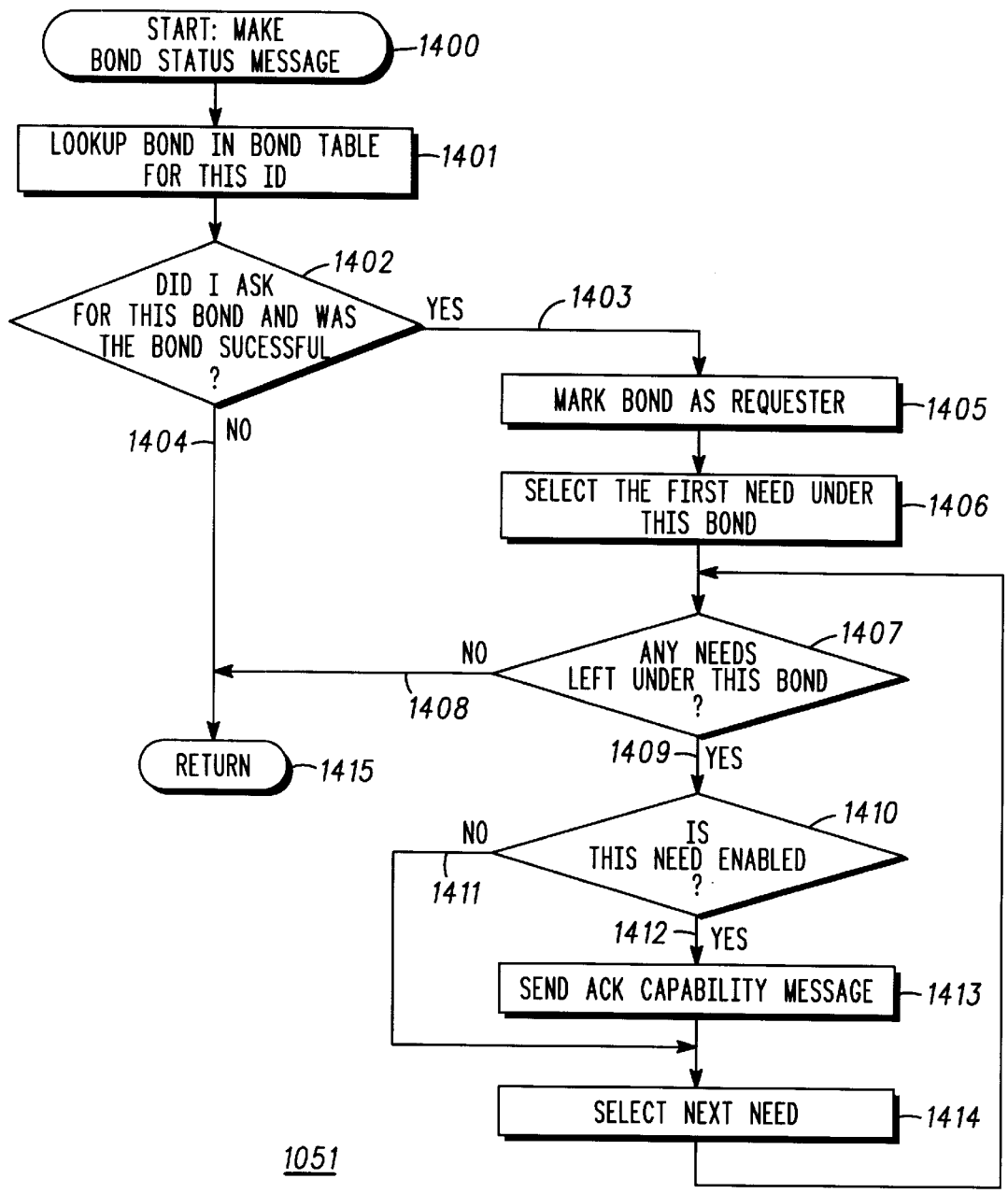
FIG. 57 is an exemplary flow chart outlining the processing of a Make Bond Status Message in a device.

Control determines (block 1008) when make bond status message 2540 is pending and, when so, control passes via branch 1009 to process the message (block 1011, see FIG. 57). Control then passes back to the top of the loop via branch 1012. When it is determined (block 1008) that no make bond status message 2540 is pending, processing continues via branch 1010 to determine (block 1013) when tell capability message 2560 is pending.

Control then determines (block 1013) when tell capability message 2560 is pending and, when so, control passes via branch 1014 to process (block 1016, see FIG. 54) tell capability message 2560. Control then passes back to the top of the loop via branch 1017. When it is determined (block 1013) that tell capability message 2560 is not pending, processing continues via branch 1015 to determine (block 1018) when the internal timer has expired.

Figure 62:
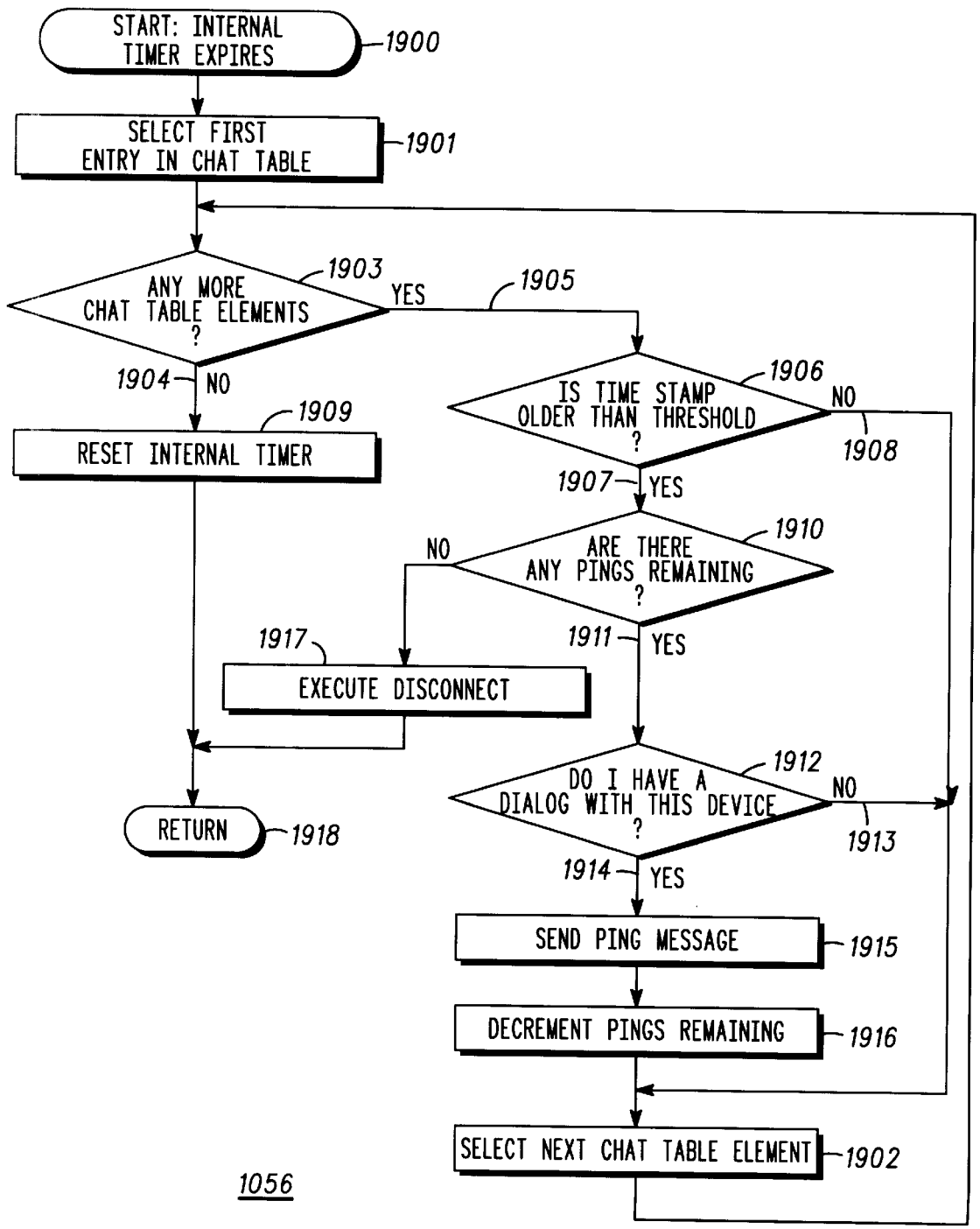
FIG. 62 is an exemplary flow chart outlining the processing when the internal timer expires in a device.

Control determines (block 1018) when the internal timer has expired and, when so, control passes via branch 1019 to process the event (block 1021, see FIG. 62). Control then passes back to the top of the loop via branch 1022. When control determines (block 1018) that the timer has not expired, processing continues via branch 1020 to determine (block 1023) when ping message 2520 is pending.

Figure 56:
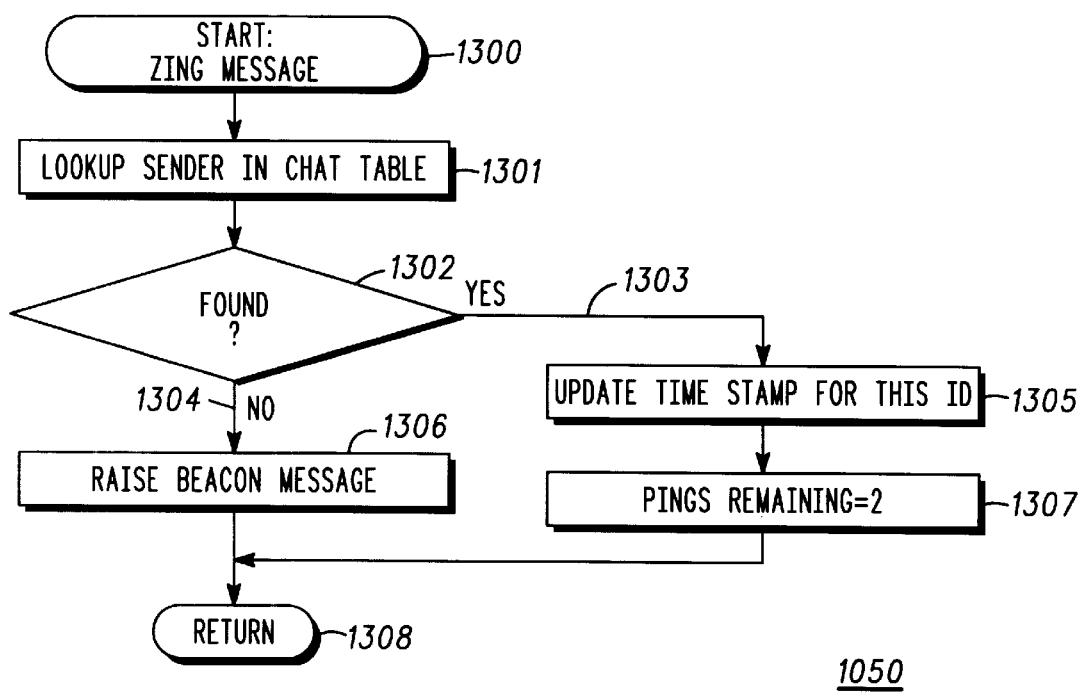
FIG. 56 is an exemplary flow chart outlining the processing of a Zing Message in a device.

Control determines (block 1023) when ping message 2520 is pending and, when so, control passes via branch 1024 to process ping message 2520 (block 1026, see FIG. 56). Control then passes back to the top of the loop via branch 1027. When control determines (block 1023) that ping message 2520 is not pending, processing continues via branch 1025 to determine (block 1028) when zing message 2525 is pending.

Control determines (block 1028) when zing message 2525 is pending; when so, control passes via branch 1029 to process (block 1031, see FIG. 56) zing message 2525. Control then passes back to the top of the loop via branch 1032. When control determines (block 1028) that zing message 2525 is not pending, processing continues via branch 1030 to determine (block 1033) when make bond message 2530 is pending.

Control determines (block 1033) when make bond message 2530 is pending and, when so, control passes via branch 1034 to process (block 1036, see FIG. 59) bond message 2530. Control then passes back to the top of the loop via branch 1037. When control determines (block 1033) that make bond message 2530 is not pending, processing continues via branch 1035 to determine (block 1038) when ask capability message 2550 is pending.

Control determines (block 1038) when ask capability message 2550 is pending and, when so, control passes via branch 1039 to process (block 1041, see FIG. 60) ask capability message 2550. Control then passes back to the top of the loop via branch 1042. When control determines (block 1038) that ask capability message 2550 is not pending, processing continues via branch 1040 to determine (block 1043) when execute capability message 2570 is pending.

Control determines (block 1043) when execute capability message 2570 is pending and, when so, control passes via branch 1044 to process (block 1046, see FIG. 58) execute capability message 2570. Control then passes back to the top of the loop via branch 1047. When control determines (block 1043) that execute capability message 2570 is not pending, control passes back via branch 1045 to the top of the loop.

Figure 54:
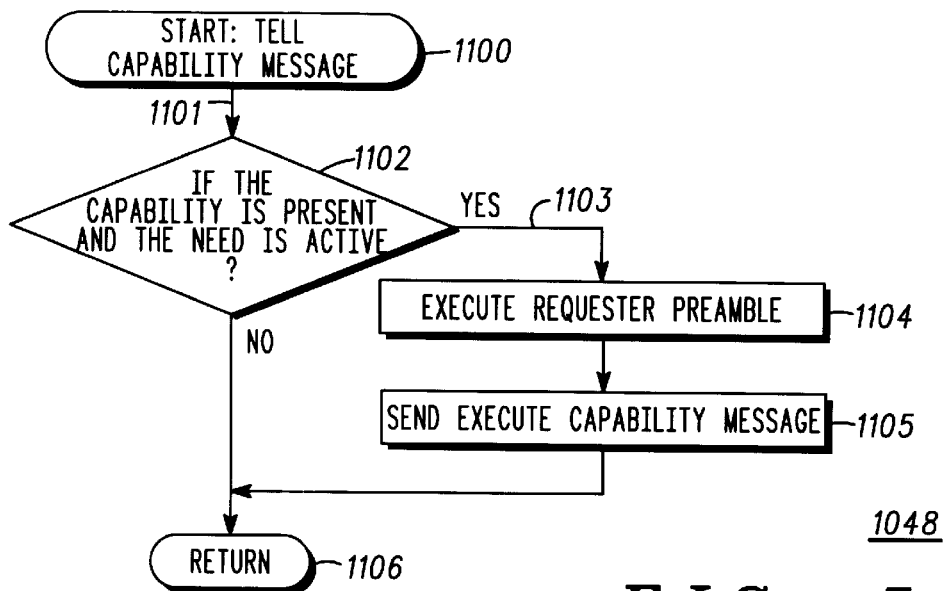
FIG. 54 is an exemplary flow chart outlining the processing of a Tell Capability Message in a device.

FIG. 54 is an exemplary flowchart depicting processing 1048 of tell capability message 2560, which arrives after requester device 901 has already sent ask capability message 2550 to some provider device 902, and provider device 902 has responded.

Process 1048 starts (block 1100), reads (block 1102) result code 2564 out of tell capability message 2560 and determines (block 1102) when provider device 902 can supply capability 911. Need table element 2580 is also checked for this need 906 and process 1048 also determines (block 1102) when need 906 is an active need. When both of these conditions are met, control transfers via branch 1103 to execute (block 1104) requester preamble 827. Execute capability message 2570 is then transmitted (block 1105) to provider device 902. Process 1048 then returns (block 1106).

Figure 55:
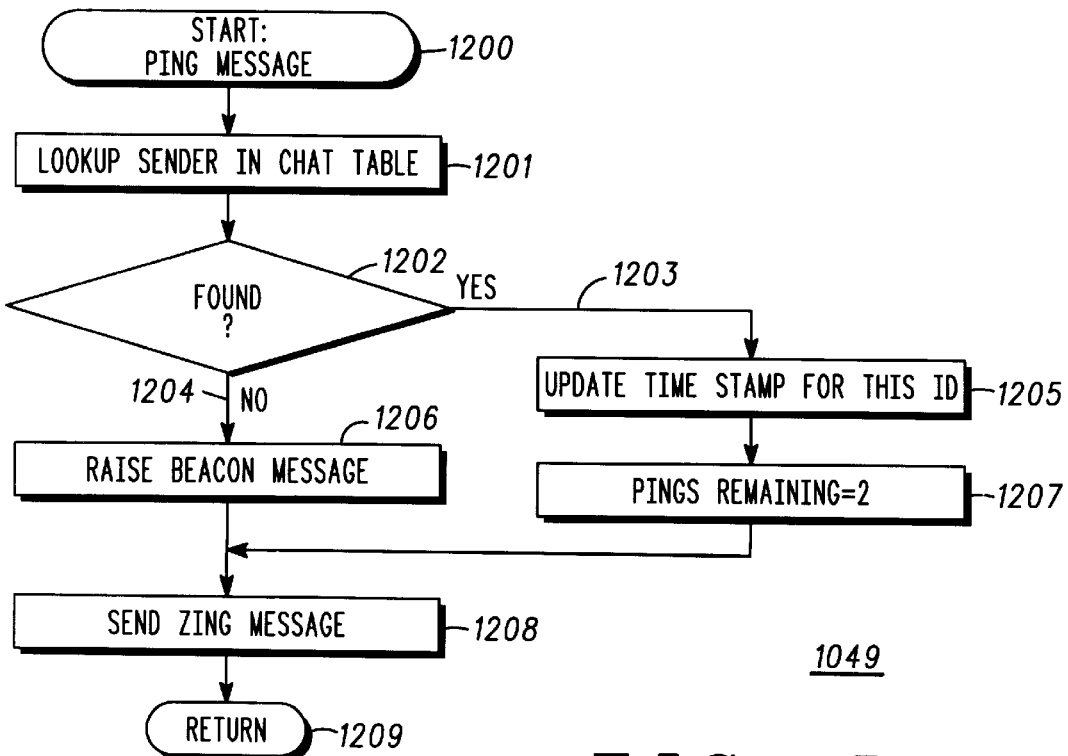
FIG. 55 is an exemplary flow chart outlining the processing of a Ping Message in a device.

FIG. 55 is an exemplary flowchart depicting process 1049 for processing ping message 2520, which is sent to a target device 901/902 by some other coupled device 901/902 when the target has not been heard from in some time period. When the target device 901/902 receives ping message 2520, it should reply back with zing message 2525.

The procedure starts (block 1200), and the sender 901/902 of ping message 2520 is looked up in chat table 760 (block 1201). The result of the search is queried (block 1202). When the sender 901/902 is found in chat table 760 (block 1202), this device 901/902 had been aware of sender 901/902 previously, the time stamp 735 for this device 901/902 is updated in chat table 760 (block 1205) and number of pings remaining 736 is set to 2 (block 1207). In this example, number of pings remaining 736 is set to 2, however, any fixed but otherwise arbitrary number could be used in the preferred embodiments. Number of pings remaining 736 determines the number of internal clock timeouts that need to occur before a target device 901/902 is considered decoupled. Note that it is not only the number of ping messages 2520 that determines the total time interval before disconnect, but also the time threshold set on the internal timer.

When sender 901/902 is not found in chat table 760 (block 1202), this is the first communication that received from sender 901/902, or in other words, this message is treated (block 1206) as beacon message 2500, and processing associated with a beacon message is invoked (block 1800). In either case, zing message 2525 is transmitted to sender 901/902 in response to ping message 2520 (block 1208). Process 1049 then returns (block 1209).

FIG. 56 is an exemplary flowchart depicting processing 1050 of zing message 2525, which is sent to a target device 901/902 in response to ping message 2520.

Process 1050 starts (block 1300) when sender 901/902 of ping message 2520 is looked up in chat table 760. The result of the search is queried (block 1302) and when sender 901/902 is found in chat table 760 (block 1302), this device 901/902 had been aware of sender 901/902 previously, so control passes to block 1305 via branch 1303. Time stamp 735 for this device 901/902 is updated in chat table 760 (block 1305).

Number of pings remaining 736 is set (block 1307) to 2 in this example, however, any fixed but otherwise arbitrary number could be used in the preferred embodiments. Number of pings remaining 736 determines the number of internal clock timeouts that need to occur before target device 901/902 is considered decoupled. Note that it is not only the number of ping messages 2520 that determines the total time interval before disconnect, but also the time threshold set on the internal timer. When the sender was not found (block 1302) in chat table 760, this is the first communication received from sender 901/902, or, in other words, process (block 1306) this as beacon message 2500. Process 1050 then returns (block 1308).

FIG. 57 is an exemplary flowchart depicting process 1051 associated with the receipt of make bond status message 2540, which is normally sent by provider device 902 in response to make bond message 2530 from requester device 901. Process 1051 starts (block 1400) when bond 905 described in make bond status message 2540 is looked up (block 1401) in bond table element 740. The result of the search is queried (block 1402), and, when bond 905 is found in bond table element 740 (block 1402) and make bond status message 2530 indicates that bond 905 is successful, then requester device 901 now has a coupling with provider device 902. When any of the conditions specified (block 1402) are not met, then control passes via branch 1404 and process 1051 returns (block 1415). The state of bond state 743 is changed (block 1405) in bond table element 740 to requester 901, meaning that bond 905 is an active bond and this device 901 is participating in the coupling as requester device 901. A loop is set up (block 1406) that processes every need 906 under current bond key 2480 by initially selecting first need 908. When there are no needs 906 left to process, control is transferred (block 1407) via branch 1408, where the procedure returns (block 1415), otherwise block 1407 transfers control to test whether or not the current need is enabled (block 1410). When not, the next need 909 . . . is selected (block 1414). When the current need 906 is enabled (block 1410), control passes via branch 1412 to send (block 1413) ask capability message 2550 to provider device 902. The next need 909 . . . is then selected (block 1414) and control then transfers to the top of the loop (block 1407).

Figure 58:
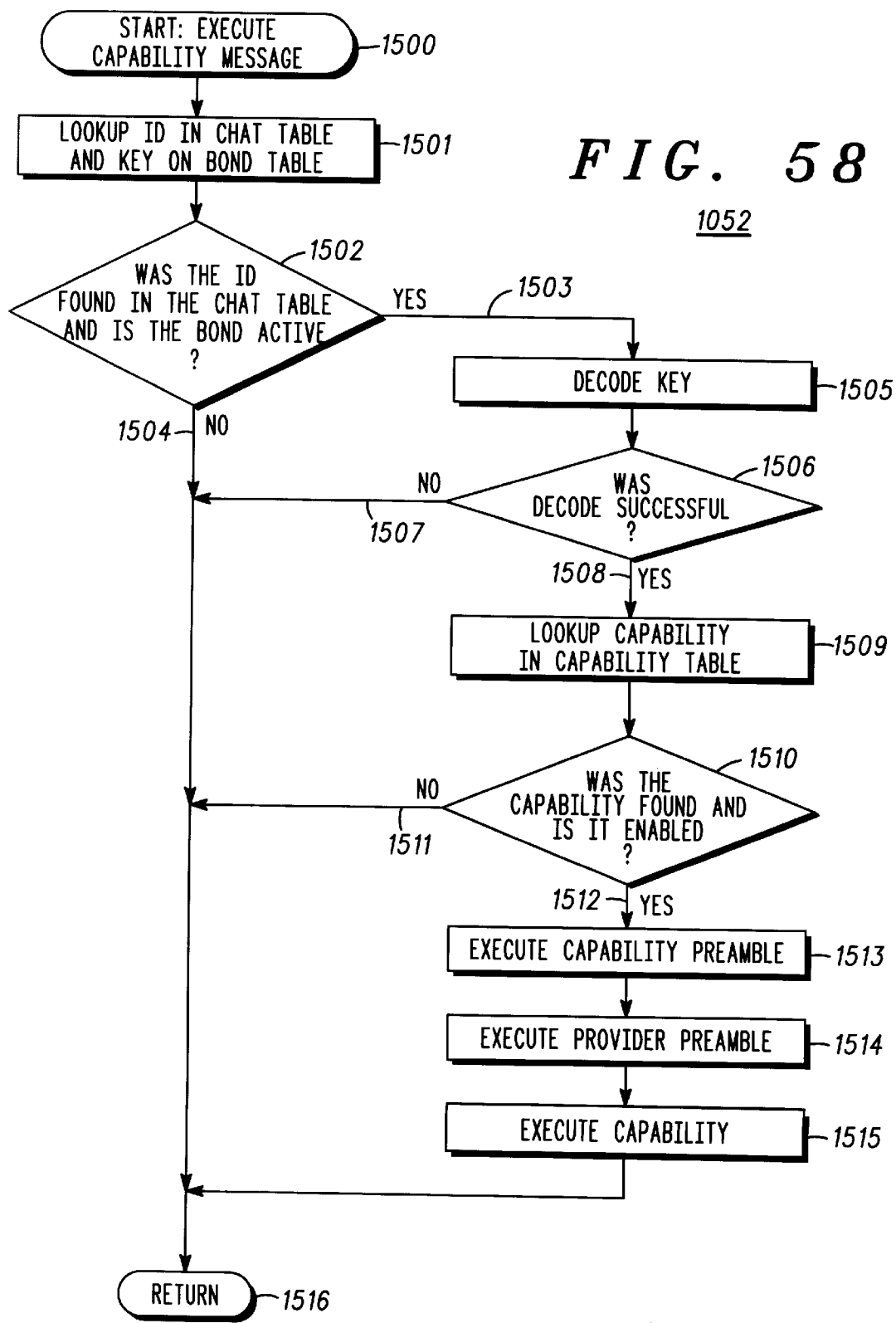
FIG. 58 is an exemplary flow chart outlining the processing of an Execute Capability Message in a device.

FIG. 58 is an exemplary flowchart depicting process 1052 associated with execute capability message 2570, which is sent by requester device 901 to provider device 902 for every match of needs 906 of requester device 901 to capabilities 911 of provider device 902 under bond 905. Process 1052 preferably occurs in provider device 902 and starts (block 1500) with sender device 901/902 and bond 905 described in execute capability message 2570 are looked up in chat table 760 (block 1501) and bond table 770. The result of the search is queried (block 1502) and, when this is a valid bond 905 with requester device 901, control passes via branch 1503 to decode bonding key 903 of requester device 901 and compare it to the corresponding key 904 harbored by provider device 902 (block 1505). When any of the conditions are not met (block 1502), control passes via branch 1504 and process 1052 returns (block 1516). When it is determined that decoding of bond key 903 is successful (block 1506) the specified capability 911 is located (block 1509). When it is determined that decoding of bond key 903 is not successful, execute capability message 2570 is ignored and process 1052 returns (block 1516). When it is determined (block 1510) that capability 911 is present and enabled, capability 911 is ready to be invoked. Capability preamble 2596 is invoked (block 1513) and provider preamble 2587 is invoked (block 1514).

Finally, capability 911 itself is invoked (block 1515). When these conditions are not met, or after capability 911 is invoked, process 1052 returns (block 1516).

Figure 59:
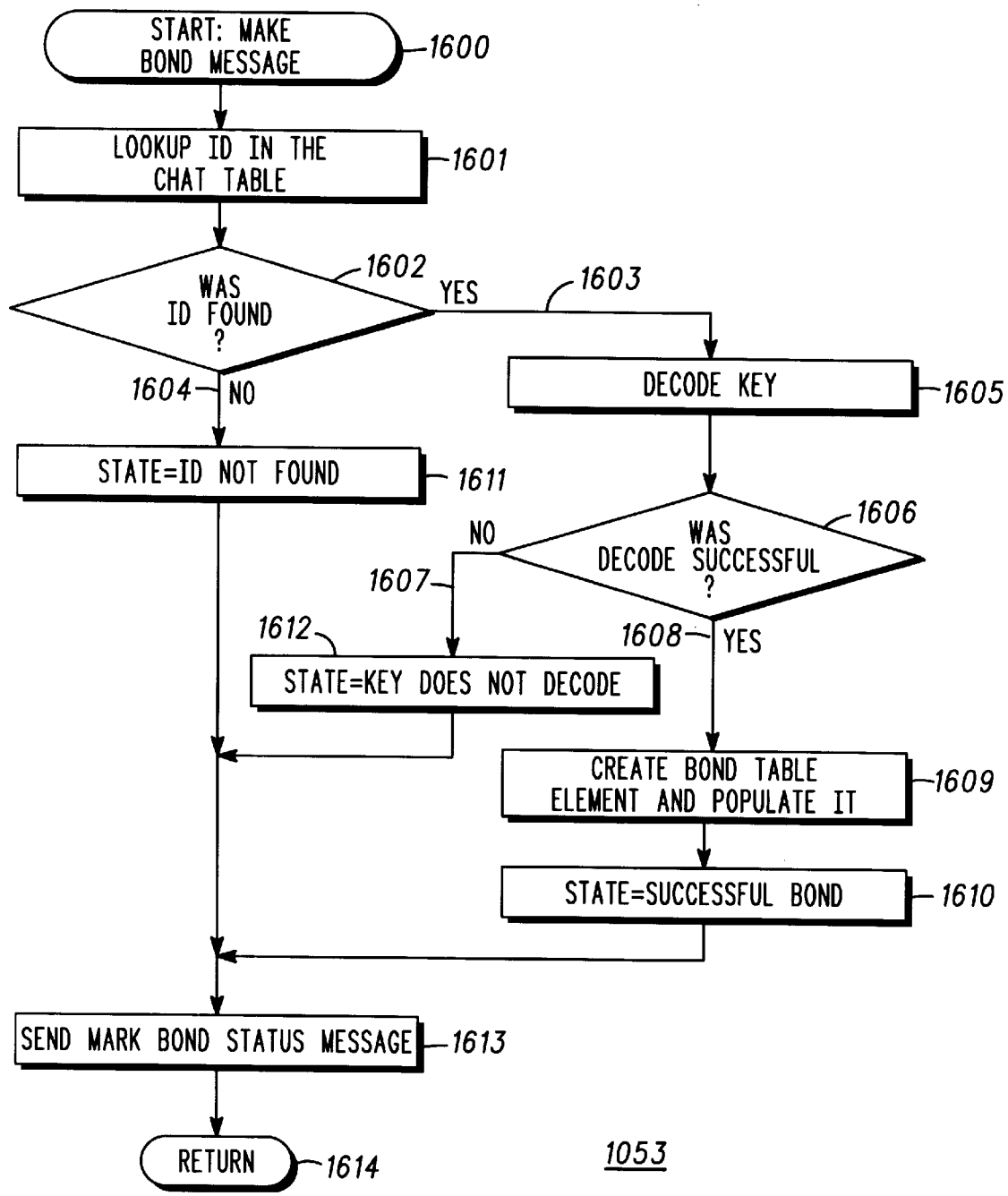
FIG. 59 is an exemplary flow chart outlining the processing of a Make Bond Message in a device.

FIG. 59 is an exemplary flowchart depicting process 1053 associated with make bond message 2530, which is sent by requester device 901 to provider device 902 for every enabled bond key 905 harbored by requester device 901. Process 1053 preferably occurs in provider device 902 and starts (block 1600) with sender 901/902 being looked up in chat table 760 (block 1601). The result of the search is queried (block 1602), and, when the search is successful, this is a known device 901/902. When the search is not successful, the state is set to 'ID not found' (block 1611) and is placed in the result code of make bond status message 2540 (block 1613). Make bond status message 2540 then is transmitted to requester device 901 and process 1053 returns (block 1614). When the search is successful (block 1602), bonding key 903 of requester device 901 is decoded (block 1605) and compared to corresponding key 904 harbored by provider device 902.

When decoding of bond key 903 is determined to be successful (block 1606), bond table 740 is created (block 1609) in bond table 770 for this new bond 905 and the state of process 1053 is set (block 1610) to 'successful bond'. When decoding of bond key 903 is determined to be unsuccessful (block 1606), the state of process 1053 is set to 'key does not decode' (block 1612). In either case, process 1053 then sends (block 1613) make bond status message 2540 to requester device 901 and then returns (block 1614).

Figure 60:
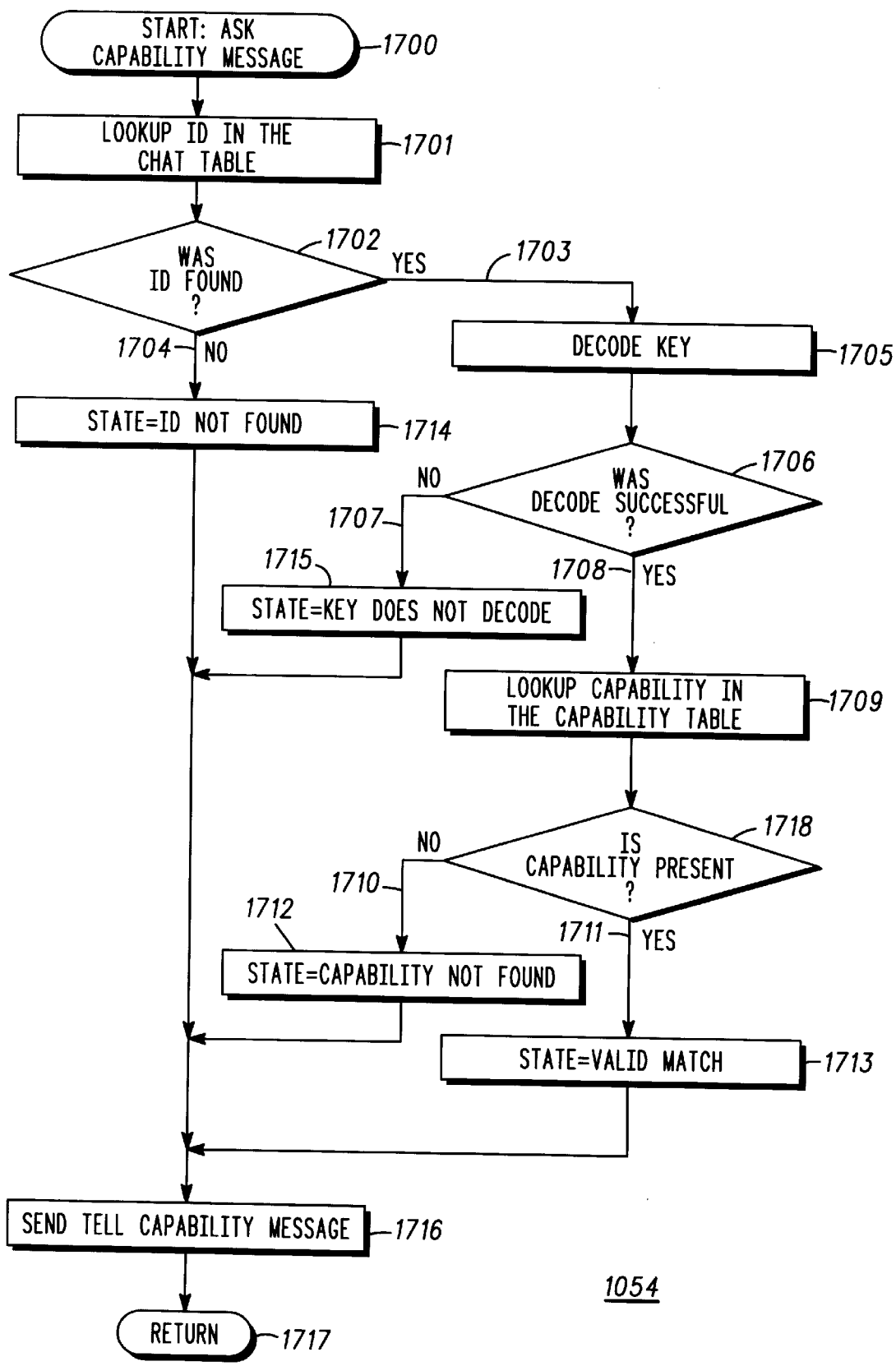
FIG. 60 is an exemplary flow chart outlining the processing of an Ask Capability Message in a device.

FIG. 60 is an exemplary flowchart depicting process 1054 associated with ask capability message 2550, which is sent by requester device 901 to provider device 902 for every enabled need sought by requester device 901. The processing described here occurs in provider device 902.

Process 1054 starts (block 1700) and sender 901/902 is looked up in chat table 760 (block 1701). The result of the search is queried (block 1702), and, when the search is successful, this is device 901/902 that provider device 902 has previously communicated with, so process 1054 proceeds to decode bond key 903 (block 1705).

When the search is determined to be unsuccessful (block 1702), control passes via branch 1704 to set the status to 'ID not found' (block 1714). The state is placed in the result code of tell capability message 2560 (block 1716). Tell capability message 2560 is transmitted (block 1716) to requester device 901. Process 1054 then returns (block 1717).

When the search is determined (block 1702) to be successful, control transfers via branch 1703 to decode (block 1705) bonding key 903 of requester device 901. When decoding of bond key 903 is determined (block 1706) to be unsuccessful, the state of process 1054 is set to 'key does not decode' (block 1715) and process 1054 returns (block 1717) after sending (block 1716) tell capability message 2560.

When decoding of bond key 903 is determined (block 1706) to be successful, control passes via branch 1708 and the specified capability 911 is then searched for (block 1709). The outcome of the search is tested (block 1718) and either the state is set to 'capability not found' (block 1712) when the search is unsuccessful or to 'valid match' when the search is successful (block 1713). Tell capability message 2560 is sent (block 1716) back to requester device 901. Process 1054 then returns (block 1614).

FIG. 61 is an exemplary flowchart depicting process 1055 associated with beacon message 2500, which is sent by devices 901/902 periodically to announce presence. Process 1055 preferably occurs in requester device 901 when requester device 901 receives beacon message 2500 from some potential provider device 902.

Process 1055 starts (block 1800) and sender (provider device 902) is looked up in chat table 760 (block 1801). The result of the search is queried (block 1802), and, when the search is successful, this is a device 901/902 that provider device 902 is already aware of, so control passes via branch 1804 to allow the timestamp for this device to be updated in chat table 760 (block 1807) and number of pings remaining is set to 2 (block 1808). In this flowchart, the number of pings is set to 2, however, any fixed but otherwise arbitrary integer could be used in a preferred embodiment. Process 1055 then returns (block 1821).

When the search does not provide previous records of communication with this device 902 (block 1803), it means that device 901 was not previously aware of this device. Control passes via branch 1803 and new chat table element 730 is created for this device 902 in chat table 760 (block 1805). The timestamp for device 901, 902 is set (block 1806).

Number of pings remaining is then set to 2 (block 1808). In this example, the number of pings is set to 2, however, any fixed but otherwise arbitrary integer could be used in a preferred embodiment. The first bond key 903 harbored by this requester device 901 is selected (block 1810) in preparation to loop over every bond key 903 harbored by requester device 901. It is then determined (block 1811) when there are any more requester bond keys 903 left to process. When none remain, control transfers via branch 1812 and process 1055 returns (block 1821). Otherwise, processing of bond key 903 proceeds (block 1814). When the current requester bond key 903 is not enabled, branch 1815 enables the next requester bond key 903 to be selected (block 1817) and control transfers to the top of the loop (block 1811). When the current requester bond key 903 is enabled (block 1814), control transfers via branch 1816 and new bond table 740 is created (block 1818). The bond state is set to 'pending' (block 1819) and then 'make bond' message is sent to provider device 902 (block 1820). The next requester bond key is then selected (block 1817).

FIG. 62 is an exemplary flowchart depicting process 1056 occurring when the internal timer expires. When this happens, we check to see if any of devices 901, 902 that we were coupled to should now be decoupled.

The procedure starts (block 1900) and the first used entry in chat table 760 is selected (block 1901). It is determined if there are any more chat table entries remaining to be processed (block 1903). When not, branch 1904 is taken, resetting the internal timer (block 1909), and process 1056 returns (block 1918). When it is determined that there are more chat table entries to be processed (block 1903), control passes via branch 1905 to determine when the timestamp for the current chat table element is older than the threshold value (block 1906). The threshold value will be a fixed but otherwise arbitrary value in preferred embodiments.

When the threshold is exceeded, action must be taken to attempt to revive the coupling/bond 905. When the threshold has not been exceeded, control passes via branch 1908, where the next chat table entry is selected for processing (block 1902). It is determined if we have exceeded the number of ping attempts for this device 901/902 (block 1910). When there are no pings remaining, the process for a disconnect is executed (block 1917, see FIG. 63). When there are pings remaining (block 1910), control transfers via branch 1911 to determine when we are having a dialog with the subject device 901/902 or whether it is simply in the chat space (block 1912).

When we are not having a dialog with the subject device 901/902, branch 1913 is taken and the next chat table element 730 is selected (block 1902). Otherwise we are having a meaningful dialog with the subject device 901/902, so control transfers via branch 1914 and ping message 2520 is sent to the subject device (block 1915). The number of pings remaining is decremented (block 1916) and then next chat table entry is selected (block 1902).

Figure 63:
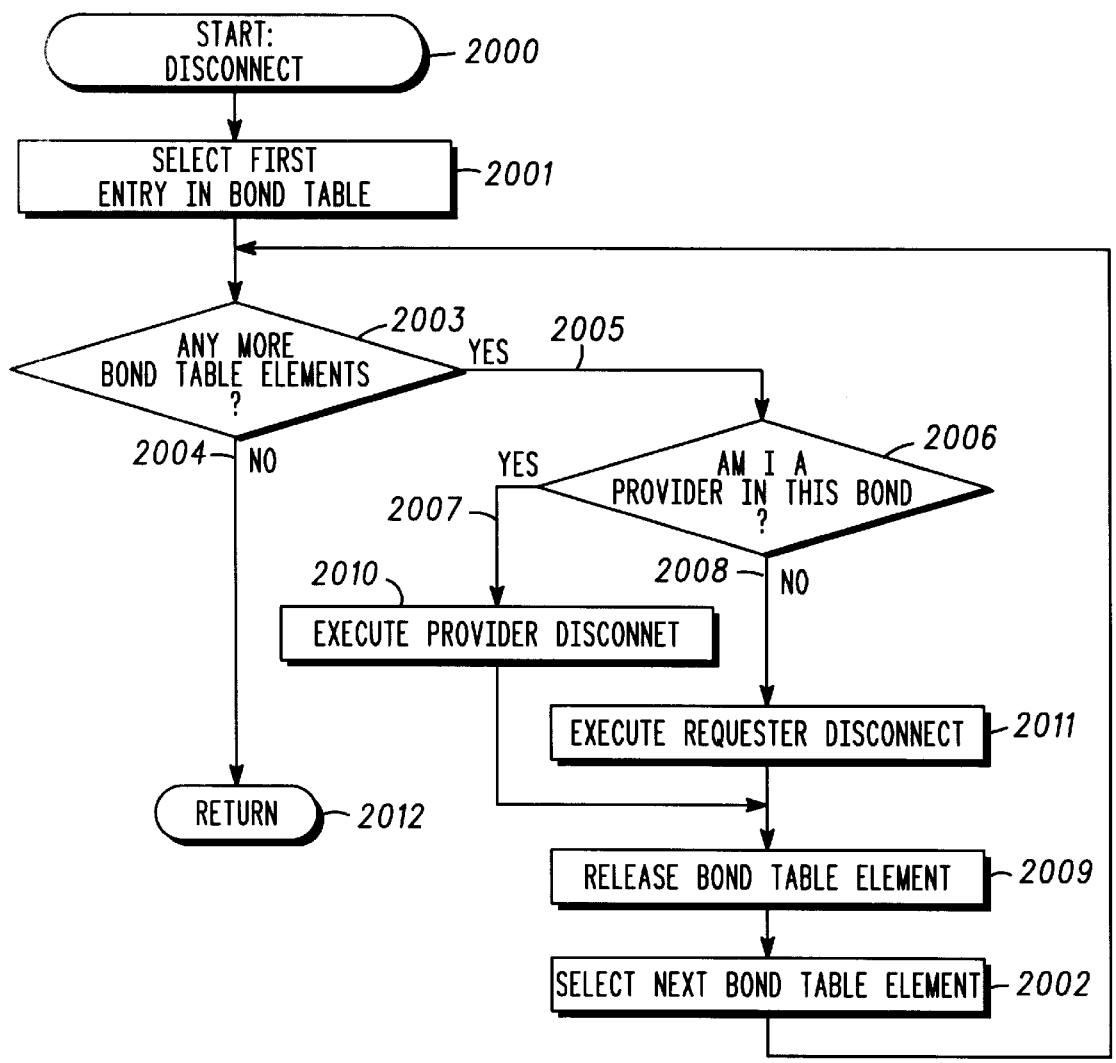
FIG. 63 is an exemplary flow chart outlining the processing when one device has not heard from some other coupled device and elects to disconnect.

FIG. 63 is an exemplary flowchart depicting process 1917 for disconnecting. Process 1917 starts (block 2000) and the first bond table element 740 (FIG. 47) in bond table 760 (FIG. 48) for this device 901/902 is selected (block 2001). It is determined (block 2003) if there are any more bond table elements 740 remaining to be processed. When not, branch 2004 is taken and the process 1917 returns (block 2012). When it is determined (block 2003) that there are more bond table elements 740 to be processed, control passes via branch 2005 to determine (block 2006) when the relationship in bond 905 is one of provider device 902 or requester device 901.

When it is provider device 902, branch 2007 is taken and provider disconnect process (FIG. 64) is executed (block 2010). When it is requester device 901, branch 2008 is taken and requester disconnect process (FIG. 65) is executed (block 2011). At their conclusion, both processes branch to free bond table element 740 (block 2009) and then the next bond table element 740 is selected (block 2002).

Figure 64:
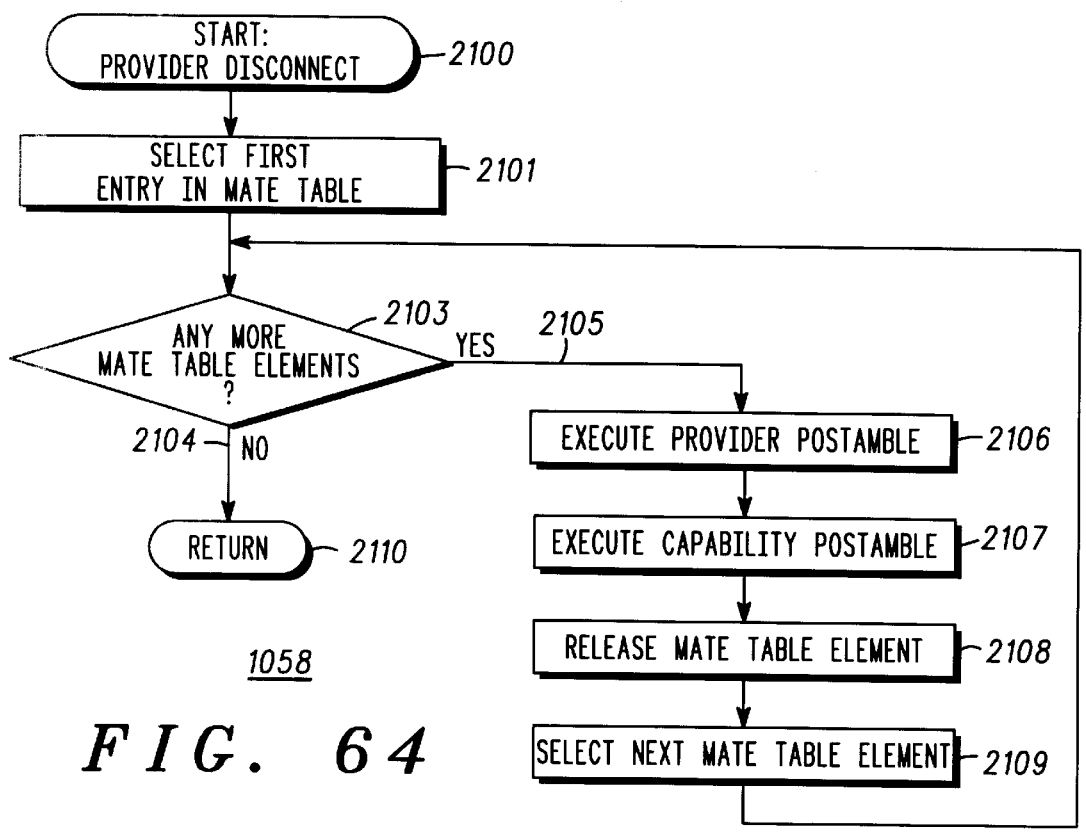
FIG. 64 is an exemplary flow chart outlining the processing when a provider device disconnects from a requester device.

FIG. 64 is an exemplary flowchart depicting process 1058 associated with disconnecting provider device 902. Process 1058 starts (block 2100) and the first mate table element 750 for this bond 905 is selected (block 2101). It is determined if there are any more mate table elements 750 remaining to be processed (block 2103). When not, branch 2104 is taken and process 1058 returns (block 2110). When it is determined that there are more mate table elements 750 to be processed (block 2103), control passes via branch 2105 to execute provider postamble 2588 (block 2106) and capability postamble 2576 is executed (block 2107). The mate table element 750 is released (block 2108), and then the next mate table entry is selected (block 2109). When it is determined (block 2103) that no more mate table elements 750 remain to be processed, process 1058 returns (block 2110).

Figure 65:
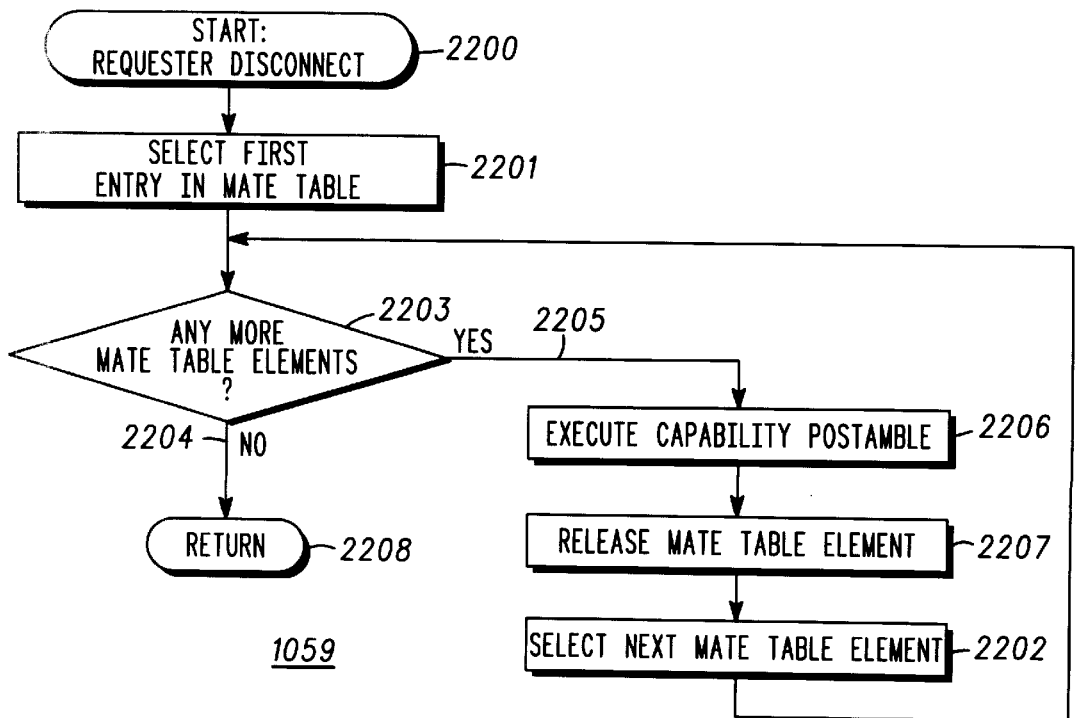
FIG. 65 is an exemplary flow chart outlining the processing when a requester disconnects from a provider device.

FIG. 65 is an exemplary flowchart depicting process 1059 associated with disconnecting requester device 901. Process 1059 starts (block 2200) and the first entry in the mate table for this bond is selected (block 2201). It is determined if there are any more mate table elements 750 remaining to be processed (block 2203). When not, branch 2204 is taken and process 1059 returns (block 2208). When it is determined (block 2203) that there are more mate table elements 750 to be processed, control passes via branch 2205 to execute requester postamble 2586 (block 2206). Mate table element 750 is released (block 2207), and then the next mate table element 750 is selected (block 2202). When it is determined (block 2203) that no more mate table elements 750 remain to be processed, process 1059 returns (block 2208).

In summary, the present invention provides an improved personal data storage and transaction device capable of forming a network with, and interacting with via the network, other data storage and transaction devices, and a corresponding method. This network is suitable for interconnecting a plurality of everyday electronic devices, including movable and portable devices that provide a vast and diverse assortment of services. A priori activation and setup procedures are not required in this network because no network specific equipment requires network addresses in order to make couplings.

Although device addresses are not needed to establish couplings, device names must be known by coupled peers before meaningful communication can be established and information exchanged. In this context, a device or peer name is simply a unique identifier that allows one device or peer 20 to be uniquely distinguished from any other device or peer 20. Consequently, a minimal amount of user involvement is needed to make couplings to peers and peers may make couplings to new peers as a routine matter.

Couplings between such devices allow electronic transactions to be carried out without requiring exchanges of physical money, charge cards and the like. Information like that contained on business cards may be exchanged or not, according to user preferences.

Network node addressing is dynamically configurable because network couplings are formed based upon proximity and upon a needs and capabilities evaluation rather than on unique network-wide address encoding.

Although the preferred embodiments of the invention have been illustrated and described in detail, it will be readily apparent to those skilled in the art that various modifications may be made therein without departing from the spirit of the invention or from the scope of the appended claims.

What is claimed is:

1. A method of initiating a communication link between first and second electronic devices, comprising the steps of:
   transmitting an unsolicited message for establishing communications from the first electronic device to the second electronic device that provides an identity of the first electronic device, and when communications is established provides a first data word for a need of the first electronic device that the first electronic device does not have the ability of performing, and a second data word for a capability of the first electronic device that the first electronic device does have the ability of performing;
   receiving the unsolicited message in the second electronic device; and
   providing an authorization in the second electronic device for the second electronic device to communicate with the first electronic device based on the unsolicited message from the first electronic device.

2. The method of claim 1, further comprising the step of transmitting an associate message from the second electronic device to the first electronic device after the second electronic device is authorized to communicate with the first electronic device, wherein the associate message confirms that the second electronic device is authorized to communicate with the first electronic device.

3. The method of claim 2, further comprising the steps of:
   receiving in the first electronic device the associate message transmitted from the second electronic device; and
   authorizing the first electronic device to communicate with the second electronic device based on the associate message received from the second electronic device.

4. The method of claim 3, further comprising the step of transmitting an associate confirm message from the first electronic device to the second electronic device after establishing authorization for the first electronic device to communicate with the second electronic device, wherein the associate confirm message confirms that the first electronic device is authorized to communicate with the second electronic device.

5. The method of claim 4, further comprising the step of receiving in the second electronic device the associate confirm message transmitted from the first electronic device, wherein the first and second electronic devices have completed initiating a communication link.

6. The method of claim 1, wherein transmitting the unsolicited message from the first electronic device to the second electronic device occurs when the first electronic device and the second electronic device are within about five meters of each other.

7. A method of establishing a communications link between a first peer and a second peer, comprising the steps of:
   transmitting from the first peer to the second peer an unsolicited message for establishing communications that provides an identity of the first peer, and when communications is established a first data word for a need of the first peer that the first peer does not have the ability of performing, and a second data word for a capability of the first peer that the first peer does have the ability of performing;
   acknowledging receipt of the unsolicited message from the first peer based on authorization of the second peer to communicate with the first peer by transmitting an associate message from the second peer; and
   acknowledging receipt of the associate message of the second peer based on authorization of the first peer to communicate with the second peer by transmitting an associate confirm message from the first peer.

8. The method of claim 7, further including the steps of:
   transmitting from the second peer a needs message that includes a function scheduled to be performed by the second peer that is outside a capability of the second peer; and
   matching a portion of the needs message received by the first peer with a capability of the first peer to perform the function defined in the needs message.

9. The method of claim 8, further including the steps of:
   transferring data from the second peer to the first peer; and
   performing the function by the first peer that matches a portion of the needs message received by the first peer with a capability of the first peer to perform the function defined in the needs message.

10. The method of claim 9, further including the step of transferring data from the first peer to the second peer, wherein the transferred data has been altered in accordance with the function performed by the first peer.

11. The method of claim 10, wherein the step of transferring data from the first peer to the second peer occurs when the first and second peers are within about five meters of each other.

12. The method of claim 7, further comprising the step of resetting an internal timer in the first peer prior to the first peer establishing the method of communicating between the first peer and the second peer.

13. The method of claim 12, further comprising the steps of:
   determining that the first peer has a timer expired message pending as a result of the internal timer in the first peer timing out; and
   executing a timer expired process in the first peer when the timer expired message is pending.

14. The method of claim 13, further comprising the step of beginning a ping message pending process in the first peer when the timer expired message is not executing.

15. The method as claimed in claim 14, further comprising steps of:
   determining when a ping message is pending in the first peer, wherein the ping message is transmitted from the first peer to the second peer to maintain the established communications link; and executing the ping message when the ping message is pending in the first peer.

16. An integrated circuit for providing wireless communication, comprising:

a transmit and receive section having a terminal;

a memory having a terminal coupled to the terminal of the transmit and receive section, wherein the memory stores a beacon message that includes an identity of the integrated circuit, a first data word for a need of the integrated circuit that the integrated circuit does not have the ability of performing and a second data word for a capability of the integrated circuit that the integrated circuit does have the ability of performing; and a processor having a terminal coupled to the terminal of the memory for transferring the beacon message to the transmit and receive section that is transmitted as an unsolicited signal for establishing communication with an electronic device, and further transferring the need of the integrated circuit to the transmit and receive section once communication with the electronic device has been established.

17. The integrated circuit of claim 16, wherein the identity of the integrated circuit is sufficiently unique within a communications network.

18. The integrated circuit of claim 16, wherein the beacon message is periodically transmitted from the transmit and receive section.

* * * * *